(12) United States Patent
Mizutani et al.

(10) Patent No.: US 6,945,610 B1
(45) Date of Patent: Sep. 20, 2005

(54) HYDRAULIC BRAKING SYSTEM WHEREIN ELECTRICALLY CONTROLLABLE ASSISTING DRIVE FORCE IS APPLIED TO MASTER CYLINDER PISTON UPON BRAKE PEDAL OPERATION

(75) Inventors: Yasuji Mizutani, Susono (JP); Hiroshi Isono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/287,707

(22) Filed: Apr. 7, 1999

(30) Foreign Application Priority Data

| Apr. 17, 1998 | (JP) | ................................. 10-107517 |
| Nov. 11, 1998 | (JP) | ................................. 10-320247 |
| Dec. 22, 1998 | (JP) | ................................. 10-364575 |

(51) Int. Cl.⁷ ............................................... B60T 8/44
(52) U.S. Cl. ................... 303/114.1; 303/11; 303/115.5; 303/155
(58) Field of Search .................... 303/10, 11, 114.1, 303/114.2, 155, 115.1, 115.4, 115.5; 60/545

(56) References Cited

U.S. PATENT DOCUMENTS

| 3,659,905 | A | * | 5/1972 | Goulish ................. 303/122.13 |
| 4,620,750 | A |   | 11/1986 | Leiber |
| 4,828,332 | A | * | 5/1989 | Lohberg ................... 303/113.3 |
| 4,914,917 | A | * | 4/1990 | Schonlau ................. 303/113.4 |
| 4,930,845 | A | * | 6/1990 | Bleckmann et al. ........ 303/139 |
| 4,950,027 | A | * | 8/1990 | Reinartz et al. ......... 303/113.3 |
| 5,012,647 | A | * | 5/1991 | Maggioni et al. ............. 60/413 |
| 5,044,700 | A | * | 9/1991 | Willmann ................ 303/113.4 |
| 5,066,077 | A | * | 11/1991 | Farr ......................... 303/114.1 |
| 5,193,885 | A | * | 3/1993 | Yamaguchi et al. .......... 303/87 |
| 5,484,193 | A |   | 1/1996 | Fuller et al. |
| 5,531,509 | A | * | 7/1996 | Kellner et al. ........... 303/114.1 |
| 5,549,361 | A | * | 8/1996 | Sorensen ..................... 303/10 |
| 5,954,407 | A | * | 9/1999 | Schramm et al. ........... 303/155 |
| 6,053,582 | A | * | 4/2000 | Ganzel .................... 303/114.1 |
| 6,213,568 | B1 | * | 4/2001 | Feigel ..................... 303/114.1 |

FOREIGN PATENT DOCUMENTS

| JP | 57186571 A | 11/1982 |
| JP | A-59-149851 | 1/1984 |
| JP | U-59-6556 | 8/1984 |
| JP | 45159 A | 1/1992 |
| JP | 431160 A | 2/1992 |
| JP | 450069 A | 2/1992 |
| JP | 4328064 A | 11/1992 |
| JP | 717388 A | 1/1995 |
| WO | WO 94 22699 | 10/1994 |
| WO | WO 97 18114 | 5/1997 |

* cited by examiner

Primary Examiner—Robert A. Siconolfi
(74) Attorney, Agent, or Firm—Kenyon & Kenyon

(57) ABSTRACT

A hydraulically operated braking system including a master cylinder (12; 300: 500; 600) having a pressurizing piston (34; 322, 324; 504, 506) operatively connected to a brake operating member (10), to pressurize a fluid in a pressurizing chamber (30, 32; 302, 304; 508, 510), so that a brake cylinder (22–28), is actuated by the pressurized fluid, and an assisting device (81; 260–272; 109; 538; 612) for applying to the pressurizing piston an assisting drive force which is other than a primary drive force to be applied to the pressurizing piston on the basis of a brake operating force acting on the brake operating member. The assisting device is electrically controllable to control the assisting drive force.

42 Claims, 21 Drawing Sheets

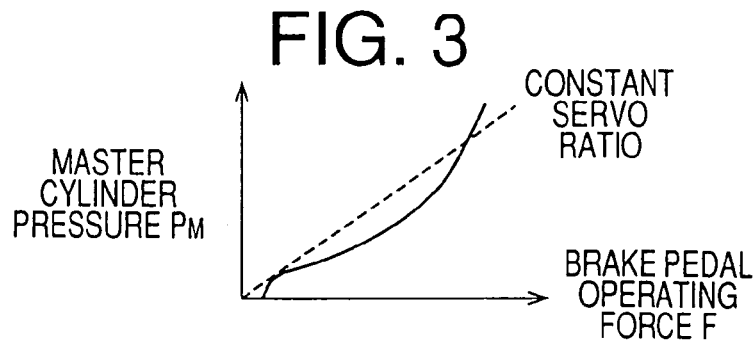
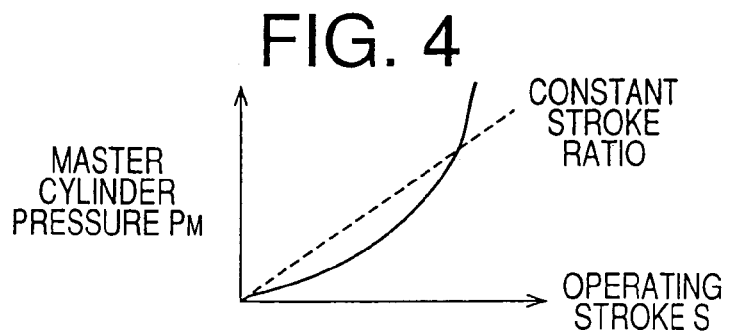
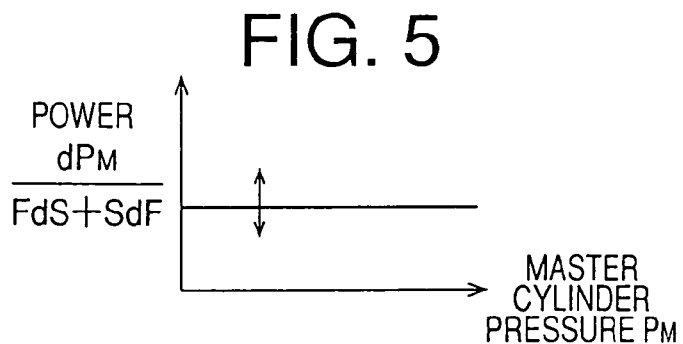
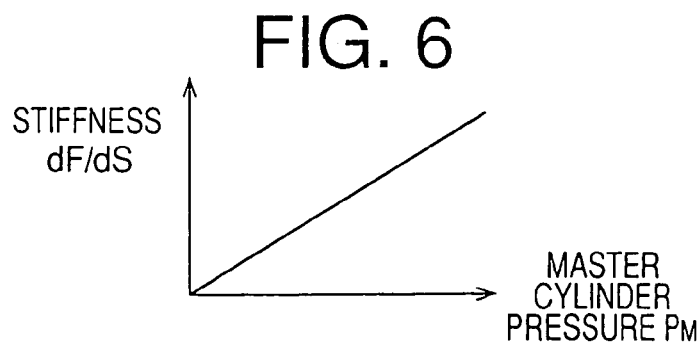

FIG. 23

| | | | |
|---|---|---|---|
| NORMAL BRAKING | PRESSURE INCREASE | OPEN | 74(CONTROLLED), 560 |
| | | CLOSED | 75, 542, 546, 562 |
| | PRESSURE REDUCTION | OPEN | 75(CONTROLLED), 560, 542 |
| | | CLOSED | 74, 546, 562 |
| AUTOMATIC BRAKING | PRESSURE INCREASE | OPEN | 74(CONTROLLED), 560, 546 |
| | | CLOSED | 75, 542, 562 |
| | PRESSURE REDUCTION | OPEN | 75(CONTROLLED), 560, 546, 542 |
| | | CLOSED | 74, 562 |
| ELECTRICAL ABNORMALITY | BRAKE PEDAL DEPRESSED | OPEN | 542, 546 |
| | | CLOSED | 74, 75, 560, 562 |
| | BRAKE PEDAL RELEASED | OPEN | 542, 546 |
| | | CLOSED | 74, 75, 560, 562 |
| ABNORMALITY OF VALVE DEVICE 82 | BRAKE PEDAL DEPRESSED | OPEN | 562 |
| | | CLOSED | 74, 75, 542, 546, 560 |
| | BRAKE PEDAL RELEASED | OPEN | 542, 546 |
| | | CLOSED | 74, 75, 560, 562 |

FIG. 26

| | | | PRESSURE INCREASE (PEDAL DEPRESSED) | PRESSURE REDUCTION (PEDAL RELEASED) |
|---|---|---|---|---|
| NORMAL BRAKING | | OPEN | 74(CONTROLLED), 560, 607 | 75(CONTROLLED), 560, 607 |
| | | CLOSED | 75, 610, 632 | 74, 610, 632 |
| | REGULATOR 614 | | COMMUNICATING WITH RESERVOIR 76 | |
| | CHECK VALVE 615 | | COMMUNICATING WITH PRESSURE CONTROL VALVE DEVICE 82 | |
| AUTOMATIC BRAKING | | OPEN | 74(CONTROLLED), 560, 610 | 75(CONTROLLED), 560, 610, 607 |
| | | CLOSED | 75, 632, 607 | 74, 632 |
| | REGULATOR 614 | | COMMUNICATING WITH RESERVOIR 76 | |
| | CHECK VALVE 615 | | COMMUNICATING WITH PRESSURE CONTROL VALVE DEVICE 82 | |
| ELECTRICAL ABNORMALITY | | OPEN | 632, 607 | 632, 607 |
| | | CLOSED | 74, 75, 560, 610 | 74, 75, 560, 610 |
| | REGULATOR 614 | | COMMUNICATING WITH ACCUMULATOR 72 | |
| | CHECK VALVE 615 | | COMMUNICATING WITH REGULATOR 614 | |
| ABNORMALITY OF SERVO SYSTEM | | OPEN | 610, 632, 607 | 610, 632, 607 |
| | | CLOSED | 74, 75, 560 | 74, 75, 560 |
| | REGULATOR 614 | | COMMUNICATING WITH ACCUMULATOR 72 | |
| | CHECK VALVE 615 | | COMMUNICATING WITH FIRST PRESSURIZING CHAMBER 508 | |

HYDRAULIC BRAKING SYSTEM WHEREIN ELECTRICALLY CONTROLLABLE ASSISTING DRIVE FORCE IS APPLIED TO MASTER CYLINDER PISTON UPON BRAKE PEDAL OPERATION

This application is based on Japanese Patent Applications Nos. 10-107517, 10-320247 and 10-364575 filed Apr. 17, Nov. 11 and Dec. 22, 1998, respectively, the contents of which are incorporated hereinto by reference.

BACKGROUND OF THE INVENTION

1. Field of the Invention

The present invention relates in general to a hydraulically operated braking system, and more particularly to a hydraulically operated braking system including an assisting device for boosting a drive force to be applied to a pressurizing piston of a master cylinder.

2. Discussion of the Related Art

An example of a hydraulically operated braking system including such an assisting device as described above is disclosed in JP-A-4-328064. This braking system includes (1) a master cylinder having a pressurizing piston operatively connected to a brake operating member to pressurize a working fluid in a pressurizing chamber, (2) a brake cylinder for actuating a brake device based on the pressure of the pressurized fluid, and (3) an assisting device for applying to the pressurizing piston an assisting drive force which is different than a primary drive force to be applied to the pressurizing piston on the basis of a brake operating force acting on the brake operating member. In this braking system wherein the primary drive force and the assisting drive force are both applied to the pressurizing piston, the fluid pressure in the pressurizing chamber can be boosted, permitting the brake device to produce an increased braking force for a given value of the brake operating force. However, the assisting drive force to be generated by the assisting device is simply proportional to the brake operating force. That is, the assisting device disclosed in the above-identified publication is not capable of producing the assisting drive force which is not proportional to the brake operating force.

SUMMARY OF THE INVENTION

It is therefore an object of this invention to provide a hydraulically operated braking system comprising an assisting device capable of producing an assisting drive force in a non-proportional relationship with the brake operating force.

The above object may be achieved according to any one of the following modes of the present invention, each of which is numbered like the appended claims and depends from the other mode or modes, where appropriate, so as to indicate various technical features and possible combinations of elements in preferred forms of the invention. However, it is to be understood that the present invention is not limited to those specific modes, features or combinations which will be described.

(1) A hydraulically operated braking system comprising: a brake operating member operable by an operator; a master cylinder including a pressurizing piston operatively connected to the brake operating member and partially defining a pressurizing chamber, the pressurizing piston being moved by the brake operating member to pressurize a fluid in the pressurizing chamber; a brake cylinder actuated by the pressurized fluid received from the master cylinder; and an assisting device for applying to the pressurizing piston an assisting drive force which is other than a primary drive force to be applied to the pressurizing piston on the basis of a brake operating force acting on the brake operating member, the assisting device being electrically controllable to control the assisting drive force.

In the hydraulically operated braking system of the present invention constructed as described above, the assisting drive force to be applied to the pressurizing piston of the master cylinder is electrically controllable, so that the assisting drive force can be controlled in a non-proportional relationship with the brake operating force acting on the brake operating member. Further, the electric control of the assisting drive force results in improved ease and freedom of control the assisting drive force.

The assisting drive force produced by the assisting device may be applied to the pressurizing piston, either simultaneously and together with the primary drive force produced upon operation of the brake operating member, or alone and without simultaneous application of the primary drive force. In the latter case, the assisting drive force is applied to the pressurizing piston when the brake operating member is placed in the non-operated position (without the brake operating force acting thereon). In this case, the hydraulically operated braking system is automatically actuated with the assisting drive force applied to the pressurizing piston, namely, actuated to effect automatic brake application without an operation of the brake operating member by the operator.

(2) A hydraulically operated braking system according to the above mode (1), wherein the assisting device includes an assisting drive force control device electrically operable to control the assisting drive force on the basis of at least one of a brake operating condition quantity indicative of an operating condition of the brake operating member and a vehicle running condition quantity indicative of a running condition of an automotive vehicle having a wheel which is braked by the brake cylinder.

In the hydraulically operated braking system according to the above mode (2), the assisting drive force is electrically controlled on the basis of at least one of the brake operating condition quantity and the vehicle running condition quantity. For instance, the brake operating condition quantity may be an operating amount (operating force or stroke) of the brake operating member, a rate of change of the operating amount (rate of change of the operating force or stroke, or a combination of the operating amount and the rate of change of the operating amount. For example, the assisting drive force may be controlled as a quadratic function of the operating amount of the brake operating member. In this case, the rate of change of a braking force (produced by the brake cylinder) with the operating amount can be made higher when the operating amount is relatively large, than when the operating amount is relatively small, so that the braking sensitivity is comparatively high when the operating amount is relatively large.

The vehicle running condition quantity may be a running speed of the vehicle, an acceleration value of the vehicle, a slipping condition quantity of the vehicle wheel, a turning condition quantity of the vehicle, or a running environment quantity of the vehicle. The slipping condition of the vehicle wheel includes slipping of the wheel while the wheel is braked, and slipping of the wheel while the wheel is driven. The slipping condition quantity of the wheel may be a slip ratio of the wheel, a slip amount or speed of the wheel, a rate of change of the slip ratio or amount, or a combination of the slip ratio or amount and the rate of change thereof. The turning condition quantity may be a yaw rate of the vehicle, a difference between rotating speeds of right and left wheels of the vehicle, a rate of change of the yaw rate or the wheel speed difference, or a combination of the yaw rate or wheel speed difference and the rate of change thereof. The running environment quantity indicates the environment in which the vehicle is running.

For instance, the assisting drive force may be controlled so as to be larger when the vehicle running speed upon initiation of a braking operation of the braking system is comparatively high than when the vehicle running speed is comparatively low. In this instance, the required stopping distance of the vehicle can be reduced. If the assisting drive force is controlled to be smaller when the slipping condition quantity of the wheel being braked is comparatively large than when the slipping condition quantity is comparatively small. In this case, the braking stability of the vehicle can be improved.

The vehicle running environment quantity may be a friction coefficient of the road surface, or an ambient temperature. Since the running condition of the vehicle can be estimated from the vehicle running environment quantity, this vehicle running environment quantity may be considered to be the vehicle running condition quantity. For instance, it is possible to consider that the slipping condition quantity of the wheel tends to be larger when the friction coefficient of the road surface is comparatively low than when the friction coefficient is comparatively high. When the ambient temperature is comparatively low and the viscosity of the working fluid is comparatively high, it is possible to consider that the braking effect provided by the braking system tends to be delayed. Accordingly, the assisting drive force may be controlled to be larger to increase the master cylinder pressure to a higher level when the ambient temperature is relatively low, so that the delay of the braking effect at the relatively low ambient temperature can be reduced. The vehicle running environment quantity may be a quantity relating to a distance between the vehicle and a person or any other object in front of the vehicle. When this distance (which indicates a risk of collision of the vehicle with the object) is relatively small, or when a rate of reduction of this distance is relatively high (a rate of approach of the vehicle to the object) is relatively high, it is possible to consider that there is a relatively high risk of the vehicle collision with the object. To rapidly stop the vehicle, therefore, it is desirable to control the assisting drive force to be larger when the distance is relatively small or when the rate of reduction of the distance is relatively high.

A control mode in which the assisting drive force is controlled on the basis of the wheel slipping condition quantity, vehicle turning condition quantity or vehicle collision risk may be considered to be one form of an anti-lock control, a traction control, a vehicle turning stability control, or an emergency brake control of the braking system. In the anti-lock control, for instance, the braking pressure applied to the brake cylinder may be controlled so as to hold the slip amount or ratio of the wheel within an optimum range, by changing the assisting drive force while maintaining the primary drive force at a constant value. Where the assisting device is operable to produce the assisting drive force without an operation of the brake operating member, the traction control or vehicle turning stability control can be effected by controlling the assisting drive force. The emergency brake control may be effected for the purpose of increasing the braking force during operation of the brake operating member, or for the purpose of generating a braking force without or prior to an operation of the brake operating member. Where the assisting device is operable without an operation of the brake operating member, the emergency brake control may be effected for the latter purpose.

The braking system may include a running condition control device in addition to the assisting device, so that the anti-lock control, traction control and vehicle turning stability control is effected by the running condition control device. In this case, the assisting drive force produced by the assisting device may be controlled depending upon whether the running condition control device is in operation. For example, the assisting drive force may be controlled to be comparatively small while the running condition control device is in operation, so that the assisting drive force has a reduced degree of influence on the anti-lock, traction or vehicle turning stability control. In this case, a control quantity (one or zero, for example) indicating whether the running condition control device is in operation may be considered to be the vehicle running condition quantity.

(3) A hydraulically operated braking system according to the above mode (1) or (2), wherein the assisting device comprises: an assisting cylinder including an assisting piston operatively connected to the pressurizing piston, the assisting cylinder having an assisting pressure chamber which is partially defined by the assisting piston; a high-pressure source; a reservoir; a solenoid-operated pressure control valve device connected to the high-pressure source, the reservoir and the assisting pressure chamber, for selectively supplying the fluid from the high-pressure source to the assisting pressure chamber and returning the fluid from the assisting pressure chamber to the reservoir; and a control valve control device for controlling the solenoid-operated pressure control valve device to control a pressure of the fluid in the assisting pressure chamber.

In the above mode of the braking system, a force acting on the assisting piston based on the fluid pressure in the assisting pressure chamber is increased to increase the assisting drive force to be applied to the pressurizing piston, as the fluid pressure in the assisting pressure chamber is increased.

The assisting cylinder may be disposed in parallel or in series with the master cylinder. Where the assisting cylinder is disposed in parallel with the master cylinder, piston rods of the pressurizing piston and the assisting piston are operatively connected, at their ends remote from the pistons, to the brake operating member, such that those ends are spaced from each other in the longitudinal direction of the brake operating member. Where the assisting cylinder is disposed in series with the master cylinder, a portion of the piston rod of the pressurizing piston may be utilized as the piston rod of the assisting piston. Alternatively, the pressurizing and assisting pistons may be formed integrally with each other. In this latter case, the assisting cylinder and the master cylinder desirably employ the same cylinder housing in which the pressurizing chamber and the assisting pressure chamber are formed. On the other hand, the solenoid-operated pressure control valve device may consist of a single solenoid-operated pressure control valve, a plurality of solenoid-operated shut-off valve, or at least one solenoid-operated directional control valve. Where the solenoid-operated pressure control valve device includes a pressure increase control valve disposed between the high-pressure source and the assisting pressure chamber, and a pressure reduction control valve disposed between the reservoir and the assisting pressure chamber, a solenoid-operated shut-off valve may be provided between the pressure reduction control valve and the assisting pressure chamber, and/or between the pressure reduction control valve and the reservoir. In this case, the solenoid-operated shut-off valve is controlled such that the shut-off valve is open while the pressure reduction control valve is in a pressure reducing state for permitting the pressurized fluid to be discharged from the assisting pressure chamber into the reservoir, and is closed while the pressure reduction control valve is in a pressure holding state for inhibiting a discharge flow of the fluid from the assisting pressure chamber. This shut-off valve prevents the pressurized fluid from being discharged from the assisting pressure chamber towards the reservoir even when the fluid leaks from the pressure reduction control valve. Thus, the shut-off valve is controlled in response to the operating state of the pressure reduction control valve.

(4) A hydraulically operated braking system according to the above mode (1) or (2), wherein the assisting device comprises: an assisting rod operatively connected to the brake operating member; an electrically operated actuator for applying an electrically generated drive force to the assisting rod; and an actuator control device for controlling the actuator to control the electrically generated drive force for controlling the assisting drive force to be applied to the pressurizing piston.

The electrically generated drive force to be applied to the assisting rod is controlled by controlling the electrically operated actuator, so that the assisting drive force to be applied to the pressurizing piston is controlled. The actuator may be an electric motor or a piezoelectric element or elements.

(5) A hydraulically operated braking system according, to the above mode (3), further comprising an emergency closure valve disposed between the assisting pressure chamber and the solenoid-operated pressure control valve device and which is normally placed in an open state for fluid connecting the assisting pressure chamber and the solenoid-operated pressure control valve device to each other, the emergency closure valve being brought to a closed state for disconnecting the assisting pressure chamber and the solenoid-operated pressure control valve device from each other, in the event of an abnormality of the solenoid-operated pressure control valve device.

The braking systems according to the above mode (5) and any one of the following modes of this invention are improvements of the braking system according to the above mode (1); (2) or (3).

The "abnormality of the solenoid-operated pressure control valve device" described above with respect to the above mode (5) includes a failure of the solenoid-operated pressure control valve itself to normally function, and an electrical abnormality that prevents the application of an electric current to the solenoid-operated pressure control valve device. Where the pressure control valve device includes the pressure increase control valve between the assisting pressure chamber and the high-pressure source, and a pressure reduction control valve between the assisting pressure chamber and the reservoir, the pressure increase or pressure control valve cannot be closed due to sticking due to a foreign matter contained in the working fluid. In this case, the pressurized fluid is continuously fed from the high-pressure source to the assisting pressure chamber, or is continuously discharged from the assisting pressure chamber towards the reservoir. Accordingly, the fluid pressure in the assisting pressure chamber may be increased to an abnormally high level or lowered to an abnormally low level. Such an abnormal variation of the fluid pressure in the assisting pressure chamber can be avoided by the emergency closure shut-off valve which is placed in the closed state to disconnect the assisting pressure chamber and the solenoid-operated pressure control valve device from each other, in the even of occurrence of an abnormality of the pressure increase or reduction control valve. The abnormality that the pressure increase control valve cannot be closed may be detected if the fluid pressure in the assisting pressure chamber is increased even when the pressure increase control valve is commanded to be closed, or if the actual value of the fluid pressure in the assisting pressure chamber is higher than a desired or target value by more than a predetermined amount and if the absolute value of the difference between the actual and desired values is increasing. An abnormality that the abnormality of the pressure reduction control valve cannot be closed can be detected if the fluid pressure in the assisting pressure chamber is reduced even when the pressure reduction control valve is commanded to be closed, or if the actual value of the fluid pressure in the assisting pressure chamber is lower than a desired or target value by more than a predetermined amount and if the absolute value of the difference of the actual and desired values is increasing.

The solenoid-operated pressure control valve device may be arranged to be brought to a pressure holding state for inhibiting a flow of the fluid from the assisting pressure chamber towards the reservoir a flow of the fluid from the high-pressure source into the assisting pressure chamber, in the event of an electrical abnormality that prevents an electric current from being applied to the pressure control valve device. In this case, the fluid may leak from the pressure control valve device placed in the pressure holding state. The provision of the emergency closure valve for disconnecting the assisting pressure chamber and the solenoid-operated pressure control valve device is effective to prevent or reduce a variation in the fluid pressure in the assisting pressure chamber in the event of such an electrical abnormality.

(6) A hydraulically operated braking system according to any one of the above modes (3), (4) and (5), further comprising an emergency high-pressure source communicating device for connecting the assisting pressure chamber and the high-pressure source while by-passing the solenoid-operated pressure control valve device, in the event of an abnormality of the solenoid-operated pressure control valve device.

The "abnormality of the solenoid-operated pressure control valve device" described above with respect to the above mode (6) may be an abnormality that prevents the pressurized fluid from being supplied from the high-pressure source to the assisting pressure chamber. Where the solenoid-operated pressure control valve device includes a pressure increase control valve disposed between the assisting pressure chamber and the high-pressure source, the abnormality of the pressure control valve device may be an abnormality that the pressure increase control valve cannot be opened, making it impossible to supply the pressurized fluid to the assisting pressure chamber through the pressure increase control valve. In this case, the high-pressure source can be communicated with the assisting pressure chamber through the emergency high-pressure source communicating device, so that the pressurized fluid can be supplied from the high-pressure source to the assisting pressure chamber. The pressure increase control valve cannot be opened, due to sticking of a movable member of the control valve caused by a foreign matter contained in the fluid or rusting of the movable member, or alternatively due to an electrical defect of the control valve. In either of these abnormalities, the emergency high-pressure source communicating is effective only where the pressurized fluid having a high pressure is available from the high-pressure source.

The emergency high-pressure source communicating device may include a by-pass passage which connects the high-pressure source and the assisting pressure chamber while by-passing the solenoid-operated pressure control valve device, and a normally-open solenoid operated shut-off valve provided in the by-pass passage. The shut-off valve is opened when an electric current is not applied to its solenoid coil, so that the pressurized fluid can be supplied from the high-pressure source to the assisting pressure chamber even when the pressure increase control valve cannot be opened due to the electrical abnormality.

Where the breaking system includes both of the features of the above modes (5) and (6), the emergency high-pressure source communicating device is preferably arranged to connect the assisting pressure chamber and the high-pressure source to each other even when the emergency closure valve cannot be switch from the closed state to the open state.

(7) A hydraulically operated braking system according to the above mode (6), wherein the emergency high-pressure source communicating device includes a pilot-operating pressure control valve which is connected to the assisting pressure chamber, the high-pressure source and the reservoir and which is operated in response to the fluid pressure in the pressurizing chamber of the master cylinder received as a pilot pressure, so as to control the fluid pressure received from said high-pressure source depending upon the pilot pressure, and apply the controlled fluid pressure to the assisting pressure chamber.

The use of the pilot-operated pressure control valve permits the non-electrical control of the fluid pressure of the high-pressure source depending upon the master cylinder pressure, so that the controlled fluid pressure is applied to the assisting pressure chamber. Therefore, even when the solenoid-operated pressure control valve device fails to normally operate, for example, the assisting cylinder can be actuated to control the assisting drive force depending upon the master cylinder pressure, as long as the high-pressure source is normal. Where the high-pressure source includes a pump and an accumulator, the assisting cylinder can be actuated even after the pump becomes inoperable, as long as the pressurized fluid is stored in the accumulator.

(8) A hydraulically operated braking system according to the above mode (7), wherein the pilot-operated pressure control valve is provided in a by-pass passage which connects the assisting pressure chamber and the high-pressure source while by-passing the solenoid-operated pressure control valve device, and the emergency high-pressure source communicating device further includes a higher-pressure applying device connected to the by-pass passage, the solenoid-operated pressure control valve device and the assisting pressure chamber, the higher-pressure applying device being operated to apply a higher one of the fluid pressures received from the solenoid-operated pressure control valve device and the pilot-operated pressure control valve.

In the braking system according to the above mode (8), the higher one of the fluid pressures which the higher-pressure applying device receive from the pilot-operated pressure control valve and the solenoid-operated pressure control valve device is applied to the assisting pressure chamber. Accordingly, the assisting pressure chamber is actuated with the consistently higher fluid pressure, than in the case where a predetermined of the above-indicated two fluid pressures is applied to the assisting pressure chamber. A normally-closed solenoid-operated shut-off valve may be disposed between the pilot-operated pressure control valve and the high-pressure source, so that this shut-off valve is opened in the event of occurrence of an abnormality of the solenoid-operated pressure control valve device. In this case, the pilot-operated pressure control valve is operable only when the solenoid-operated pressure control valve device is not normally operable.

(9) A hydraulically operated braking system according to any one of the above mode (3) and (5)–(8), wherein the master cylinder and the assisting cylinder has respective separate cylinder housings, and the assisting piston is operatively connected to the pressurizing piston trough the brake operating member, and wherein pressure-receiving surface areas of the assisting and pressurizing pistons and distances between a fulcrum of the brake operating member and points of connection of the assisting and pressurizing pistons to the brake operating member are determined such that a product of the pressure-receiving surface area of the assisting piston and the distance between the fulcrum and the point of connection of the assisting piston is smaller than a product of the pressure-receiving surface area of the pressurizing piston and the distance between the fulcrum and the point of connection of the pressurizing piston, the braking system further comprising an emergency fluid communicating device disposed between the assisting pressure chamber and the pressurizing chamber, the emergency fluid communicating device being placed in a closed state disconnecting the assisting pressure chamber and the pressurizing chamber from each other during an operation of the braking system when the assisting device is normally operable, and brought to an open position for fluid communication between the assisting pressure chamber and the pressurizing chamber in the event of occurrence of an abnormality of the assisting device during the operation of the braking system.

The "abnormality of the assisting device" described above with respect to the above mode (9) may be an abnormality that prevents the application of a pressurized fluid to the assisting pressure chamber, an abnormality that prevents the control of the fluid pressure in the assisting pressure chamber, or an abnormality that prevents flows of the fluid into and from the assisting pressure chamber. These abnormalities may arise from an electrical defect of the assisting device, or an abnormality associated with the high-pressure source, the solenoid-operated pressure control valve device or the control valve control device.

In the braking system according to the above mode (9), the pressurizing chamber of the master cylinder and the assisting pressure chamber of the assisting cylinder are communicated with each other through the emergency fluid communicating device, in the event of an abnormality of the assisting device. Accordingly, the fluid flows between the assisting and pressurizing chambers are permitted, although the fluid flows between the assisting pressure chamber and the high-pressure source or the reservoir are not possible. When the brake operating member is operated, the fluid is supplied from the pressurizing chamber of the master cylinder to the assisting pressure chamber, so that the assisting piston is permitted to be moved. This arrangement prevents the assisting cylinder from preventing an operation of the brake operating member. When the brake operating member is released, the fluid is returned from the assisting pressure chamber to the pressurizing chamber.

Further, the product of the pressure-receiving surface area of the assisting piston and the distance between the fulcrum of the brake operating member and the point of connection of the assisting piston to the brake operating member is made smaller than the product of the pressure-receiving surface area of the pressurizing piston and the distance between the fulcrum of the brake operating member and the point of connection of the pressurizing piston to the brake operating member. Accordingly, the fluid pressurized in the pressurizing chamber can be supplied to the brake cylinder, although the pressurized fluid is supplied from the pressurizing chamber also to the assisting pressure chamber, as explained below. Further, the supply of the pressurizing fluid from the pressurizing chamber to the assisting pressure chamber causes the assisting cylinder to provide an assisting drive force (which is larger than zero), which is applied to the assisting piston through the brake operating member. Thus, the present arrangement is substantially equivalent to a reduction of the pressure-receiving surface area of the pressurizing piston, and permits boosting of the fluid pressure generated in the pressurizing piston for a given operating force acting on the brake operating member.

As described in detail in the DETAILED DESCRIPTION OF THE PREFERRED EMBODIMENTS, the fluid pressure in the assisting pressure chamber of the assisting cylinder becomes equal to that in the pressurizing chamber of the master cylinder when the assisting pressure chamber and the pressurizing chamber are communicated with each other. Where the master cylinder and the assisting cylinder are disposed in parallel with each other, as shown in FIG. 2, the fluid pressure $P_M'$ in the pressurizing chamber (master cylinder pressure $P_M'$) is expressed by the following equation:

$$P_M'=F \times L_F/(L_M \times S_M - L_S \times S_S) \qquad (1)$$

In the above equation (1), $S_S$, $S_M$, $L_M$, F, $L_F$ represent the following:

$S_S$: pressure-receiving surface area of the assisting piston, $L_S$: distance between the fulcrum of the brake operating member and the point of connection of the assisting piston to the brake operating member, $S_M$: pressure-receiving surface area of the pressurizing piston, $L_M$: distance between the fulcrum of the brake operating member and the point of connection of the pressurizing piston to the brake operating member, F: operating force applied to the brake operating member by the operator, and $L_F$: Distance between the fulcrum and the point at which the operating force acts on the brake operating member.

Since $S_S \times L_S$ is smaller than $S_M \times L_M$, as described above, the master cylinder pressure $P_M'$ will not be a negative pressure, so that the fluid is prevented from being discharged from the brake cylinder into the pressurizing chamber.

On the other hand, the master cylinder pressure $P_M$ when the assisting drive force is zero is expressed by the following equation (2):

$$P_M=F \times L_F/(L_M=S_M) \qquad (2)$$

By using the above equation (2), the above equation (1) can be converted into the following equation (3):

$$P_M'=P_M \times (L_M \times S_M)/(L_M \times S_M - L_S \times S_S) \qquad (3)$$

It will be understood from the above equation (3) that a ratio of the master cylinder pressure $P_M'$ when the assisting, pressure chamber and the pressurizing chamber are communicated with each other to the master cylinder pressure $P_M$ when the assisting drive force is zero is expressed by the following equation (4):

$$P_M'/P_M=1/\{1-(L_S \times S_S/L_M \times S_M)\} \qquad (4)$$

Since $S_S \times L_S < S_M \times L_M$, the ratio $P_M'/P_M$ is larger than 1. Thus, the braking force can be made larger when the assisting pressure chamber and the pressurizing chamber are communicated with each other than when these two chambers are not communicated with each other. As the brake operating member is operated, the fluid pressurized in the pressurizing chamber is supplied to the assisting pressure chamber, resulting in an increase in the fluid pressure in the assisting pressure chamber, and a force based on the fluid pressure in the assisting pressure chamber acts on the assisting piston, so that the assisting drive force based on the force acting on the assisting piston is applied to the pressurizing piston through the brake operating member.

(10) A hydraulically operated braking system according to any one of the above modes (3) and (5)–(8), wherein the master cylinder and the assisting cylinder are disposed in series with each other, and the assisting piston has a pressure-receiving surface area smaller than that of the pressurizing piston, the braking system further comprising an emergency communicating device disposed between the assisting pressure chamber and the pressurizing chamber, the emergency fluid communicating device being placed in a closed state disconnecting the assisting pressure chamber and the pressurizing chamber from each other during an operation of the braking system when the assisting device is normally operable, and brought to an open position for fluid communication between the assisting pressure chamber and the pressuring chamber in the event of occurrence of an abnormality of the assisting device during the operation of the braking system.

The braking system according to the above mode (10) is substantially identical with the braking system according to the above mode (9) as modified such that the distance $L_M$ is made equal to the distance $L_S$. In both of these modes (9) and (10), the assisting cylinder is arranged so that the assisting piston produces a moment that acts on the brake operating member in the direction in which the brake operating force acts on the brake operating member.

(11) A hydraulically operated braking system according to the above mode (9) or (10), wherein the emergency fluid communicating device includes a mechanically operated switch valve which is switched from a closed state for disconnecting the assisting pressure chamber and the pressurizing chamber, to an open state for fluid communication between the assisting pressure chamber and the pressurizing chamber when the fluid pressure in the high-pressure source is lowered below a predetermined lower limit.

When the fluid pressure in the high-pressure source is lowered below the predetermined lower limit due to an abnormality of the high-pressure source, the assisting pressure chamber is generated disconnected from both the high-pressure source and the reservoir, by the solenoid-operated pressure control valve device. In this case, the fluid flows into and from the assisting pressure chamber are not possible. However, the mechanically operated switch vale placed in the open state permits the fluid communication between the assisting pressure chamber and the pressurizing chamber, namely, permits the fluid flows between these two chambers. The mechanically operated switch valve is more reliable than a solenoid-operated switch valve, and is typically a pilot-operated switch valve which receives the fluid pressure of the high-pressure source as a pilot pressure.

(12) A hydraulically operated braking system according to the above mode (9) or (10), wherein the emergency fluid communicating device includes an electrically operated switch valve which is switched from a closed state for disconnecting the assisting pressure chamber and the pressurizing chamber, to an open state for fluid communication between the assisting pressure chamber and the pressurizing chamber in the even of occurrence of an abnormality of the assisting device.

(13) A hydraulically operated braking system according to any one of the above modes (9)–(12), wherein the emergency fluid communicating device is brought to the open state in the event of occurrence of the abnormality of the assisting device, if the fluid pressure in the pressurizing chamber is higher than the fluid pressure in the assisting pressure chamber by more than a predetermined amount.

In the braking system according to the above mode (13), the pressurizing chamber of the master cylinder and the assisting pressure chamber of the assisting cylinder are communicated with each other when the fluid pressure in the pressurizing chamber is higher than the fluid pressure the assisting pressure chamber by more than the predetermined amount, due to the abnormality of the assisting device. The communication between the pressurizing chamber and the assisting pressure chamber with each other through the emergency fluid communicating device has substantially the same effect as a reduction in the inside diameter of the master cylinder. Accordingly, the operating stroke of the pressurizing piston of the master cylinder is increased. However, the communication is not effected immediately after the assisting device has become abnormal, but is effected only after the fluid pressure in the pressurizing chamber has become higher than that in the assisting pressure chamber by more than the predetermined amount. This arrangement results in a reduction of the operating stroke of the pressurizing piston. For instance, the predetermined amount may be determined that the emergency fluid communicating device is held closed disconnecting the pressurizing chamber and the assisting pressure chamber until the brake cylinder has been filled with the fluid and started to provide a braking effect. This arrangement is effective to reduce the required operating stroke of the pressurizing piston and therefore the required operating stroke of the brake operating member, with substantially no deterioration of the function of the assisting device.

(14) A hydraulically operated braking system according to any one of the above modes (9)–(13), wherein the emergency fluid communicating device includes (a) a fluid passage connecting the assisting pressure chamber and the pressurizing chamber, (b) a switch valve which is disposed in the fluid passage and which is switched from a closed state disconnecting the assisting pressure chamber and the pressurizing chamber, to an open state for communication between the assisting pressure chamber and the pressurizing chamber, in the event of the abnormality of the assisting device, and (c) a differential shut-off valve which is disposed in the fluid passage in series with the switch valve and which permits a flow of the fluid from the pressurizing chamber towards the assisting pressure chamber when the fluid pressure in the pressurizing chamber has become higher than the fluid pressure in the assisting pressure chamber by more than the predetermined amount.

In the braking system according to the above mode (13), a flow of the fluid from the pressurizing chamber towards the assisting pressure chamber is inhibited even after the switch valve is switched to the open state, as long as the fluid pressure in the pressurizing pressure chamber is not higher than the fluid pressure in the assisting pressure chamber by more than the predetermined amount, that is, as long as the differential shut-off valve is held closed. In this respect, the differential shut-off valve may be considered to be a flow restrictor device, or a device for limiting the flow of the fluid from the pressurizing chamber into the assisting pressure chamber.

The predetermined amount indicated above, that is, the opening pressure difference of the differential shut-off valve may be a fixed value determined by a biasing force of a spring incorporated in the differential shut-off valve, or may be variable depending upon an electric energy applied to a coil incorporated in the valve. Where the opening pressure difference is variable, the relationship between the operating stroke of the pressurizing piston and the fluid pressure of the pressurizing chamber can be controlled.

A check valve which inhibits a fluid flow from the pressurizing chamber towards the assisting pressure chamber and allows a fluid flow in the opposite direction may be disposed in parallel with the differential shut-off valve. The check valve permits the fluid to be returned from the assisting pressure chamber to the pressurizing chamber when the brake operating member is released.

(15) A hydraulically operated braking system according to the above modes (9), (10), (12) and (13), wherein the emergency fluid communicating device includes an electrically operated switch valve which is disposed between the assisting pressure chamber and the pressurizing chamber and which is switchable between a closed state disconnecting the assisting pressure chamber and the pressurizing chamber and an open state for communication between the assisting pressure chamber and the pressurizing chamber, and a switch valve control means for switching the electrically operated switch valve from the closed state to the open state when the assisting device is not normally operable and when the fluid pressure in the pressurizing chamber is higher than the fluid pressure in the assisting pressure chamber by more than the predetermined amount.

The braking system according to the above mode (15) also permits the fluid in the pressurizing chamber to be sufficiently pressurized while reducing the operating stroke of the pressurizing piston, in the event of an abnormality of the assisting device.

The electrically operated switch valve indicated above may be replaced by a mechanically operated switch valve which is switched from the closed state to the open state when the fluid pressure in the pressurizing chamber has become higher than the fluid pressure in the assisting pressure chamber by more than the predetermined amount while the fluid pressure in the high-pressure source is lower than a predetermined lower limit. For instance, the mechanically operated switch valve may be adapted to be opened when a force based on the pressure difference of the pressurizing chamber and the assisting pressure chamber has become larger than a force based on the fluid pressure in the high-pressure source.

(16) A hydraulically operated braking system according to any one of the above modes (3), (5)–(8) and (13)–(15), further comprising an emergency reservoir communicating device disposed between the assisting pressure chamber and the reservoir, the emergency reservoir communicating device being placed in a closed state disconnecting the assisting pressure chamber and the reservoir from each other during an operation of the braking system when the assisting device is normally operable, and brought to an open state for fluid communication between the assisting pressure chamber and the reservoir in the event of occurrence of an abnormality of the assisting device during the operation of the braking system.

In the braking system according to the above mode (16), the assisting pressure chamber and the reservoir are communicated with each other through the emergency reservoir communicating device to permit the fluid flows between the assisting pressure chamber and the reservoir, in the event of an abnormality of the assisting device, that is, when the fluid flows between the assisting pressure chamber into and from the high-pressure source or the reservoir are impossible. When the brake operating member is operated, the fluid is supplied from the reservoir into the assisting pressure chamber. When the brake operating member is released, the fluid is returned from the assisting pressure chamber back to the reservoir. The reservoir with which the assisting pressure chamber is communicated with the emergency reservoir communicating device may be a master reservoir used for the master cylinder, or may be a reservoir separate from the master reservoir. The assisting cylinder is usually disposed near the master cylinder (or may be formed integrally with the master cylinder). In this respect, the emergency reservoir communicating device is desirably disposed in a fluid passage connecting the assisting pressure chamber and the master reservoir, so that the fluid passage may be shortened.

Where the emergency reservoir communicating device is provided in the braking system according to any one of the above modes (13)–(15), this device permits the fluid flows between the assisting pressure chamber and the reservoir, even if the fluid flows between the assisting pressure chamber and the pressurizing chamber are restricted by the emergency fluid communicating device, differential shut-off valve or electrically operated switch valve indicated above, in the event of an abnormality of the assisting device.

(17) A hydraulically operated braking system according to any one of the above modes (1)–(16), further comprising; a master reservoir; a fluid passage for fluid communication between the master reservoir and the pressurizing chamber of the master cylinder, irrespective of a position of the pressurizing piston; and a check valve disposed in the fluid passage, the check valve inhibiting a flow of the fluid from the pressurizing chamber towards the master reservoir and allowing a flow of the fluid from the master reservoir towards the pressurizing chamber.

In the conventional master cylinder, the pressurizing chamber is connected and disconnected to and from the master reservoir, depending upon the position of the pressurizing piston. For instance, the conventional master cylinder has a port which is formed in its cylinder housing and which communicates with the master reservoir through a fluid passage, and includes a cup seal provided on the pressurizing piston. In this conventional master cylinder, the port is open for fluid communication of the pressurizing chamber with the master reservoir when the pressurizing piston is placed in the original or fully retracted position. When the pressurizing piston is advanced from the original position, the port is closed by the cup seal, and the pressurizing chamber is disconnected from the master reservoir, so that the fluid pressure in the pressurizing chamber is increased as the pressurizing piston is advanced. As the volume of the pressurizing chamber increases with a retracting movement of the pressurizing piston towards the original position, the fluid is permitted to flow from the master reservoir into the pressurizing chamber, to thereby prevent the fluid pressure in the pressurizing chamber from being lowered below the atmospheric level. When the pressurizing piston has been returned to its original position, the port is opened to the pressurizing chamber, for communicating the pressurizing chamber with the master reservoir.

Another type of conventional master cylinder has an inlet check valve disposed between the cylinder housing and the pressurizing piston, or between pressurizing pistons. In this type of master cylinder, the inlet check valve is operated from the open state to the closed state when the pressurizing piston is advanced. In the closed state of the inlet check valve, the pressurizing chamber is disconnected from the master reservoir, so that the fluid pressure in the pressurizing chamber can be increased as the pressurizing piston is advanced. When the pressurizing piston is retracted, the inlet check valve is brought to the open state, the fluid is supplied from the master reservoir to the pressurizing chamber, to prevent the fluid pressure in the pressurizing chamber from being lowered below the atmospheric level. When the pressurizing piston has been returned to its original position, the inlet check valve is restored to its open state for fluid communication of the pressurizing chamber with the master reservoir.

In the master cylinder of the braking system according to the above mode (17), the pressurizing chamber and the master reservoir are held in communication with each other through the fluid passage, irrespective of the position of the pressurizing piston. Namely, the pressurizing chamber is not disconnected from the master reservoir depending upon the position of the pressurizing piston, but the pressurizing chamber is always held in communication with the master reservoir through the fluid passage. However, the check valve is provided in this fluid passage, so as to permit the flow of the fluid from the master reservoir towards the pressurizing chamber, and inhibit the fluid flow in the opposite direction. Since the fluid is prevented by the check valve from being discharged from the pressurizing chamber into the master reservoir, the fluid pressure in the pressurizing chamber can be increased as the pressurizing piston is advanced. Further, since the fluid is permitted to be fed from the master reservoir into the pressurizing chamber, the fluid pressure in the pressurizing chamber is prevented from being lowered below the atmospheric level when the pressurizing piston is retracted to its original or fully retracted position. This arrangement eliminates an increase in the operating stroke of the pressurizing piston, which is required in the conventional master cylinder, to selectively open and close the cup seal or the inlet check valve. Accordingly, the required longitudinal or axial dimension of the master cylinder can be reduced in the present braking system. Where the master cylinder is provided in series with the assisting cylinder, the required overall length of the master cylinder and the assisting cylinder is relatively large. Therefore, the feature of the above mode (17) is particularly advantageous when it is provided in combination of the series arrangement of the master cylinder and the assisting cylinder.

The assisting device in the braking system according to the above mode (17) may utilize the master reservoir, or employs an exclusive reservoir different from the master reservoir.

The feature of the above mode (17) is available independently of the feature of any one of the above modes (1)–(16) of the present invention.

(18) A hydraulically operated braking system according to the above mode (17), wherein the master cylinder includes a cylinder housing having a port connected to the fluid passage and communicating with the pressurizing chamber, the master cylinder further including a device for preventing the port from being closed by the pressurizing piston.

In the braking system according to the above mode (18), the port is held in communication with the pressurizing chamber, so that the pressurizing chamber is held in communication with the master reservoir. For instance, the device for preventing the port from being closed by the pressurizing piston includes annular radial walls which are formed on the inner circumferential surface of the cylinder housing and with which the pressurizing piston fluid-tightly and slidably engages. In this case, the port will not be closed by the pressurizing piston, irrespective of the position of the pressurizing piston relative to the cylinder housing.

(19) A hydraulically operated braking system according to any one of the above modes (1)—(19), wherein the master cylinder includes (a) a first pressurizing piston operatively connected to the brake operating member partially defining a first pressurizing chamber whose volume decreases as the first pressurizing piston is moved, (b) a second pressurizing piston which the partially defines the first pressurizing chamber and a second pressurizing chamber in front of the first pressurizing chamber, so as to separate the first and second pressurizing chambers from each other, and which is movable relative to the first pressurizing piston, (c) a second pressurizing chamber pressurizing device for pressurizing the fluid in the second pressurizing chamber by supplying a pressurized fluid from a pressure source external to the master cylinder, into the second pressurizing chamber, and (d) a volume reduction preventing device for permitting the volume of the first pressurizing chamber to be increased as the first pressurizing piston is advanced from an original position thereof while said second pressurizing piston is placed in an original position thereof, and for preventing the volume of the first pressurizing chamber from being reduced when the fluid pressure in the second pressurizing chamber is increased by the second pressurizing chamber pressurizing device while said second pressurizing piston is placed in said original position.

In the master cylinder of the braking system according to the above mode (19), the first and second pressurizing chambers of the master cylinder are separated from each other by the second pressurizing piston. As the brake operating member is operated, the first pressurizing piston is advanced, and the volume of the first pressurizing chamber is reduced so as to increase the fluid pressure in the first pressurizing chamber. As a result, the second pressurizing piston is advanced so as to increase the fluid pressure in the second pressurizing chamber. The volume reduction preventing device prevents reduction of the volume of the first pressurizing chamber due to an increase in the fluid pressure in the second pressurizing chamber with an advancing movement of the first pressurizing piston from the original position while the first pressurizing piston is placed in the original position. Therefore, the fluid pressure in the second pressurizing chamber can be increased by the second pressurizing chamber pressurizing device by supplying the pressurized fluid from the external pressure source to the second pressurizing chamber, without increasing the fluid pressure in the first pressurizing chamber. Thus, the fluid pressure in the brake cylinder communicating with the second pressurizing chamber can be increased without increasing the fluid pressure in the brake cylinder communicating with the first pressurizing chamber. When the brake operating member is operated in this condition, the first pressurizing piston is permitted to be advanced by the operated brake operating member, so that the fluid pressure in the first pressurizing chamber is increased, to increase the fluid pressure in the brake cylinder communicating with the first pressurizing chamber. When the brake operating member is operated while the fluid pressure in the second pressurizing chamber is relatively high, a sufficient amount of the pressurized fluid can be supplied from the first pressurizing chamber to the corresponding brake cylinder, so that this brake cylinder can be actuated without a trouble.

The second pressurizing chamber pressurizing device may be a device exclusively used for pressurizing the second pressurizing chamber independently of the assisting device. Alternatively, the assisting device may be utilized as the second pressurizing chamber pressurizing device.

The feature of the above mode (19) may be available independently of the feature of any one of the above modes (1)–(18).

(20) A hydraulically operated braking system according to the above mode (19), wherein the original position of the second pressurizing piston is a fully retracted position thereof, and the volume reduction preventing device is a stopper device for preventing a movement of the second pressurizing piston from the fully retracted position in a direction opposite to a direction of an advancing movement of the second pressurizing piston.

When the second pressurizing piston is placed in the fully retracted position, the second pressurizing piston is not moved from the fully retracted position in the retracting direction even when the fluid pressure in the second pressurizing chamber is increased. Accordingly, an increase in the fluid pressure in the second pressurizing chamber will not cause the volume of the first pressurizing chamber to be reduced. The stopper device may be provided at an intermediate portion or rear end portion of the master cylinder.

(21) A hydraulically operated braking system according to the above mode (19) or (20), wherein the second pressurizing piston includes a partition portion for dividing an interior of a cylinder housing of the master cylinder into the first and second pressurizing chambers, and a cylindrical portion disposed on one side of the partition portion which is on the side of the first pressurizing piston, the original position of the second pressurizing piston being defined by an abutting contact of a rear open end face of the cylindrical portion with a rear end face of the cylinder housing, the stopper device including said rear open end face of said cylindrical portion and said rear end face of said cylinder housing, and wherein the first pressurizing piston is slidably fitted in the cylindrical portion of the second pressurizing piston.

The fully retracted position of the second pressurizing piston is defined by the abutting contact of the rear open end face of the cylindrical portion of the second pressurizing piston and the rear end face of the cylinder housing of the master cylinder.

While the second pressurizing piston is movable relative to the cylinder housing of the master cylinder, it is not desirable that the relative movement of the second pressurizing piston and the cylinder housing is effected such that the outer circumferential surface of the cylindrical portion is in contact with the inner circumferential surface of the cylinder housing. In this respect, it is desirable to form an annular radial wall on one of the outer circumferential surface of the cylindrical portion and the inner circumferential surface of the cylinder housing, so that the other of those outer and inner circumferential surfaces fluid-tightly and slidably engages the annular radial wall. The annular radial wall may be formed on both of those outer and inner circumferential surfaces so that the annular radial walls formed on these circumferential surfaces engage the circumferential surfaces.

The partition portion of the second pressurizing piston indicated above may take the form of a cylinder or a circular disc. The partition portion may be formed either integrally with or separately from the cylindrical portion which has the rear open end face indicated above. For instance, the second pressurizing piston may consist of two integrally formed cylindrical portions one of which has the rear open end face indicated above and the other of which has a bottom wall serving as the partition portion.

(22) A hydraulically operated braking system according to the above mode (21), wherein the first pressuring chamber includes an inner fluid chamber formed within the cylindrical portion of the second pressurizing piston and in front of the first pressurizing piston, and an outer annular fluid chamber formed between an outer circumferential surface of the second pressurizing piston and an inner circumferential surface of the cylinder housing, the cylindrical portion having a communication passage for fluid communication between the inner fluid chamber and the outer annular fluid chamber.

In the braking system according to the above mode (22), the fluid is supplied from the first pressurizing chamber into the outer annular fluid chamber, and then into the brake cylinder. The outer annular fluid chamber may be a variable-volume fluid chamber whose volume is reduced as the second pressurizing chamber is advanced, or a constant-volume fluid chamber whose volume is held constant. However, the fluid pressure in the outer annular fluid chamber can be made higher when this fluid chamber is a variable-volume fluid chamber.

The variable-volume outer annular fluid chamber may be defined by the inner circumferential surface of the cylinder housing, the outer circumferential surface of the second pressurizing piston, a first annular radial wall formed on the inner circumferential surface of the cylinder housing, and a second annular radial wall formed on the outer circumferential surface of the second pressurizing piston. The first annular radial wall is formed in front of the second annular radial wall. The partition wall fluid-tightly and slidably engages the first annular-radial wall, while the cylindrical portion fluid-tightly and slidably engages the second annular radial wall. In this arrangement, the volume of the variable-volume outer annular fluid chamber is reduced as the second pressurizing piston is advanced. Where the partition portion takes the form of a cylinder, the maximum operating stroke of the second pressurizing piston can be made comparatively large, so that the amount of change of the volume of the variable-volume outer annular fluid chamber can be made relatively large, and the weight of the partition portion can be reduced.

(23) A hydraulically operated braking system according to the above mode (22), wherein the outer annular fluid chamber has a volume which is reduced as the second pressuring piston is advanced, and the communication passage functions as a fluid flow restrictor for restricting a flow of the fluid between the inner fluid chamber and the outer annular fluid chamber.

In the braking system according to the above mode (23), there may arise a difference between the fluid pressures in the inner fluid chamber and the outer annular fluid chamber, in the presence of the fluid flow restrictor therebetween. When the brake operating member is operated at a relatively high speed so as to rapidly reduce the volume of the inner fluid chamber, the fluid flow from the inner fluid chamber into the variable-volume outer annular fluid chamber is restricted by the fluid flow restrictor, so that the fluid pressure in the inner fluid chamber is increased, thereby causing a fluid pressure difference between the outer and inner fluid chambers. On the basis of this fluid pressure difference, the second pressurizing piston having a larger pressure-receiving surface area is advanced, and the volume of the variable-volume outer annular fluid chamber is reduced. As a result, the fluid pressure in the brake cylinder can be increased at a higher rate when the second pressuring piston is advanced, than when the first pressurizing piston whose pressure-receiving surface area is smaller than that of the second pressurizing piston is advanced relative to the second pressurizing piston.

(24) A hydraulically operated braking system according to any one of the above modes (19)–(23), wherein the second pressurizing chamber is connected to a wheel brake cylinder as the brake cylinder for braking a drive wheel of an automotive vehicle, the braking system further comprising a solenoid-operated shut-off valve which is disposed between the second pressurizing chamber pressurizing device and the second pressurizing chamber and which has an open position for fluid communication between the second pressurizing chamber pressurizing device and the second pressurizing chamber, and a closed position for disconnecting the second pressurizing chamber pressuring device and the second pressurizing chamber from each other, and a drive wheel braking pressure control device for controlling the fluid pressure in the drive wheel brake cylinder while the solenoid-operated shut-off valve is held in said open state.

In the braking system according to the above mode (24), the fluid can be supplied from the second pressurizing chamber pressurizing device to the second pressurizing chamber through the solenoid-operated shut-off valve held in the open state, so that the fluid pressure in the drive wheel brake cylinder can be increased. The pressure of the fluid delivered from the second pressurizing chamber pressurizing device may be controllable or may be held constant. Where the output pressure of the second pressurizing chamber pressurizing device is held constant, it is preferable to provide a fluid pressure control valve device between the second pressurizing chamber and the drive wheel brake cylinder, for controlling the fluid pressure to be applied to the drive wheel brake cylinder.

The drive wheel braking pressure control device may include at least one of a drive wheel traction control device and a vehicle running or turning stability control device. In a drive wheel traction control effected by the drive wheel traction control device, the pressurizing fluid can be supplied to the drive wheel brake cylinder with the solenoid-operated shut-off valve held in the open state, without an operation of the brake operating member, and the fluid pressure in the drive wheel brake cylinder can be controlled to optimize the slipping state of the drive wheel being driven. In this condition, the first pressurizing piston can be advanced, so that the fluid pressure in the first pressurizing chamber can be rapidly increased by an operation of the brake operating member. Thus, the vehicle can be braked with a high response to the operation of the brake operating member, even while the drive wheel traction control is effected. A vehicle turning stability control for braking the wheel brake cylinder so as to control the yaw moment of the vehicle can be similarly effected under the control of the vehicle turning stability control device.

The assisting device described above with respect to the above mode (3) can be utilized as the second pressurizing chamber pressurizing device, and a solenoid-operated shut-off valve which may be included in the emergency fluid communicating device described with respect to the above mode (9), (10), (12) or (14) may be utilized as the solenoid-operated shut-off valve in the braking system of the above mode (24). The solenoid-operated shut-off valve may be considered to be included in the second pressurizing chamber pressurizing device or in the drive wheel braking pressure control device.

(25) A hydraulically operated braking system according to any one of the above modes (1)–(24), further comprising a brake operating force estimating device for estimating an operating force acting on the brake operating member, on the basis of the fluid pressure in the pressurizing chamber and the assisting drive force produced by the assisting device.

In the hydraulically operated braking system according to the above mode (25), the operating force acting on the brake operating member is estimated by the brake operating force estimating device, on the basis of the fluid pressure in the pressurizing chamber of the master cylinder and the assisting drive force produced by the assisting device. Therefore, the instant braking system eliminates a brake operating force detecting device for detecting the operating force of the brake operating member, so that the cost of manufacture of the present braking system can be reduced. To control the assisting device, it is required to use a master cylinder pressure detecting device for detecting the fluid pressure in the pressurizing chamber, and an assisting drive force detecting device for detecting the assisting drive force produced by the assisting device. Where the assisting drive force corresponds to the fluid pressure in the assisting pressure chamber described above with respect to the above mode (3), the assisting drive force detecting device may be adapted to detect the fluid pressure in the assisting pressure chamber. These master cylinder pressure detecting device and the assisting drive force detecting device may be utilized to estimate the operating force of the brake operating member, so that the operating force detecting device may be eliminated. Even where the operating force detecting device is used, it is not required to be an expensive one that is capable of accurately detecting the brake operating force over a sufficiently wide range. That is, the brake operating force estimating device may be used together with a relatively inexpensive brake operating force detecting device. In this case, the output of the brake operating force detecting device is used where the output is sufficiently accurate, and the output of the brake operating force estimating device is used where the output of the brake operating force detecting device is not sufficiently accurate. In this case, too, the braking system is available at a relatively low cost.

As described in detail in the DETAILED DESCRIPTION OF THE PREFERRED EMBODIMENTS, the brake operating force can be estimated as described below, by way of example. Where the master cylinder and the assisting cylinder are disposed in parallel with each other, as illustrated in FIG. 2, the operating force F can be estimated according to the following equation:

$$F = F_M \times L_M / L_F - F_S \times L_S / L_F$$

where, $F_S$: assisting drive force, $F_M$: force (which may be considered a braking force) based on the fluid pressure in the pressurizing chamber of the master cylinder, $L_S$: distance between the fulcrum of the brake operating member and a point at which a force based on the fluid pressure in the assisting pressure chamber acts on the brake operating member, $L_M$: distance between the fulcrum and a point at which the force based on the fluid pressure in the pressurizing chamber acts on the brake operating member, $L_F$: distance between the fulcrum and a point at which the brake operating force F acts on the brake pedal.

The force $F_M$ is equal to a product of the fluid pressure $P_M$ in the pressurizing chamber of the master cylinder and a pressure-receiving surface area $S_M$ of the pressurizing piston. That is, $F_M = P_M \cdot S_M$. The assisting drive force $F_S$ is a product of the fluid pressure $P_S$ in the assisting pressure chamber and a pressure-receiving surface area $S_S$ of the assisting piston. That is, $F_S = P_S \cdot S_S$.

Where the master cylinder and the assisting cylinder are disposed in series with each other, as illustrated in FIG. 16, the distances $L_S$ and $L_M$ are equal to each other, and the brake operating force F can be estimated according to the following equation:

$$F = (F_M - F_S) \times L_M / L_F$$

The pressure-receiving surface area $S_S$ of the assisting piston is equal to $(S_M - S_0)$ which is smaller than the pressure-receiving surface area $S_M$ of the pressurizing piston.

Where the brake operating force detecting device is adapted to detect, as the brake operating force F, a reaction force F' applied from the pressurizing piston to the brake operating member, the reaction force F' and the brake operating force F have a relationship represented by the following equation:

$$F' = F \times L_F / L_M$$

Therefore, the reaction force F' can be estimated according to the following equation:

$$F' = F_M - F_S$$

The feature of the above mode (25) is available independently of the feature of any one of the above modes (1)–(24).

(26) A hydraulically operated braking system according to any one of the above modes (1)–(25), wherein the master cylinder includes a cylinder housing which cooperates with the pressurizing piston to define the pressuring chamber, the braking system further comprising a master cylinder characteristic control device for controlling an amount of the fluid in the pressurizing chamber of the master cylinder, to thereby control a relationship between a position of the pressurizing piston relative to the cylinder housing and the fluid pressure in the pressurizing chamber.

In the braking system according to the above mode (26), the amount of the fluid in the pressurizing chamber of the master cylinder can be changed by the master cylinder characteristic control device, so that the relative position of the pressurizing piston and the cylinder housing can be changed, whereby the relationship between this relative position and the fluid pressure in the pressurizing chamber can be changed by the master cylinder characteristic control device. That is, the fluid pressurizing characteristic of the master cylinder can be controlled by the master cylinder characteristic control device. When the brake operating member is operated, the pressurizing piston is advanced so as to reduce the volume of the pressurizing chamber. When the fluid is supplied from the master cylinder characteristic control device to the pressurizing chamber, upon operation of the brake operating member, the operating stroke of the pressurizing piston is reduced by an amount corresponding to the amount of the fluid supplied to the pressurizing chamber. When the fluid is discharged from the pressurizing chamber into the master cylinder characteristic control device, the operating stroke of the pressurizing piston is increased by an amount corresponding to the amount of the fluid discharged from the pressurizing chamber. Namely, the operating stroke of the pressurizing piston decreases with an increase in the amount of the fluid supplied to the pressurizing chamber, and increases with a decrease in the amount of the fluid discharged from the pressurizing chamber. Thus, the operating stroke of the pressurizing piston can be controlled by controlling the amount of the fluid in the pressurizing chamber, so that the relationship between the operating stroke and the fluid pressure in the pressuring chamber (hereinafter referred to as "master cylinder pressure") can be controlled by the master cylinder characteristic control device.

The master cylinder characteristic control device may be adapted to control the amount of the fluid in the pressurizing piston, depending upon the operating stroke of the pressurizing piston, or irrespective of the operating stroke. The amount of the fluid to be supplied to or discharged from the pressurizing chamber may be controlled such that the master cylinder pressure linearly increases with an increase in the operating stroke of the pressurizing piston. Alternatively, a predetermined amount of the fluid may be rapidly supplied from the master cylinder characteristic control device to the pressurizing chamber during an initial idling stroke of the brake operating member following the initiation of an operation of the brake operating member detected by a suitable switch. In the former case, the master cylinder pressure is controlled to correspond to the operating stroke of the brake operating member, that is, the amount of operation of the brake operating member by the operator. In the latter case, the predetermined amount of the fluid to be supplied to the pressurizing chamber may be equal to the amount of the fluid required for the so-called "fast filling" of the master cylinder, or a portion of the "fast filling" amount. In this case, the required operating stroke of the brake operating member can be reduced. Further, a predetermined constant amount of the fluid may be supplied to the pressurizing chamber for a unit amount of increase of the operating stroke of the pressurizing piston. The required operating stroke can be reduced with an increase in this constant amount of the fluid. When the fluid is discharged from the pressurizing chamber into the master cylinder characteristic control device, the required operating stroke increases with an increase in the amount of the fluid discharged from the pressurizing chamber.

As described above, the master cylinder characteristic control device permits the operating stroke of the pressurizing piston to be controlled with respect to the master cylinder pressure. In this respect, the master cylinder characteristic control device may be considered to be a device for controlling the operating stroke of the pressurizing piston. The control of the operating stroke will become more apparent by the following explanation.

The master cylinder pressure increases with an operating force acting on the brake operating member as the pressurizing piston is advanced with an operation of the brake operating member by the operating force. If a certain amount of the fluid is supplied from the master cylinder characteristic control device to the pressurizing chamber while the operating force is held constant, the pressurizing piston is retracted, by a distance corresponding to the amount of the fluid supplied to the pressurizing chamber, so that the required operating stroke of the pressurizing piston is reduced. Conversely, if a certain amount of the fluid is discharged from the pressurizing chamber into the master cylinder characteristic control device, the required operating stroke is increased. Thus, the master cylinder characteristic control device is capable of controlling the required operating stroke of the pressurizing piston.

The feature of the above mode (26) is available independently of the feature of any one of the features of the above modes (1)–(25).

(27) A hydraulically operated braking system according to the above mode (26), wherein the master cylinder characteristic control device comprises: a cylinder housing; a volume-changing piston received in the cylinder housing of the master cylinder characteristic control device such that the volume-changing piston is movable relative to the cylinder housing of the master cylinder characteristic control device, the volume-changing piston cooperating with the cylinder housing of the master cylinder characteristic control device to define a variable-volume chamber communicating with the pressurizing chamber; and a fluid amount control device for controlling a relative position of the volume-changing piston and the cylinder housing of the master cylinder characteristic control device, to control a volume of the variable-volume chamber, for thereby controlling the amount of the fluid in the pressurizing chamber.

In the braking system according to the above mode (27) wherein the pressurizing chamber and the variable-volume chamber communicate with each other, the amount of the fluid in the pressurizing chamber can be controlled by controlling the volume of the variable-volume chamber. The fluid is supplied into the pressurizing chamber when the volume of the variable-volume chamber is reduced, and the fluid is discharged from the pressurizing chamber when the volume of the variable-volume chamber is increased. Thus, by controlling the amount of change of the volume of the variable-volume chamber, the amount of the fluid to be supplied to the pressurizing chamber and the amount of the fluid to be discharged from the pressurizing chamber can be controlled.

The volume of the variable-volume chamber is changed by moving the volume-changing piston. The volume-changing piston may be moved by a fluid pressure or an electric actuator such as an electric motor and a piezoelectric device.

Where the volume-changing piston is moved by a fluid pressure, the cylinder housing of the master cylinder characteristic control device cooperates with the volume-changing piston to define a volume control chamber on one side of the volume-changing piston which is remote from the variable-volume chamber. The volume-changing piston is moved to a position of equilibrium between the fluid pressure in the volume control chamber and the fluid pressure in the variable-volume chamber. In this case, the fluid amount control device includes a high-pressure source, a reservoir, a solenoid-operated pressure control valve device connected to the high-pressure source, reservoir and volume control chamber, and a control valve control device for controlling the solenoid-operated pressure control valve device to control the fluid pressure in the volume control chamber. The cylinder housing and the volume control piston which define the variable-volume chamber and the volume control chamber are considered to constitute a master cylinder characteristic control cylinder for controlling the pressurizing characteristic of the master cylinder. This master cylinder characteristic control cylinder may be considered to be a stroke adjusting cylinder for adjusting the operating stroke of the pressurizing piston and the operating stroke of the brake operating member. The stroke adjusting cylinder may be used to reduce the required operating stroke of the pressurizing piston.

Where the volume control piston is moved by a drive force produced by an electric actuator. The position of the volume control piston and the velocity of movement of this piston can be controlled by controlling the electric actuator. The fluid amount control device may include such an electric actuator, a motion converting or transmitting mechanism for transmitting a motion or displacement of the electric actuator to the volume-changing piston, and an actuator control device for controlling the electric actuator.

(28) A hydraulically operated braking system according to the above mode (27), wherein the fluid amount control device includes a master cylinder pressurizing control means for controlling the amount of the fluid in the pressurizing chamber, on the basis of an operating stroke of the pressurizing piston and according to a predetermined rule.

In the braking system according to the above mode (28), the fluid in the pressurizing chamber is controlled to control the fluid pressurizing of the master cylinder, on the basis of the operating stroke of the pressurizing piston and according to the predetermined rule. The relationship between the operating stroke of the pressurizing piston and the amount of the fluid in the pressurizing chamber can be changed by changing the rule. For instance, the predetermined rule may be a predetermined relationship between the operating stroke S of the pressurizing piston and the fluid pressure $P_M$ (master cylinder pressure) in the pressurizing chamber of the master cylinder. An example of this relationship is indicated by solid line in FIG. 4, which relationship is represented by an equation $P_M = k \cdot S^2$. The relationship may be represented by an equation $P_M = k(S-a)^2 + b$.

If the assisting drive force is controlled by the assisting device force control device as described above with respect to the above mode (2) of this invention, a relationship between the power of the brake operating force and the master cylinder pressure $P_M$ may be controlled as indicated in the graph of FIG. 5, and a relationship between the operating stiffness of the brake operating member and the master cylinder pressure $P_M$ may be controlled as indicated in the graph of FIG. 6. Each of these relationships may be considered to be an example of the fluid pressurizing characteristic of the master cylinder, and may also be considered to be a characteristic of the braking effect to be provided by the present braking system. The power is a ratio of an amount or change of the master cylinder pressure $P_M$ to an amount of change of a product of the operating stroke S and force F of the brake operating member. That is, the power is represented by $[dP_M/(S \cdot dF = F \cdot dS)]$. On the other hand, the operating stiffness is a ratio of an amount of change of the operating force F to an amount of change of the operating stroke S, that is, $dF/ds$.

(29) A hydraulically operated braking system according to any one of the above modes (26)–(28), wherein the master cylinder characteristic control device has a variable-volume chamber connected to a braking fluid chamber in the brake cylinder and the pressurizing chamber of the master cylinder, and includes a fluid amount control device for controlling a volume of the variable-volume chamber to control the amount of the fluid in the pressurizing chamber, the braking system further comprising an emergency master cylinder disconnecting device disposed between the variable-volume chamber and the pressurizing chamber, the emergency master cylinder disconnecting device being normally placed in an open state for fluid communication between the variable-volume chamber and the pressurizing chamber, and brought to a closed state for disconnecting the variable-volume chamber and the pressurizing chamber from each other in the event of an abnormality of the assisting device.

The volume of the variable-volume chamber can be controlled by the fluid amount control device. However, if the volume of the variable-volume chamber is reduced while the variable-volume chamber is disconnected from the pressurizing chamber, the fluid pressure in the variable-volume chamber is increased, Accordingly, the fluid pressure in the braking fluid chamber in the brake cylinder can be made higher than that in the pressurizing chamber, by disconnecting the variable-volume chamber from the pressurizing chamber, even in the event of abnormality of the assisting device, that is, even if the fluid pressure in the pressurizing chamber cannot be sufficiently increased with the assisting drive force being zero or extremely small.

The assisting device may include the assisting cylinder, high-pressure source, reservoir, solenoid-operated pressure control valve device and control valve control device, as described above with respect to the above mode (3), and the master cylinder characteristic control device may include a master cylinder characteristic control cylinder, and another set of a high-pressure source, a reservoir, a solenoid-operated pressure control valve device and a control valve control device, so that the volume of the variable-volume chamber is controlled by the fluid pressure in the master, cylinder characteristic control cylinder. In this case, a single high-pressure source may be commonly used by the assisting device and the master cylinder characteristic control device. If the pressure of the pressurized fluid of the single high-pressure source is lowered below a predetermined lower limit due to an abnormality of the high-pressure source, it is difficult to sufficiently pressurize the fluid in the variable-volume chamber even when the emergency master cylinder disconnecting device is switched to the closed state. In this case, it is difficult to increase the fluid pressure in the brake cylinder to be higher than that in the master cylinder pressure. However, the pressurized fluid can be supplied from the high-pressure source to the variable-volume chamber of the master cylinder characteristic control device, while the high-pressure source is normal, even in the event of an abnormality of the solenoid-operated pressure control valve device or control valve control device of the assisting device, a fluid leakage from the fluid passages connected to the high-pressure source, reservoir, solenoid-operated pressure control valve device and assisting pressure chamber, or a failure of the assisting cylinder. Since the variable-volume chamber can be pressurized by the high-pressure source, the fluid pressure in the brake cylinder can be made higher than that in the pressurizing chamber of the master cylinder.

Where two high-pressure sources are provided for the assisting device and the master cylinder characteristic control device, respectively, or where the assisting device includes the high-pressure source described above while the master cylinder characteristic control device includes an electric actuator such as an electric motor to control the volume of the variable-volume chamber, it is also effective to switch the emergency master cylinder disconnecting device to the closed state in the event of an abnormality of the high-pressure source of the assisting device.

It is also effective to switch the emergency master cylinder disconnecting device to the closed state in the event of an abnormality of the assisting device, where the assisting device is adapted to control the assisting drive force by controlling an electric motor, as described above with respect to the above mode (4) while the master cylinder characteristic control device includes, the high-pressure source, or where the assisting device and the master cylinder characteristic control device have respective electric actuators.

(30) A hydraulically operated braking system comprising: (a) a brake operating member operable by an operator; (b) a master cylinder including a cylinder housing and a pressurizing piston operatively connected to the brake operating member and cooperating with the cylinder housing to define a pressurizing chamber, the pressurizing piston being moved by the brake operating member to pressurize a fluid in the pressurizing chamber; (c) a brake cylinder actuated by the pressurized fluid received from the master cylinder; and (d)

a master cylinder characteristic control device for controlling an amount of the fluid in the pressurizing chamber of the master cylinder, to thereby control a relationship between a position of the pressurizing piston relative to the cylinder housing and the fluid pressure in the pressurizing chamber, for controlling a fluid pressurizing characteristic of the master cylinder.

BRIEF DESCRIPTION OF THE DRAWINGS

The above and optional objects, features, advantages and technical and industrial significance of this invent-ion will be further clarified by reading the following detailed description of presently preferred embodiments or forms of the invention, by reference to the accompanying drawings, in which:

FIG. 3 is a graph indicating a relationship between brake pedal operating force and master cylinder fluid pressure controlled in the braking system of FIG. 1;

FIG. 4 is a graph indicating a relationship between the brake pedal operating stroke and the master cylinder fluid pressure controlled in the braking system of FIG. 1;

FIG. 5 is a graph indicating a relationship between the master cylinder fluid pressure and the power of brake pedal operating force when the fluid pressures in assisting pressure chamber of the assisting cylinder and volume control chamber of stroke adjusting cylinder are controlled in the braking system of FIG. 1;

FIG. 6 is a graph indicating a relationship between the master cylinder fluid pressure and the brake pedal operating stiffness when the fluid pressures in the assisting pressure chamber and the volume control chamber are controlled in the braking system of FIG. 1;

FIG. 23 is a view showing an example of control in various conditions in the braking system of FIG. 22;

FIG. 26 is a view showing an example of control in various conditions in the braking system of FIG. 24.

DETAILED DESCRIPTION OF THE PREFERRED EMBODIMENTS

Figure 1:
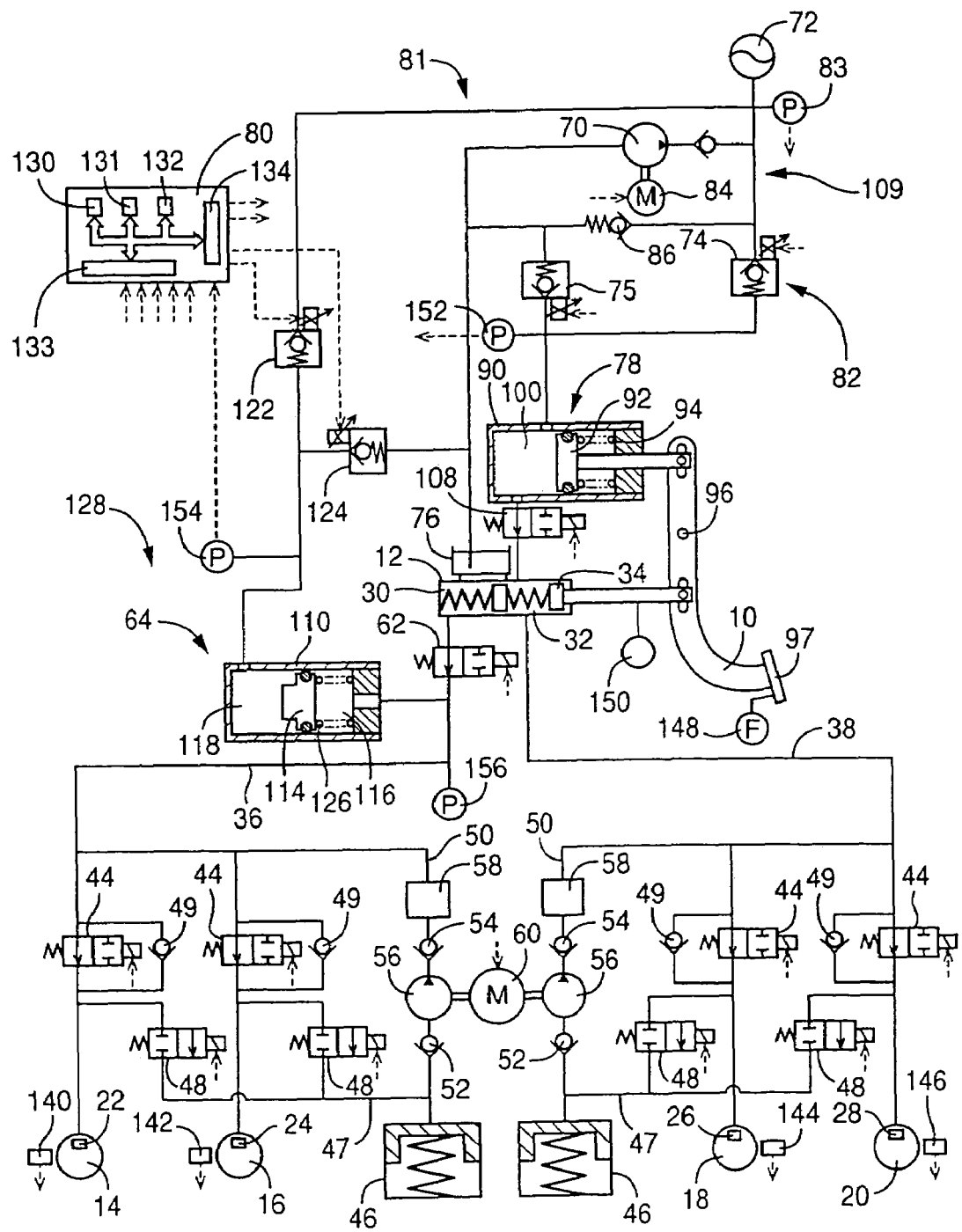
FIG. 1 is a circuit diagram showing a hydraulically operated braking system constructed according to a first embodiment of this invention.

Referring first to FIG. 1, the hydraulically braking system shown therein includes a normal braking system and a servo system which are independent of each other. The normal braking system includes a brake operating member in the form of a brake pedal 10, a master cylinder 12, and wheel brake cylinders 22, 24, 26, 28 for respective wheels 14, 16, 18, 20 of an automotive vehicle. The master cylinder 12 is a tandem type cylinder having two pressurizing chambers 30 and 32. A pressure of a working fluid in these pressurizing chambers 30, 32 are pressurized by an advancing movement of a pressurizing piston 34 operatively connected to the brake pedal 10. The fluid pressure in the pressurizing chambers 30, 32 changes with an operating force acting on the brake pedal 10. Two fluid passages 36, 38 are connected to the respective pressurizing chambers 30, 32.

Each of the fluid passages 36, 38 is split into two branches. The wheel brake cylinders 22, 24 are connected to the ends of the two branches of the fluid passage 36, while the wheel brake cylinders 26, 28 are connected to the ends of the two branches of the fluid passage 38. In each of the four branches of the fluid passages 36, 38, there is provided a pressure holding valve in the form of a solenoid-operated shut-off valve 44. The branches of each fluid passage 36, 38 are connected to a reservoir 46 through fluid passages 47. Four pressure reducing valves in the form of solenoid-operated shut-off valves 48 are provided in the fluid passages 47 so that the fluid can be discharged from the wheel brake cylinders 22, 24, 26, 28 into the reservoirs 451 through the respective pressure reducing shut-off valves 48 and the respective fluid passages 47. A check valve 49 is provided in a by-pass passage which by-passes each of the four pressure holding shut-off valves 4. Each of the check valves 49 allows a fluid flow in a direction from the corresponding wheel brake cylinder 22, 24, 26, 28 towards the master cylinder 12, and inhibits a fluid flow in the opposite direction. The check valves 49 permit the fluid to be rapidly returned from the wheel brake cylinders 22, 4, 26, 28 to the master cylinder 12 when the brake pedal 10 is released from an operated position towards the non-operated position while the pressure holding shut-off valves 44 are placed in their closed positions.

The two reservoirs 46 are connected to the respective fluid passages 36, 38 also through respective fluid passages 50. In each of the fluid passages-50, there are provided two check valves 52, 54, a pump 56 and a damper 58. The pump 56 is disposed between the two check valves 52, 54. The damper 58 functions to reduce pressure pulsation of the fluid delivered from the pump 56. The two pumps 56 are driven by a common electric motor 60.

In a portion of the fluid passage 36 between the pressurizing chamber 30 and the point of branching, there is provided a solenoid-operated shut-off valve 62. A stroke adjusting cylinder 64 is connected to a portion of the fluid passage 36 between the shut-off valve 62 and the point of branching. These shut-off valve 62 and the stroke adjusting cylinder 64 will be described.

The servo system of the present hydraulically operated braking system includes a pump 70, an accumulator 72, a pressure increase control valve 74, a pressure reduction control valve 76, a master reservoir 76 and an assisting cylinder 78. The pressure increase control valve 74 and the pressure reduction control valve 75 are controlled by a pressure control device 80 which is constituted principally by a computer. It will be understood from the following description that the above-indicated elements 70–78 and a portion of the pressure control device 80 assigned to control the control valves 74, 75 cooperate to constitute an assisting device 81 for boosting a drive force to be applied to the pressurizing piston 32 of the master cylinder 10. It will also be understood that the pressure increase control valve 74 and the pressure reduction control valve 75 constitute a major portion of a solenoid-operated pressure control valve device 82 of the assisting device 81.

The working fluid in the master reservoir 76 is pumped up and pressurized by the pump 70, and the pressurized fluid is stored in the accumulator 72. A pressure switch 83 is provided to monitor whether the pressure or the fluid stored in the accumulator 72 falls within a predetermined range. An electric motor 84 for driving the pump 70 is controlled according to an output signal of the pressure switch 83, so that the fluid pressure in the accumulator 72 is held substantially within the predetermined range.

Figure 7:
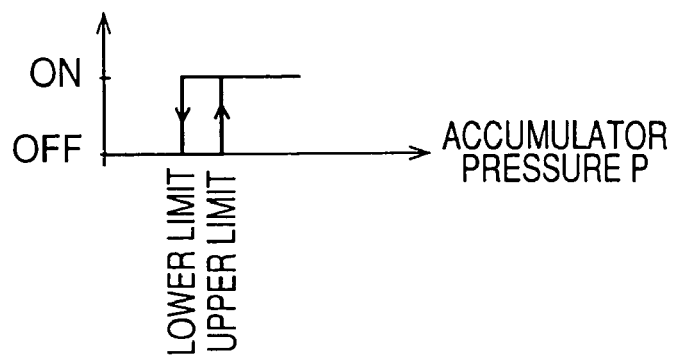
FIG. 7 is a graph indicating an operating characteristic of a pressure switch provided in the assisting device of the braking system of FIG. 1.

The pressure switch 83 has a plurality of switching portions, so that the pressure switch 83 is turned when the fluid pressure in the accumulator 72 (hereinafter referred to as "accumulator pressure") is lowered below a predetermined lower limit, and is turned ON when the accumulator pressure rises above a predetermined upper limit, as indicated in the graph of FIG. 7. The electric motor 84 is turned ON when the pressure switch 83 is turned OFF, and is turned OFF when the pressure switch 83 is turned ON. The electric motor 84 is kept operated while the pressure switch 83 is OFF, so that the accumulator pressure is held within the predetermined range defined by the lower and upper limits indicated above.

Figure 8:
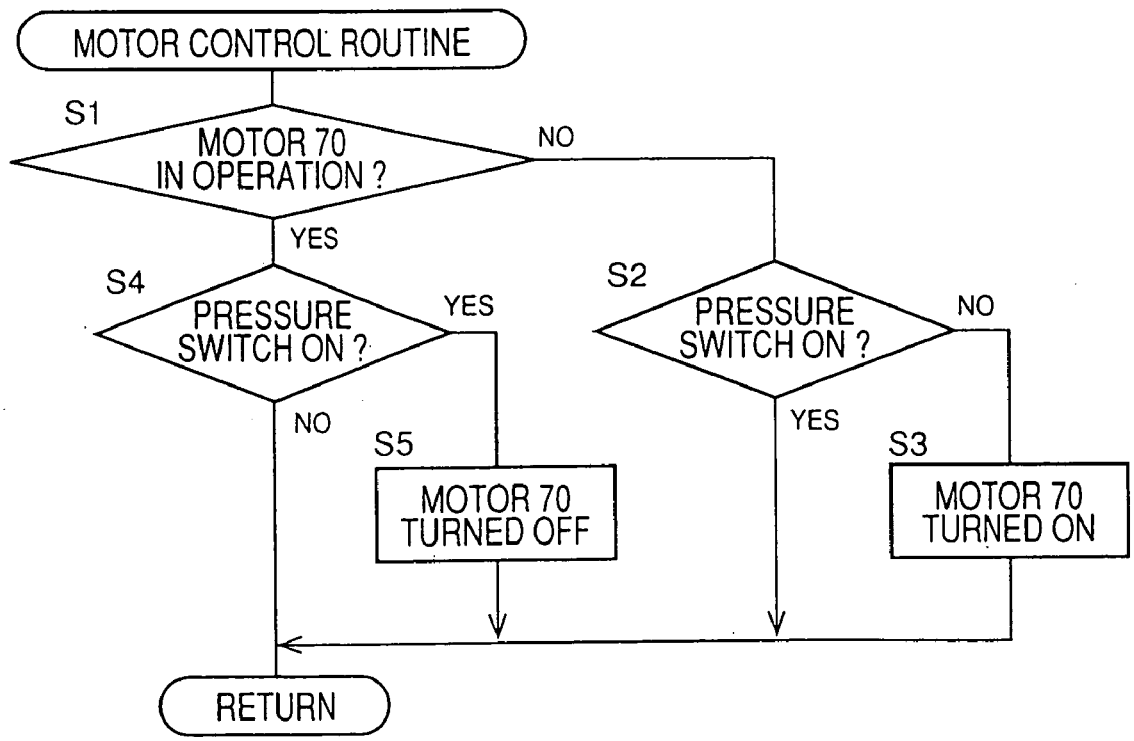
FIG. 8 is a flow chart illustrating a motor control routine executed according to a program stored in a ROM of a pressure control device of the braking system of FIG. 1, for controlling a pump drive electric motor used in the assisting device.

The electric motor 84 is controlled by the pressure control device 80 depending upon the output signal of the pressure switch 83, according to a motor control routine illustrated in the flow chart of FIG. 8. This routine is initiated with step S1 to determine whether the electric motor 84 is in operation. If a negative decision (NO) is obtained in step S1, the control flow goes to step S2 to determine whether the pressure switch 83 is in the ON state. If the pressure switch 83 is in the ON state, the electric motor 84 is held OFF. If the pressure switch 83 is in the OFF state, that is, if the accumulator pressure is lower than the lower limit, a negative decision (NO) is obtained in step S2, and the control flow goes to step S3 to turn ON the electric motor 84. If an affirmative decision (YES) is obtained in step S1, that is, if the electric motor 84 is in operation or in the ON state, step 14 is implemented to determine whether the pressure switch 83 is in the ON state. If the pressure switch 83 is in the ON state, that is, if the accumulator pressure is higher than the upper limit, a negative decision (NO) is obtained in step S3, and the control flow goes to step S4 to turn OFF the electric motor 60. If an affirmative decision (YES) is obtained in step S4, the electric motor 84 is held in operation.

A pressure relief valve 86 is provided between the delivery side of the pump 70 and the reservoir 76, to prevent an excessive rise of the delivery pressure of the pump 70.

The assisting cylinder 78 includes a cylinder housing 90, an assisting piston 92 fluid-tightly and slidably received in the cylinder housing 90, and a return spring 94 disposed between the assisting piston 92 and one of the opposite axial ends of the cylinder housing 9G.

Figure 2:
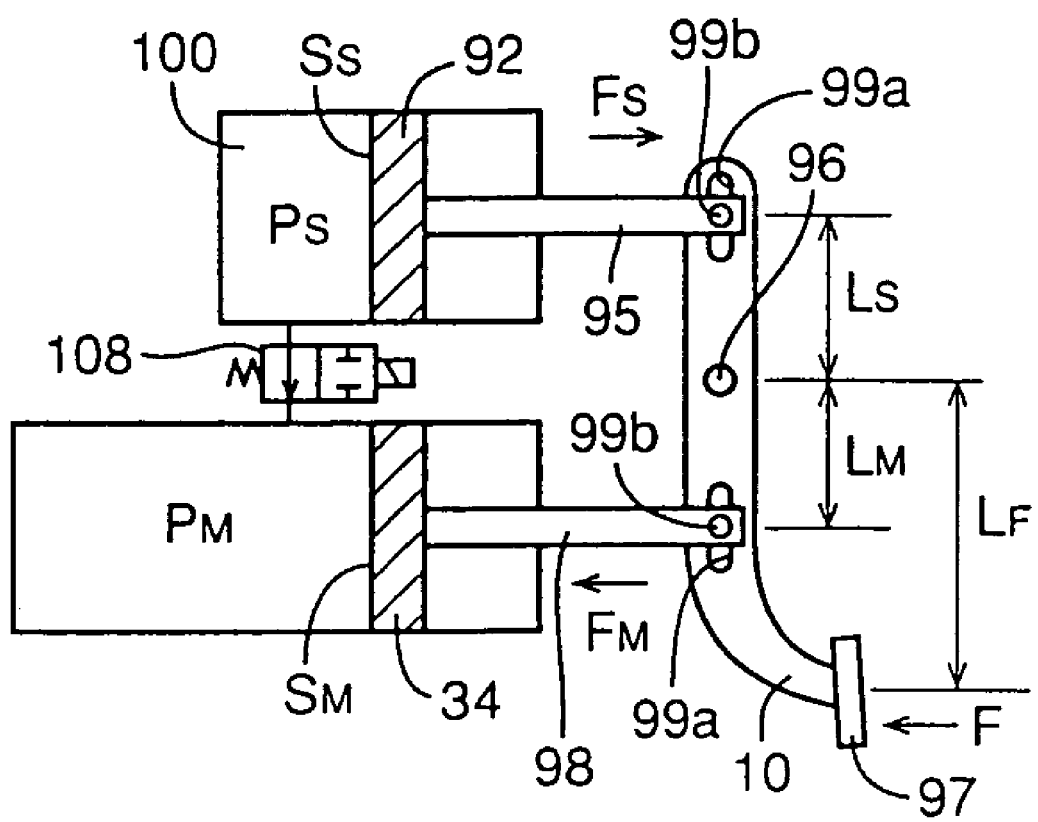
FIG. 2 is a view schematically showing a brake pedal connected to a master cylinder and an assisting cylinder 78 of an assisting device in the braking system of FIG. 1.

As shown in FIG. 2, the assisting piston 92 is operatively connected to the brake pedal 10 by a piston rod 95. The brake pedal 10 has a fulcrum 96 at an intermediate portion thereof between the lower end having a pedal pad 97 and the upper end. The piston rod 95 engages a portion of the brake pedal 10 between the fulcrum 96 and the upper end, more precisely, near the upper end. On the other hand, the pressurizing piston 34 of the master cylinder 12 is operatively connected by a piston rod 98 to a portion of the brake pedal 10 between the brake pad 97 and the fulcrum 96. As indicated in FIG. 2, the points of engagement of the rods 95, 98 with the brake pedal 10 and the fulcrum 96 line on a straight line, and the fulcrum 96 is spaced from the center of the pedal pad 97 by a distance $L_F$ in the direction parallel to the straight line. The point of engagement of the rod 98 with the brake pedal 10 is spaced from the fulcrum 96 by a distance $L_M$, while the point of engagement of the rod 95 with the brake pedal 10 is spaced from the fulcrum 96 by a distance $L_S$.

The rods 98 of the pressurizing piston 34 of the master cylinder 12 and the rod 95 of the assisting piston 92 of the assisting cylinder 78 engage the brake pedal 10 such that the rods 98, 95 are pivotable relative to the brake pedal 10 and such that the engaging ends of the rods 98, 95 are movable relative to the brake pedal 10 in the longitudinal direction of the brake pedal 10 (in the direction parallel to the straight line indicated above). To this end, the brake pedal 10 has elongate two elongate holes 99a while the rods 98, 95 have respective pins 99b engaging the respective elongate holes 99a. In this arrangement, the engaging ends of the rods 98, 95 are movable in the longitudinal direction of the brake pedal 10 while maintaining the predetermined constant distances $L_M$, $L_S$ between the fulcrum 96 and the engaging ends.

Referring back to FIG. 1, the cylinder housing 90 and the assisting piston 92 cooperate to define a spring chamber and an assisting pressure chamber 100 on the opposite sides of the assisting piston 92. The return spring 94 is disposed in the spring chamber, which communicates with the atmosphere. The assisting pressure chamber 100 communicates with the accumulator 72 and the master reservoir 76 through the pressure increase control valve 74 and the pressure reduction control valve 75, respectively. The fluid pressure in the assisting pressure chamber 100 is controllable by controlling the control valves 74, 75.

Figure 11:
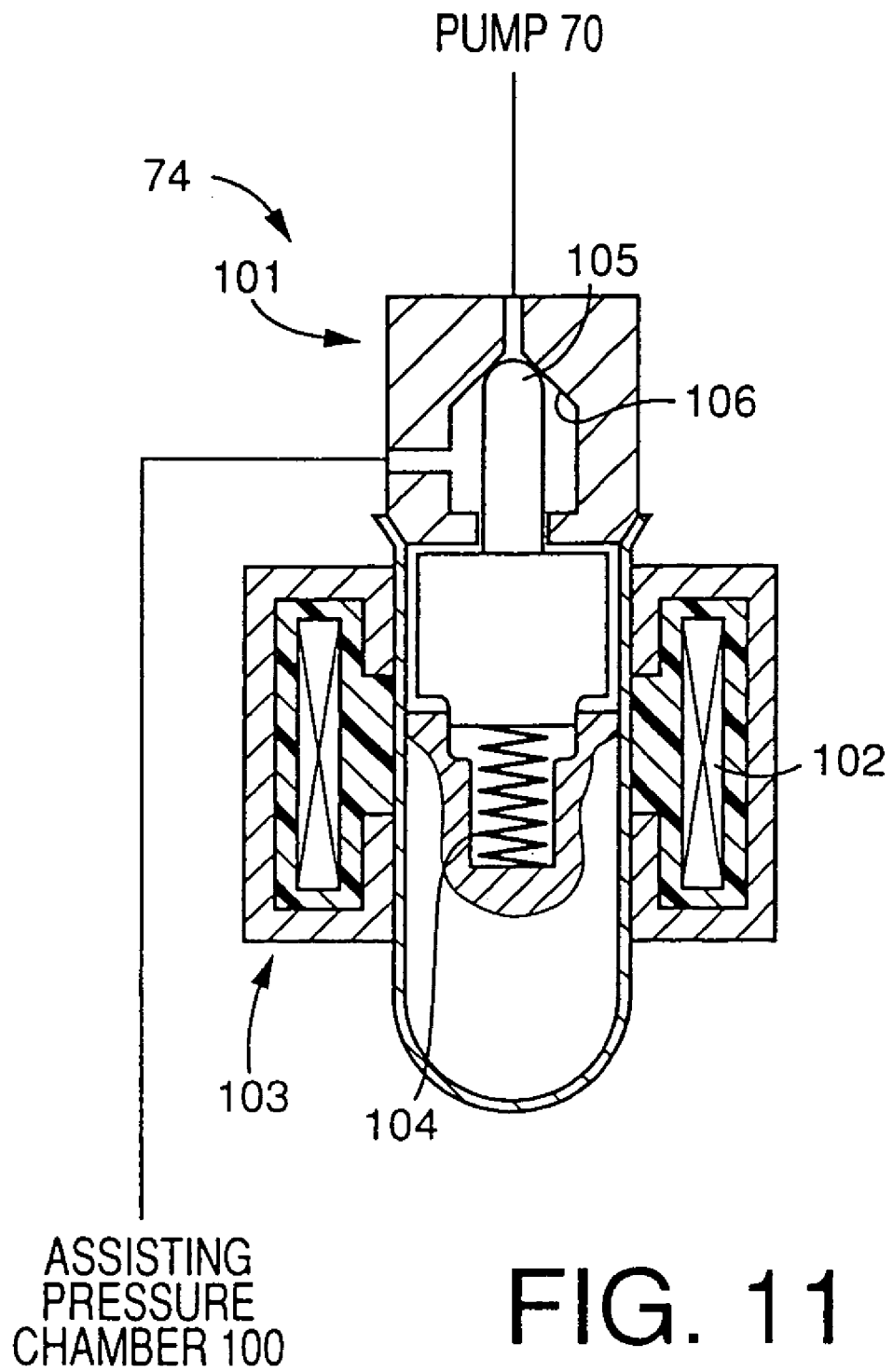
FIG. 11 is an cross sectional view of a pressure increase control valve included in the assisting device.

The pressure increase and pressure reduction control valves 74 and 75 are identical in construction with each other. The following description of the pressure increase control valve 74 substantially applies to the pressure reduction control valve 75. The pressure reduction control valve 74 is disposed between the delivery side of the pump 70 and the assisting pressure chamber 100. As shown in FIG. 11, the pressure reduction control valve 74 includes an electromagnetic force generating device 103, and a spring 104. The electromagnetic force generating device 103 includes a seating valve 10L and a coil 102. The seating valve 10L has a valve member 105 and a valve seat 106. A force corresponding to a fluid pressure difference across the seating valve 101 acts on the valve member 105 in a direction that causes the valve member 105 to be spaced away from the valve seat 106. On the other hand, a biasing force of the spring 104 acts on the valve member 105 in a direction that causes the valve member 105 to be seated on the valve seat 106. Further, an electromagnetic force generated by application of an electric current to the coil 102 of the electromagnetic force generating device 103 acts on the valve member 105 so as to move it away from the valve seat 106. The electromagnetic force can be controlled by controlling the electric current applied to the coil 102.

As described above, the force based on the fluid pressure difference, the electromagnetic force and the biasing force of the spring 104 act on the valve member 105 of the pressure increase control valve 74. The force based on, the fluid pressure difference and the electromagnetic force act on the valve member 105 in the same direction, so as to move the valve member 104 away from the valve seat 106, while the biasing force of the spring 104 acts on the valve member 105 in the opposite direction, so as to move the valve member 105 to be seated on the valve seat 100. Therefore, the pressure increase control valve 74 is held open with the valve member 105 spaced apart from the valve seat 106 while a sum of the force based on the fluid pressure difference and the electromagnetic Force is larger than the biasing force of the spring 104. With the control valve 74 placed in the open state, the pressurized fluid delivered from the pump 70 is permitted to flow into the assisting pressure chamber 100 of the assisting cylinder 78, causing a rise of the fluid pressure in the chamber 100. The fluid pressure difference required to hold the press-Lire increase control valve 74 in the open state decreases with an increase in the electromagnetic force, that is, with an increase in the electric current applied to the coil 102.

Similarly, the pressure reduction control valve 75 is held open while the above-indicated sum is larger than the biasing force of the return spring 104. In this open state of the pressure reduction control valve 75, the pressurized fluid is permitted to be discharged from the assisting pressure chamber 100 into the master reservoir 76, causing a reduction of the fluid pressure in the chamber 100. The fluid pressure in the chamber 100 is reduced as the amount of electric current applied to the coil 102 of the control valve 75 is increased.

The return spring 94 of the assisting cylinder 78 is provided in order to return the assisting piston 92 to its original position when the brake pedal 10 is released. Since the piston 92 is operatively connected to the brake pedal 10 through the rod 95, the brake pedal 10 is also returned to its original or non-operated position (fully released position) when the piston 92 is returned by the return spring 94. In this respect, the return spring 94 also functions to return the brake pedal 10. The non-operated position or the brake pedal 10 is defined by a suitable stop member.

In the present first embodiment of this invention, a normally-open solenoid-operated shut-off valve 108 is provided between the assisting pressure chamber 100 and the pressurizing chamber 32 of the master cylinder 12. While the assisting device 81 is normally operable, this shut-off valve 108 is closed with an electric current applied to its solenoid coil when the brake pedal 10 is operated. While the assisting device 81 has any abnormality or defect, the shut-off valve 108 is held closed even if the brake pedal 10 is operated. The abnormality indicated above, which will be referred to as "first kind of abnormality", is an electrical defect associated with the assisting device 81, such as a failure of normal operation of the electric motor 84, and a failure of application of an electric current to the solenoid coil of the pressure increase control valve 74 or pressure reduction control valve 75. In the event of occurrence of the first kind of abnormality, no electric current is applied to the solenoid coil of the shut-off valve 108, whereby the shut-off valve 108 is opened. Even in the presence of the first kind of abnormality, the assisting cylinder 78 is normally operable.

A portion of the assisting de-vice 81 assigned to control the fluid pressure in the assisting pressure chamber 100 functions as an assisting drive force control device 109 for controlling an assisting drive force which is generated by the assisting cylinder 78 and which is applied to the pressurizing piston 34. The first kind of abnormality indicated above may be considered to be an abnormality of the assisting drive force control device 109. This assisting drive force control device 109 may be considered to be an electrically operated hydraulic pressure source. The first kind of abnormality may be determined to be present if the fluid pressure in the assisting pressure chamber 100 is lowered below a predetermined threshold, or if the pressure switch 83 is held in the OFF state for more than a predetermined time. In this case, the first kind of abnormality includes a failure to control the fluid pressure in the assisting pressure chamber 100 due to a leakage of the fluid from the hydraulic system.

The stroke adjusting cylinder 64 indicated above includes a cylinder housing 110, and a volume-changing piston or stroke adjusting piston 114 slidably received in the cylinder housing 110. The cylinder housing 110 and the stroke adjusting piston 114 cooperate to define two fluid chambers 116, 118. The fluid chamber 116 is connected to the fluid passage 36 indicated above, while the other fluid chamber 118 is connected to the accumulator 72 through a pressure increase control valve 122 and to the master reservoir 76 through a pressure reduction control valve 124. The fluid chamber 116 will be referred to as "a variable volume chamber", while the fluid chaffer 118 will be referred to as "a volume control chamber". A return spring 126 is disposed in the variable-volume chamber 116, so that the stroke adjusting piston 114 is biased by the return spring 126 in a left direction as seen in FIG. 1, namely, in the direction that causes an increase in the volume or the variable-volume chamber 116.

The pressure increase control valve 122 and the pressure reduction control valve 124 are identical in construction with the pressure increase and pressure reduction control valves 74, 75 described above. By controlling the electric currents applied to the solenoid coils of these control valves 122, 124, the fluid pressure in the volume control chamber 118 of the stroke adjusting cylinder 64 can be controlled.

When the stroke adjusting piston 114 is moved in the right direction as seen in FIG. 1 with an increase in the fluid pressure in the volume control chamber 118, the volume of the variable-volume chamber 116 decreases, causing an increase in the fluid pressure in the variable-volume chamber 116, so that the pressurized fluid is fed from the variable-volume chamber 116 into the pressurizing chamber 30 of the master cylinder 12. When the stroke adjusting piston 114 is moved in the left direction with a decrease in the fluid pressure in the volume control chamber 118, the fluid in the pressurizing chamber 30 is discharged into the variable-volume chamber 116. Thus, the operating stroke of the brake pedal 10 can be adjusted by controlling the fluid pressure in the volume control chamber 118, that is, by controlling the fluid pressure in the volume control chamber 118 to control the volume of the fluid in the variable-volume chamber 114 when the brake pedal 10 is depressed, that is, when the pressurizing piston 34 is moved in left direction. Described more specifically, the operating stroke of the brake pedal 10 is reduced with an increase in the amount of the fluid which is supplied from the variable-volume chamber 116 to the pressurizing chamber 30 so as to move the pressurizing piston 34 in the right direction. Conversely, the operating stroke of the brake pedal 10 is increased with a decrease in the amount of the fluid supplied to the pressurizing chamber 30.

As described above, the operating stroke of the brake pedal 10 can be controlled by controlling the fluid pressure in the volume control chamber 118 to control the volume of the variable-volume chamber 116 and the amount of the fluid in the pressurizing chamber 30 when the brake pedal 10 is depressed. The original or neutral position of the stroke adjusting piston 114 when the brake pedal 10 is in the non-operated or fully released position is determined by equilibrium between a force acting on the piston 114 based on the fluid pressure in the volume control chamber 118 and a biasing force of the return spring 126 acting on the piston 114. It will be understood that a stroke adjusting device 128 is constituted by the stroke adjusting cylinder 64, pressure increase control valve 122, pressure reduction control valve 124, accumulator 72, pump 70, electric motor 84, master reservoir 76, and a portion of the pressure control device 80 assigned to control the control valves 122, 124.

The solenoid-operated shut-off valve 62 is a normally-open valve, which is held open while the assisting device 81 is normally operable. When the assisting device 81 has any abnormality, that is, when either of the pressure increase and pressure reduction control valves 74, 7, has any abnormality, with the accumulator 72 and pump 70 being normally operable, the shut-off valve 62 is closed. In this event, the fluid pressure in the assisting pressure chamber 100 of the assisting cylinder 78 cannot be controlled, but the fluid pressure in the volume control chamber 118 of the stroke adjusting cylinder 64 can be controlled by controlling the pressure increase and pressure reduction control valves 122, 124, since the accumulator 72 and the pump 70 are normally operable. Accordingly, the fluid pressure in the variable-volume chamber 116 can be made higher than that in the pressurizing chamber 30, by reducing the volume of the variable-volume chamber 116 by increasing the fluid pressure in the volume control chamber 118. The abnormality of the control valves 74, 75 indicated above will be referred to as "a second kind of abnormality" of the assisting device 81. This second kind of abnormality can be detected by detecting that the fluid pressure in the assisting pressure chamber 100 is lower than a predetermined lower limit even while the pressure switch 83 is in the ON state. Even in the presence of the second kind of abnormality, the fluid pressures in the wheel brake cylinders 22, 24 can be made higher than the fluid pressure in the pressurizing chamber 30, owing to the fluid pressure in the variable-volume chamber 116 of the stroke adjusting cylinder 64 which is disconnected from the pressurizing chamber 30 by the shut-off valve 62. In this case, the fluid pressure in the pressurizing chamber 32 is applied to the wheel brake cylinders 26, 28.

The pressure control device 80 is principally constituted by a computer incorporating a central processing unit (CPU) 130, a random-access memory (RAM) 131, a read-only memory (ROM) 132, an input portion 133 and an output portion 134. The input portion 133 receives output signals of wheel speed sensors 140, 142 144, 146 for the wheels 13, 16, 18, 20, a force sensor 148 for detecting the operating force F acting on the brake pedal 10, a stroke sensor 150 for detecting the operating stroke S of the brake pedal 10, an assisting pressure sensor 152 for detecting the fluid pressure in the assisting pressure chamber 100, a stroke control pressure sensor 154 for detecting the fluid pressure in the variable-volatile chamber 118, and a master cylinder pressure sensor 156 for detecting the fluid pressure in the pressurizing chamber 30 of the master cylinder 12.

To the output portion 134, there are connected driver circuits for energizing the solenoid coils of the pressure increase control valves 74, 122, pressure reduction control valves 75, 124, pressure holding and increasing shut-off valves 44, 48, and shut-off valves 62, 108, and driver circuits for energizing the electric motors 60, 84. The ROM 132 stores various control programs including the control program for the motor control routine illustrated in the flow chart of FIG. 8 described above, an anti-lock braking pressure control program, an assisting drive force control program for controlling the fluid pressure in the assisting pressure chamber 100, a stroke adjusting control program for controlling the fluid pressure in the volume control chamber 118, and control programs for controlling the various solenoid-operated shut-off valves such as the shut-off valves 62, 74, 75, 108, 122, 124. The ROM 132 further stores control data maps represented by the graphs of FIGS. 3 and 4, which are used to control the fluid pressure in the assisting pressure chamber 100.

The force sensor 148 detects the operating or depression force F acting on the pedal pad 97 of the brake pedal 10. For instance, the force sensor 148 uses an elastic meter attached to the pedal pad 97, so that the operating force F is detected based on an amount of elastic deformation or strain of the elastic member.

The master cylinder pressure sensor 156, which detects the fluid pressure in the pressurizing chamber 30, is disposed in a portion of the fluid passage 36 which is located downstream of the solenoid-operated shut-off valve 62. Accordingly, the pressure sensor 156 cannot detect the fluid pressure in the chamber 30 when the shut-off valve 62 is in the closed position. In this case, se output of the pressure sensor 156 represents the fluid pressure applied to the wheel brake cylinders 22, 24.

An assisting pressure force acting on the assisting piston 92 can be obtained on the basis of the fluid pressure in the assisting pressure chamber 100. Based on this assisting pressure force, an assisting drive force is applied to the pressurizing piston 34 through the brake pedal 10. On the other hand, the operating stroke S of the brake pedal 10 is determined by the amounts of the fluid in the pressurizing chamber 30 and the variable-volume chamber 116, which amounts are determined by the fluid pressure in the volume control chamber 118 and the pressurizing chamber 30. In the present embodiment, the fluid pressure in the assisting pressure chamber 100 is controlled so that the master cylinder pressure $P_M$ (fluid pressure in the pressurizing chamber 30) changes with the operating force F of the brake pedal 10, according to a predetermined relationship between the master cylinder pressure $P_M$ and the operating force F, as indicated in the graph of FIG. 3. On the other hand, the fluid pressure in the volume control chamber 118 is controlled so that the master cylinder pressure $P_M$ changes with the operating stroke S of the brake pedal 10, according to a predetermined relationship between the master cylinder pressure $P_M$ and the operating stroke S, as indicated in the graph of FIG. 4.

On the basis of the rotating speeds of the wheels 14–20 detected by the wheel speed sensors 140–146, an estimated running speed of the automotive vehicle is obtained, and the slipping speed or locking condition of each wheel is estimated on the basis of the detected wheel speeds and the estimated vehicle running speed. The pressure holding and pressure reducing shut-off valves 44, 48 are controlled to control the fluid pressures in the wheel brake cylinders 22–28 in an anti-lock fashion, according to the estimated locking conditions of the wheels 14–20.

An operation of the present hydraulically operated braking system constructed as described above will be described.

When the brake pedal 10 is depressed with the operating force F, the solenoid-operated shut-off valve 108 is brought to the closed position while the solenoid-operated shut-off valve 62 is held in its open position, where the assisting device 81 is normal. The fluid pressure in the assisting pressure chamber-100 is controlled to control the assisting drive force. The fluid pressure in the volume control chamber 118 has been controlled to adjust the operating stroke S of the brake pedal.

Initially, an operation to control the fluid pressure $P_S$ in the assisting pressure chamber 100 to control the fluid pressure $P_M$ in the pressurizing chambers 20, 32 will be described, by reference to FIG. 2. In the present embodiment, the pressurizing piston 34 has a pressure-receiving surface area $S_M$ which is larger than a pressure-receiving surface area $S_S$ of the assisting piston 92. That is, $S_M > S_S$. Further, a product of the pressure-receiving surface area $S_M$ and the distance $L_M$ (between the fulcrum 96 and the engaging end of the rod 98) is larger than a product of the pressure-receiving surface area $S_S$ and the distance $L_S$ (between the fulcrum 96 and the engaging end of the rod 95). That is, $S_M \times L_M > S_S \times L_S$.

An equilibrium of moments about the fulcrum 96 of the brake pedal 10 is expressed by the following equation:

$$F_S \times L_S + F \times L_F = F_M \times L_M$$

The force $F_S$ is the assisting pressure force acting on the assisting piston 92 based on the fluid pressure $P_S$ in the assisting pressure chamber 100. This assisting pressure force $F_S$ is applied to the brake pedal 10. The force $F_M$, which is a wheel braking force, is a reaction force which is applied to the brake pedal 10 based on the fluid pressure $P_M$ in the pressurizing chambers 30, 32. The wheel braking force $F_M$ is expressed by the following equation:

$$F_M = F_S \times L_S / L_M + F \times L_F / L_M$$

The first term $(F_S \times L_S / L_M)$ in the right member of the above equation is a force to be applied to the pressurizing piston 34 based on the assisting pressure force $F_S$. The force $(F_S \times L_S / L_M)$ is referred to as the assisting drive force. On the other hand, the second term $(F \times L_F / L_M)$ is a force to be applied to the pressurizing piston 34 based on the operating force F. The force $(F \times L_F / L_M)$ is referred to as the primary drive force. Thus, the assisting drive force in addition to the primary drive force is applied to the pressurizing piston 34, so that the wheel braking force is made larger in the present braking system than that in a braking system not provided with the assisting device 81.

On the other hand, the assisting pressure force $F_S$ is expressed by the following equation:

$$F_S = P_S \times S_S$$

The wheel braking force $F_M$ is also expressed by the following equation:

$$F_M = P_M \times S_M$$

Therefore, the fluid pressure $P_M$ in the master cylinder 12 is expressed by the following equation:

$$P_M = P_S \times S_S \times L_S / (L_M \times S_M) + F \times L_F / (L_M \times S_M)$$

The master cylinder pressure $P_M$ is determined on the basis of the detected operating force F and according to the $P_M$–F relationship of FIG. 3 represented by a data map stored in the ROM 132. Accordingly, a target value of the fluid pressure $P_S$ in the assisting pressure chamber 100 is determined according to the above equation, and the pressure increase control valve 74 and the pressure reduction control valve 75 are controlled so as to establish the determined target value of the fluid pressure $P_S$.

When the fluid pressure $P_S$ in the assisting pressure chamber 100 is $\alpha$ times the fluid pressure $P_M$ of the master cylinder 12, that is, when $P_S = \alpha \times P_M$, the master cylinder pressure $P_M$ and the wheel braking force $F_M$ are expressed by the following equations, respectively:

$$P_M = F \times L_F / (L_M \times S_M - \alpha \times L_S \times S_S)$$

$$F_M = F \times L_F \times S_M / (L_M \times S_M - \alpha \times L_S \times S_S)$$

It will be understood that the boosting ratio of the master cylinder pressure $P_M$ and the wheel braking force $F_M$ increase with the value of $\alpha$.

As described above, the fluid pressure $P_S$ in the assisting pressure chamber 100 is controlled so that the master cylinder pressure $P_M$ increases with the operating force F, according to the predetermined $P_M$–F relationship as indicated in the graph of FIG. 3. According to this relationship, the master cylinder pressure $P_M$ increases with the operating force F according to an equation $P_M = k \times F^{1/2}$ or $P_M = k \times F^{2/3}$, while the operating force F is considerably small. This arrangement permits a rapid rise of the master cylinder pressure $P_M$ and a rapid increase of the wheel braking force. While the operating force F is relatively large, the master cylinder pressure $P_M$ increases as a quadratic function of the operating force F, that is, according to an equation $P_M = k \times F^2$, so that the rate of increase of the master cylinder pressure $P_M$ (wheel braking force) with the operating force F is comparatively low while the operating force F is in a medium range as indicated in FIG. 3, and so that the rate of increase of the master cylinder pressure $P_M$ is comparatively high while the operating force F is considerably large. In this arrangement, the accuracy of control of the wheel braking force is relatively high, but the braking sensitivity is relatively low, while the operating force F is in the medium range. While the operating force F is considerably large, the wheel braking force is sufficiently large, and the braking sensitivity is relatively high, that is, the amount of increase of the wheel braking force per a given amount of increase of the operating force F is relatively large.

The fluid pressure in the volume control chamber 118 of the stroke adjusting cylinder 64 is controlled so that the master cylinder pressure $P_M$ increases with the operating stroke S according to the predetermined $P_M$-S relationship as indicated in the graph of FIG. 4. According to this relationship, the master cylinder pressure $P_M$ increases as a quadratic function of the operating stroke S, namely, according to an equation $P_M = k' \times S^2$. In this arrangement, the accuracy of control of the wheel braking force is relatively high while the operating stroke S is relatively small, and the rate of increase of the master cylinder pressure $P_M$ with the operating stroke S is relatively high while the operating stroke S is relatively large. The operating stroke S is detected by the stroke sensor 150.

It is also noted that a relationship between the master cylinder pressure $P_M$ and a power (efficiency) of the operating force F, and a relationship between the master cylinder pressure $P_M$ and an operating stiffness of the brake pedal 10 can be controlled by controlling the relationship between the master cylinder pressure $P_M$ and the operating force F and the relationship between the master cylinder pressure $P_M$ and the operating stroke S.

The power of the operating force F is represented by $dP_M/(F \times dS + S \times dF)$, while the operating stiffness is represented by dF/dS. The power $dP_M/(F \times dS + S \times dF)$ and the operating stiffness dF/dS will be considered in a case where the fluid pressure $P_S$ in the assisting pressure chamber 100 is controlled so that the master cylinder pressure $P_M$ increases with the operating force F according to the equation $P_M = k \times F^2$, while the fluid pressure in the volume control chamber 118 is controlled so that the master cylinder pressure $P_M$ increases with the operating stroke S according to the equation $P_M = k' \times S^2$. In these equations, k and k' are constants, which may be changed as desired by controlling the fluid pressure $P_S$ in the assisting pressure chamber 100. In the present case, the power $dP_M/(F \times dS + S \times dF)$ is held constant at $\sqrt{(kk')}$, as indicated in the graph of FIG. 5, and the operating stiffness dF/dS is also held constant at $\sqrt{(k'/k)}$.

By controlling the fluid pressure $P_S$ in the assisting pressure chamber 100 and the fluid pressure in the volume control chamber 118 of the stroke adjusting cylinder 64 according to the above equations $P_M = k \times F^2$, and $P_M = k' \times S^2$, as described above, the power $dP_M/(F \times dS + S \times dF)$ is held constant, so that the rate of increase of the wheel braking force with the braking effort of the vehicle operator applied to the brake pedal 10 is held constant, making it possible to give the vehicle operator a brake operating feel that the braking effect increases linearly with an increase in the braking effort by the vehicle operator. Further, the operating stiffness dF/dS is also held constant, so that the vehicle operator operating the brake pedal 10 has a highly consistent brake operating feel. In addition, the constant values $\sqrt{(kk')}$ and $\sqrt{(k'/k)}$ of the power and operating stiffness can be changed to change the braking effect characteristic, by changing the constants k and k'.

Then, the power $dP_M/(F \times dS + S \times dF)$ and the operating stiffness dF/dS will be considered in another case where the fluid pressure $P_S$ in the assisting pressure chamber 100 and the fluid pressure, in the volume control chamber 118 are controlled so that the master cylinder pressure $P_M$ increases with the operating force F and the operating stroke S according to the equations $P_M = k \times F^{2/3}$ and $P_M = k' \times S^2$, respectively. In this case, the power changes as a function of $P_M^{-1}$, that is, the power is represented by $\{\sqrt{(k^3 k')}/2P_M\}$, while the operating stiffness changes as a function of $P_M$, as indicated in FIG. 6, that is, the operating stiffness is represented by $\{3\sqrt{(k'/k^3)} \times P_M\}$.

By controlling the fluid pressure $P_S$ in the assisting pressure chamber 100 and the fluid pressure $P_S$ in the volume control chamber 118 of the stroke adjusting cylinder 64 according to the above equations $P_M = k \times F^{2/3}$, and $P_M = k' \times S^2$, as described above, the power $dP_M/(F \times dS + S \times dF)$ is larger when the wheel braking force is relatively small than when it is relatively large, so that the rate of increase of the wheel braking force with the braking effort of the vehicle operator applied to the brake pedal 10 is higher when the wheel braking force (braking effort) is relatively small than when it is relatively large. Accordingly, the vehicle operator feels a relatively high rate of increase of the braking effect with an increase in the braking effort applied to the brake pedal 10. Further, the operating stiffness of the brake pedal 10 increases with the braking effort at a relatively high rate, so that the vehicle operator feels a relatively high degree of operating stiffness of the brake pedal 10.

The power and the operating stiffness will be further considered in a case where the fluid pressure $P_S$ in the assisting pressure chamber 100 and the fluid pressure in the volume control chamber 118 are controlled so that the master cylinder pressure $P_M$ changes as ordinary quadratic functions of the operating force F and the operating stroke S, that is, according to the following equations, respectively $$P_M = k(F-a)^2 + b$$

$$P_M = k'(S-c)^2 + d$$

In the above equations, a, b, c and d are constants, which can be changed as desired by controlling the fluid pressure $P_S$ in the assisting pressure chamber 100.

In the present case, the operating stiffness dF/dS is represented by $\sqrt{\{k'(P_M-d)/k(P_M-b)\}}$. Where the constant b is equal to the constant d, the value $\sqrt{\{k'(P_M-d)/k(P_M-b)\}}$ is constant at $\sqrt{(k'/k)}$. Further, the power $dP_M/(F \times dS + S \times dF)$ is represented by $2\sqrt{(kk')}XY/(X^2+Y^2+a\sqrt{k}X+c\sqrt{k'}Y)$, where X represents $\sqrt{(P_M-b)}$ while Y represents $\sqrt{(P_M-d)}$. Where the constants a and c are zero, and X is equal to Y (b=d), the value $2\sqrt{(kk')}XY/(X^2+Y^2+a\sqrt{k}X+c\sqrt{k'}Y)$ is constant at $\sqrt{(kk')}$. Where the constants a, c and d are zero, the power is represented by $2\sqrt{(kk)}\sqrt{\{P_M(P_M-b)\}}/(2P_M-b)$.

The power and the operating stiffness will be further considered in a case where the fluid pressure $P_S$ in the assisting pressure chamber 100 and the fluid pressure in the volume control chamber 118 are controlled so that the master cylinder pressure $P_M$ in changes with the operating force F and the operating stroke S, according to the following equations, respectively:

$$P_M = k(F-a)^{2/3}$$

$$P_M = k'(S-c)^2 + d$$

In the present case, the operating stiffness dF/dS is represented by the following equation:

$$dF/dS = 3\sqrt{(k'/k^3)} \times \sqrt{\{P_M(P_M-d)\}}.$$

The above equation can be converted into the following equation according to the Taylor's Theorem:

$$dF/dS \approx 3\sqrt{(k'/k^3)} \times \sqrt{\{P_M(P_M-d/2)\}}$$

It will thus be understood that the operating stiffness dF/dS changes linearly as a function of the master cylinder pressure $P_M$. This is true even where the constant d is equal to zero. Accordingly, the operating stiffness increases with an increase in the wheel braking force.

On the other hand, the power $dP_M/(F \times dS + S \times dF)$ is represented by $2k\sqrt{(kk')}M/N^3 + ak^{3/2} + 3c\sqrt{k'}MN + 3M^2N)$, where M represents $\sqrt{(P_M-d)}$ while N represents $\sqrt{P_M}$. Where the constants c and d are zero, the power is represented by $2k\sqrt{(kk')}/(4P_M + ak^{3/2}/\sqrt{P_M})$.

While the present embodiment is adapted to control the fluid pressures in the assisting pressure chamber 100 and volume control chamber 118 according to the specific $P_M$-F and $P_M$-S relationships shown in FIGS. 3 and 4, it is to be understood that the fluid pressures may be controlled according to other relationships. For instance, a plurality of different $P_M$-F and/or $P_M$-S relationships may be used corresponding to respective ranges of the operating force F and/or operating stroke S.

Figure 9:
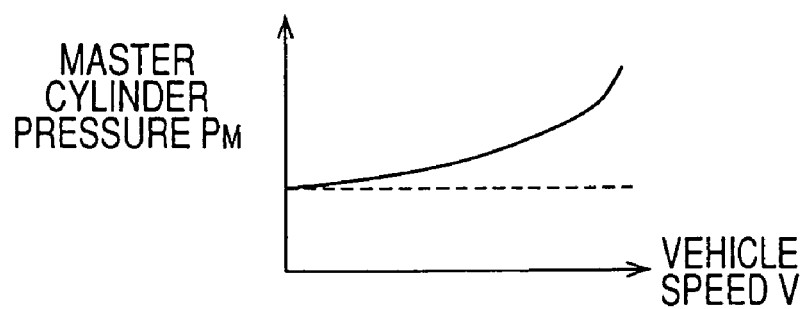
FIG. 9 is a graph indicating a relationship between the vehicle running speed and the master cylinder pressure controlled in the braking system of FIG. 1.

It is also possible to control the fluid pressures in the assisting pressure chamber 100 and volume control chamber 118, depending upon the vehicle running speed and the operating speed of the brake pedal 10, rather than the operating force F and stroke S. For instance, the fluid pressure $P_S$ in the assisting pressure chamber 100 may be controlled so that the master cylinder pressure $P_M$ (wheel braking force) increases with the vehicle running speed V, such that the rate of increase of the pressure $P_M$ increases with an increase of the vehicle running speed V, as indicated by solid line in the graph of FIG. 9, in which broken line indicates the $P_M$-V relationship where the pressure $P_S$ is controlled so that the master cylinder pressure $P_M$ increases with the operating force F according to the $P_M$-F relationship as indicated in the graph of FIG. 3. In the case of control indicated by the solid line of FIG. 9, the wheel braking force is sufficiently increased when the vehicle is running at a relatively high speed, making it possible to reduce the required stopping distance of the vehicle upon brake application at the relatively high speed. The vehicle running speed V used may be a speed during or upon brake application to the vehicle.

Figure 10:
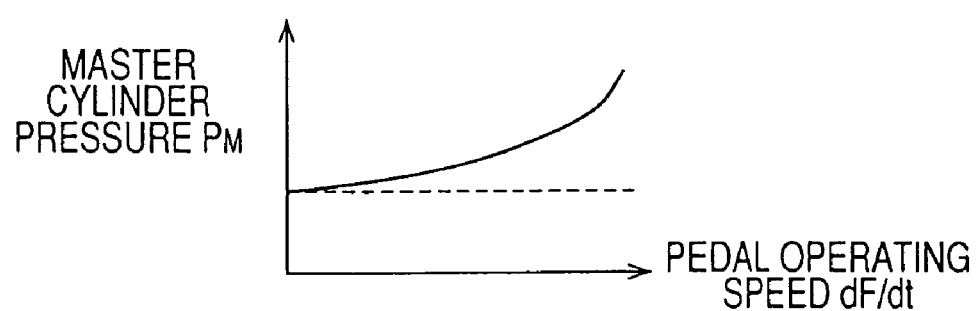
FIG. 10 is a graph indicating a relationship between the brake pedal operating speed and the master cylinder pressure controlled in the braking system of FIG. 1.

Further, the fluid pressure $P_S$ may be controlled so that the master cylinder pressure $P_M$ (wheel braking force) increases with the operating speed dF/dt of the brake pedal 10, such that the rate of increase of the pressure $P_M$ increases with an increase in the operating speed dF/dt, as indicated by solid line in the graph of FIG. 10. When the operating speed dF/dt of the brake pedal 10 is relatively high, it means an emergency brake application, or a desire of the vehicle operator to abruptly stopping or decelerating the running vehicle. The operating speed dF/dt may be obtained on the basis of a rate of change of the level of the output signal of the force sensor 148, or alternatively on the basis of a rate of change of the master cylinder pressure $P_M$ while the fluid pressure $P_S$ in the assisting pressure chamber 100 is held constant. Further, the operating speed dF/dt may be obtained on the basis of a rate of change of the level, of the output signal of the stroke sensor 150. In this case, however, it is desirable to obtain the operating speed while the fluid pressure in the volume control chamber 118 is held constant.

It is also possible to control the fluid pressures in the assisting pressure chamber 100 and volume control chamber 118, depending upon the friction coefficient $\mu$ of the road surface and/or the viscosity of the working fluid. For instance, the fluid pressure $P_S$ may be controlled so that the rate of increase of the wheel braking force with the friction coefficient $\mu$ decreases with a decrease in the friction coefficient $\mu$ or so that the assisting drive force $F_S \times L_S/L_M$ decreases with a decrease in the friction coefficient $\mu$. Further, the fluid pressure $P_S$ may be controlled so that the assisting drive force increases to increase the master cylinder pressure $P_M$ with an increase in the viscosity of the working fluid, since the force transmitting velocity decreases with the increase in the fluid viscosity.

Further, both of the fluid pressures in the assisting pressure chamber 100 and volume control chamber 118 need not be controlled. Namely, only the fluid pressure in the assisting pressure chamber 110 or the volume control chamber 118 may be controlled.

It is noted that upon releasing of the brake pedal 10, the fluid in the assisting pressure chamber 100 is returned to the master reservoir 76 through the pressure reduction control valve 75. That is, the control valve 75 is held in the open position for a predetermined time after the brake pedal 10 has been released.

It is also noted that the assisting device 81 may be used as an automatic braking device, which is automatically activated without an operation of the brake pedal 10, when a predetermined condition is satisfied. For instance, where the vehicle has a sensor for detecting a distance between the vehicle front and any object such as a person in front of the vehicle, the fluid pressure $P_S$ in the assisting pressure chamber 100 is raised to apply a brake to the vehicle to avoid a collision of the vehicle with the object, when the detected distance has become smaller than a predetermined threshold. In this case, the force based on the fluid pressure in the assisting pressure chamber 100 is transmitted to the pressurizing piston 34 through the brake pedal 10, so that the piston 34 is automatically advanced to increase the master cylinder pressure $P_M$, namely, the pressure in the pressurizing chambers 30, 32, for applying an automatic brake to the vehicle, without the vehicle operator depressing the brake pedal 10.

On the other hand, an anti-lock braking pressure control operation is performed by controlling the solenoid-operated pressure holding and reducing shut-off valves 44, 48, so as to regulate the fluid pressure in each of the wheel brake cylinders 22, 24, 26, 28 so that the amount of slip of each wheel 14, 16, 18, 20 is held within an optimum value. The anti-lock braking pressure control operation for each wheel is initiated when the amount of slip of the wheel on the road surface during brake application to the vehicle has become excessive with respect to the friction coefficient of the road surface. During the anti-lock braking pressure control operation, the fluid pressure $P_S$ in the assisting pressure chamber 100 is controlled to be held at a predetermined level which is low enough to reduce an influence of the pressure $_S$ on the anti-lock braking pressure control operation.

There will next be described an operation of the present braking system in the event of occurrence of an abnormality of the assisting device 81. When the first kind of abnormality of the assisting device 81 explained above occurs, the solenoid-operated shut-off valve 108 is brought to its open state, and the solenoid-coils of the pressure increase control valve 74 and pressure reduction control valve 75 are de-energized, so that the assisting pressure chamber 100 is disconnected from both of the accumulator 72 and the master reservoir 76, and is communicated with the pressurizing chamber 32. When the brake pedal 10 is depressed in this condition, the pressurized fluid in the pressurizing chamber 32 is supplied to the assisting pressure chamber 100, and the assisting piston 92 is moved when the brake pedal 10 is released, the pressurized fluid is returned from the assisting pressure chamber 100 back to the pressurizing chamber 32, and to the master reservoir 76. If the pressurizing chamber 32 were not communicated with the assisting pressure chamber 100 through the shutoff valve 108, the fluid flows into and from the assisting pressure chamber 100 would be inhibited, preventing a movement of the assisting piston 92, and therefore a movement of the brake pedal 10. In the present embodiment wherein the shut-off valve 108 is opened in the event of occurrence of the first kind of abnormality of the assisting device 81, the brake pedal 10 can be depressed even in that event.

With the assisting pressure chamber 100 held in communication with the pressurizing chamber 32 through the open solenoid-operated shut-off valve 108, the fluid pressure in the assisting pressure chamber 100 is made equal to the fluid pressure $P_M'$ in the pressurizing chamber 32. The fluid pressure $P_M'$ is represented by the following equation:

$$P_M' = F \times L_F / (L_M \times S_M - L_S \times S_S)$$

In the present embodiment wherein the inequality $L_M \times S_M > L_S \times S_S$ is satisfied, the fluid pressure $P_M'$ is prevented from being a negative pressure. That is, although the communication between the pressurizing chamber 32 and the assisting pressure chamber 100 causes the working fluid to flow from the pressurizing chamber 32 into the assisting pressure chamber 100, the fluid pressure in the pressurizing chamber 32 will not fall below the atmospheric pressure, so that the fluid will not be discharged from the wheel brake cylinders 26, 28 into the pressurizing chamber 32. Accordingly, the wheel brake cylinders 26, 28 can be actuated by the fluid pressure pressurized in the pressurizing chamber 32.

The fluid pressure $P_M$ in the pressurizing chamber 32 when the assisting drive force is zero is represented by the following equation:

$$P_M = F \times L_F / (L_M \times S_M)$$

Therefore, the fluid pressure $P_M'$ when the pressurizing chamber 32 is in communication with the assisting pressure chamber 100 is represented by the following equation including the fluid pressure $P_M$:

$$P_M' = P_M \times L_M \times S_M / (L_M \times S_M - L_S \times S_S)$$

Thus, a ratio of the fluid pressure $P_M'$ when the shut-off valve 108 is open to the fluid pressure $P_M$ when the assisting drive force is zero is represented by the following equation:

$$P_M'/P_M = 1/\{1 - (L_S \times S_S / L_M \times S_M)\}$$

Since the value $(L_S \times S_S / L_M \times S_M)$ is smaller than 1 as described above, it will be apparent that the above-indicated ratio $P_M'/P_M$ is larger than 1. Namely, the wheel braking force when the pressurizing chamber 32 is in communication with the assisting pressure chamber 100 in the event of the first kind of abnormality of the assisting device 81 is larger than when the assisting drive force is zero.

On the other hand, the solenoid-operated shut-off valve 62 is held in the open state, and the fluid pressure in the volume control chamber 118 is held constant. In the presence of an electrical abnormality the solenoid coils of the pressure increase control valve 122 and the pressure reduction control valve 124 are de-energized, and the stroke adjusting cylinder 64 is not operable to adjust the operating stroke S.

In the event of occurrence or the second kind of abnormality of the assisting device 81 described above, the shut-off valve 62 is brought to the closed state, and the solenoid coils of the pressure increase and pressure reduction control valves 74, 75 are de-energized, while the shut-off valve 108 is brought to the open state as in the event of occurrence of the first kind of abnormality. In this condition, the fluid pressure in the variable-volume changer 116 can be made higher than that in the pressurizing chamber 32, by controlling the fluid pressure in the volume control chamber 118 while the variable-volume chamber 116 is disconnected from the master cylinder 12 by the closed shut-off valve 62. Thus, the fluid pressure in the wheel brake cylinders 22, 24 can be made higher than the fluid pressure in the master cylinder 12. In this sense, the stroke adjusting cylinder 64 also functions as a device for increasing the fluid pressure in the wheel brake cylinders 22, 24 in the event of occurrence of the second kind of abnormality.

The shut-off valve 62 may be brought to the closed state also when the assisting cylinder 78 has an abnormality, such as a failure to move the assisting piston 92. In this case, too, the pressurized fluid can be supplied from the stroke adjusting cylinder 64 to the wheel brake cylinders 22, 24. This abnormality can be detected if the master cylinder pressure $P_M$ or the assisting pressure drive force $F_S$ is lower or smaller than a predetermined threshold while the operating force F is larger than a predetermined value. In this case, it is desirable to hold the shut-off valve 108 in the closed state, for preventing the fluid to be discharged from the pressurizing chamber 32 into the assisting pressure chamber 100.

As described above, the present hydraulically operated braking system is constructed to electrically control the fluid pressure in the assisting pressure chamber 100, permitting an electrical control of the assisting drive force to be applied to the pressurizing piston 34 of the master cylinder 12, so that the master cylinder pressure $P_M$ can be controlled to a level in a non-proportional relationship with the operating force F of the brake pedal 10. That is, the relationship between the master cylinder pressure and the brake pedal operating force can be changed as desired. Further, the present braking system is equipped with the stroke adjusting device 128 including the stroke adjusting cylinder 64 having the volume control chamber 118 whose fluid pressure can also be electrically controlled, so that the relationship between the master cylinder pressure and the brake pedal operating stroke can also be changed as desired. The stroke adjusting device 128 can be utilized as a device for activating the wheel brake cylinders 22, 24 with a relatively high fluid pressure, in the event of abnormality of the assisting device 81. The utilization of the stroke adjusting device 128 makes it possible to apply a relatively high braking pressure to the wheel brake cylinders 22, 24, without increasing the structural complexity of the braking system. Even if the pressure increase and pressure reduction control valves 74, 74 are not normally operable, the electrical control to close the shut-off valve 62 permits the stroke adjusting cylinder 64 to activate the wheel brake cylinders 22, 24 with the pressurized fluid supplied from the accumulator 72. Further, the electrical control to open the shut-off valve 108 in the event of an abnormality of the assisting drive force control device 109 permits the brake pedal operating force to be boosted.

It will be understood from the foregoing description of the present first embodiment of the invention that a portion of the pressure control device 80 assigned to control the pressure increase and pressure reduction control valve 74, 75 constitutes a major portion of a control valve control device for controlling the control valves 74, 75, while the solenoid-operated shut-off valve 108 and a portion of the pressure control device 80 assigned to open the shut-off valve 108 constitute an emergency fluid communicating device for effecting fluid communication between the pressurizing chamber 32 and the assisting pressure chamber 100 in the event of an abnormality of the assisting device 81. Since the fluid pressurizing characteristic of the master cylinder 12 is controlled by adjusting the operating stroke S by the stroke adjusting device 128, the stroke adjusting device 128 may be considered to be one form of a master cylinder characteristic control device for controlling the fluid pressurizing characteristic of the master cylinder 12. Since the fluid pressurizing characteristic of the master cylinder 12 can also be controlled by controlling the assisting drive force produced by the assisting device 81, the assisting device 81 including the assisting drive force control device 108 may be considered to be another form of the master cylinder characteristic control device. While both of the assisting device 81 and the stroke adjusting device 128 may be considered to be the master cylinder characteristic control device, each of these two de-vices 81, 128 may be considered to be the master cylinder characteristic control device, since either the device 81 or the device 128 alone can change the fluid pressurizing characteristic of the master cylinder 12. It will further be understood that the stroke adjusting cylinder 64 having the volume control chamber 118 and a portion of the pressure control device 80 assigned to control the fluid pressure in the chamber 118 constitute a master cylinder fluid amount control device for controlling the amount of the fluid in the master cylinder 12 to adjust the operating stroke S of the brake pedal 10, and that the shut-off valve 62 and a portion of the pressure control device 80 assigned to close the shut-off valve 62 constitute an emergency master cylinder disconnecting device for disconnecting the variable-volume chamber 116 and the master cylinder 12 from each other in the event of an abnormality of the assisting drive force control device 109.

In the present embodiment, the fluid pressures in the assisting pressure chamber 100 and volume control chamber 118 are controlled so that the master cylinder pressure $P_M$ changes in the predetermined relationships with the operating force F and stroke S as indicated in the graph of FIGS. 3 and 4, respectively. However, the fluid pressures may be controlled so that the deceleration value of the vehicle during an operation of the brake pedal 10 coincides with a value corresponding to the operating force F and stroke S. In this case, the braking system is provided with a sensor for detecting the vehicle deceleration value. The vehicle deceleration sensor may be a sensor for detecting the fluid pressure in the wheel brake cylinders. That is, the fluid pressures in the chambers 100, 118 may be controlled in a predetermined relationship with the fluid pressure in the wheel brake cylinders.

The present embodiment is further arranged such that the fluid pressure in the volume control chamber 118 of the stroke adjusting cylinder 64 while the brake pedal 10 is in the non-operated position is held at a value necessary to hold the stroke adjusting piston 114 at its original position. That is, the fluid pressure in the chamber 118 when the brake pedal 10 is in the non-operated position is determined such that a force acting on the piston 114 based on that fluid pressure is equal to the biasing force of the return spring 126. However, a spring whose biasing force is equal to that of the return spring 126 may be disposed on the volume control chamber 118 to hold the piston 114 at its original position when the brake pedal 10 is in the non-operated position. In this case, the fluid pressure in the chamber 118 may be held at the atmospheric pressure while the brake pedal 10 is in the non-operated position. Described in detail, the fluid pressure in the chamber 118 is lowered to the atmospheric pressure upon releasing of the brake pedal 10, by holding the pressure reduction control solenoid-operated shut-off valve 124 in its fully open position with the maximum electric current applied to its solenoid coil, for a predetermined time after the releasing or the brake pedal 10, to return the fluid from the chamber 118 to the master reservoir 76. This arrangement eliminates a need of controlling the fluid pressure in the chamber 118 so as to hold the piston 114 at its original position against the biasing force of the return spring 126 after the brake pedal 10 is released.

Figure 12:
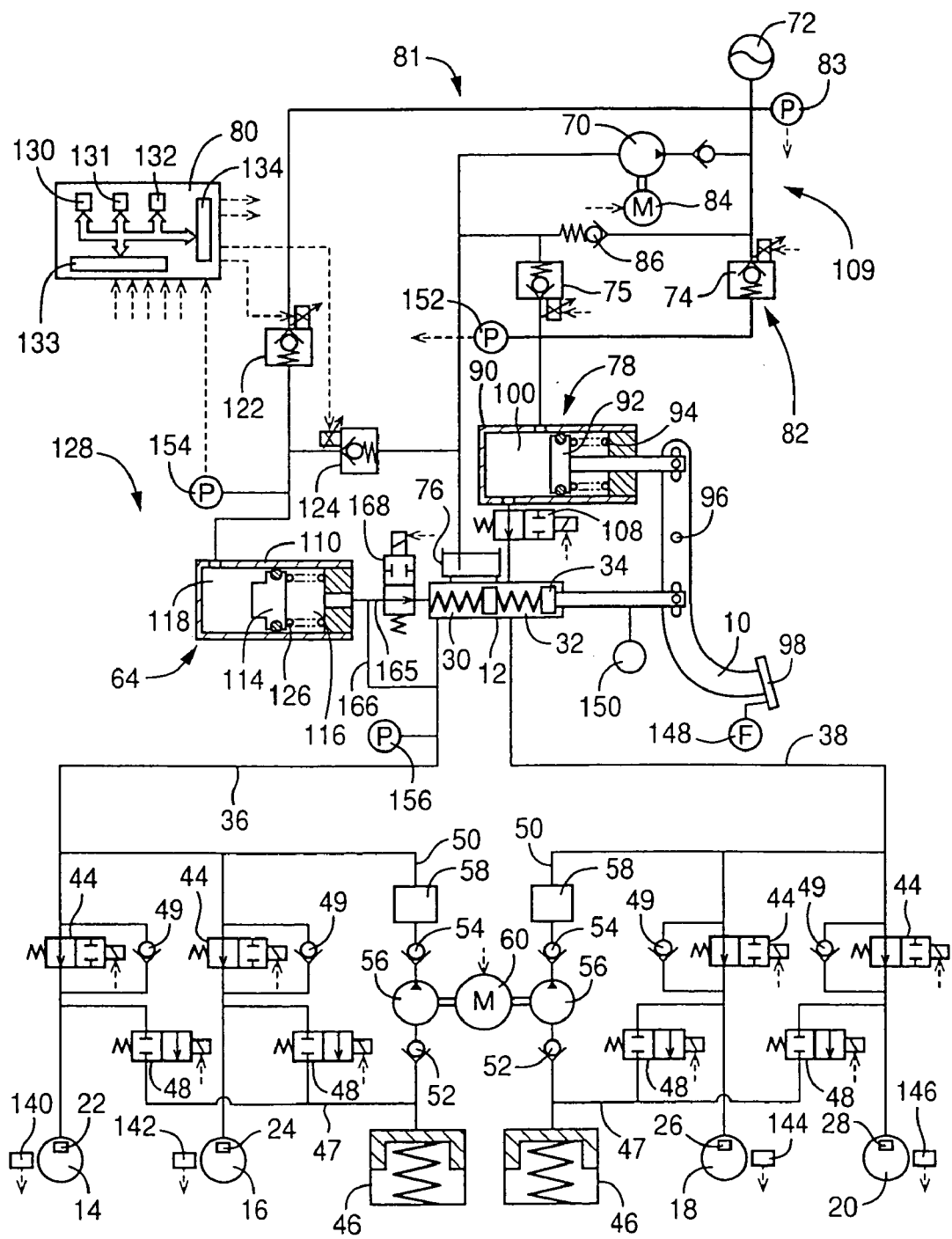
FIG. 12 is a circuit diagram, showing a hydraulically operated braking system according to a second embodiment of this invention.

Referring next to FIG. 12, a hydraulically operated braking system according to a second embodiment of this invention will be described. In this braking system, the variable-volume chamber 116 of the stroke adjusting cylinder 64 is connected to the pressurizing chamber 30 of the master cylinder 12 through a fluid passage 165, and to the fluid passage 36 through a fluid passage 166. A normally-open solenoid-operated shut-off valve 168 is provided in the fluid passage 165. In the event of occurrence of the second kind of abnormality of the assisting device 81, the shut-off valve 168 is closed, to disconnect the variable-volume chamber 116 from the pressurizing chamber 30, so that the fluid pressure in the chamber 116 can be made higher than the fluid pressure in the pressurizing chamber 30 upon depression of the brake pedal 10, in order to activate the wheel brake cylinders 22, 24 with the pressurized fluid supplied thereto through the fluid passages 166, 63.

In a third embodiment of the invention, a stroke adjusting cylinder 170 as shown in FIG. 3 is used in place of the stroke adjusting cylinder 64. This stroke adjusting cylinder 170 includes a cylinder housing 172, and a volume-changing piston or stroke adjusting piston 117 slidably received in the cylinder housing 172. Described more specifically, the cylinder housing 172 has a stepped bore consisting of a small-diameter portion 175 and a large-diameter portion 176 having a larger diameter than the small-diameter portion 175. A small-diameter piston 180 and a large-diameter piston 182 are slidably received in the respective small-diameter and large-diameter portions 174, 175, and these two pistons 180, 182 are connected to each other by a connecting rod 184, so that the pistons 180, 182 are movable as a unit. Thus, the stroke adjusting piston 174 consists of the small-diameter and large-diameter pistons 180, 182 and the connecting rod 184. The small-diameter portion 175 cooperates with the small-diameter piston 180 to define a variable-volume chamber 188 communicating with the pressurizing chamber 30. The cylinder housing 172 cooperates with the small-diameter and large-diameter pistons 180, 182 to define a volume control chamber 190 between the two pistons 180, 182. As in the first embodiment of FIG. 1, the volume control chamber 190 is connected to the accumulator 72 and the master reservoir 76 through the pressure increase control valve 122 and the pressure reduction control valve 124, respectively. The large diameter portion 175 cooperates with the large-diameter piston 182 to define an atmospheric chamber on the side of the piston 182 remote from the volume control chamber 190. The atmospheric chamber is held in communication with the atmosphere. A spring 192 is disposed in the atmospheric chamber to bias the stroke adjusting piston 174 in a direction of reduction of the volume of the variable volume chamber 188.

Figure 13:
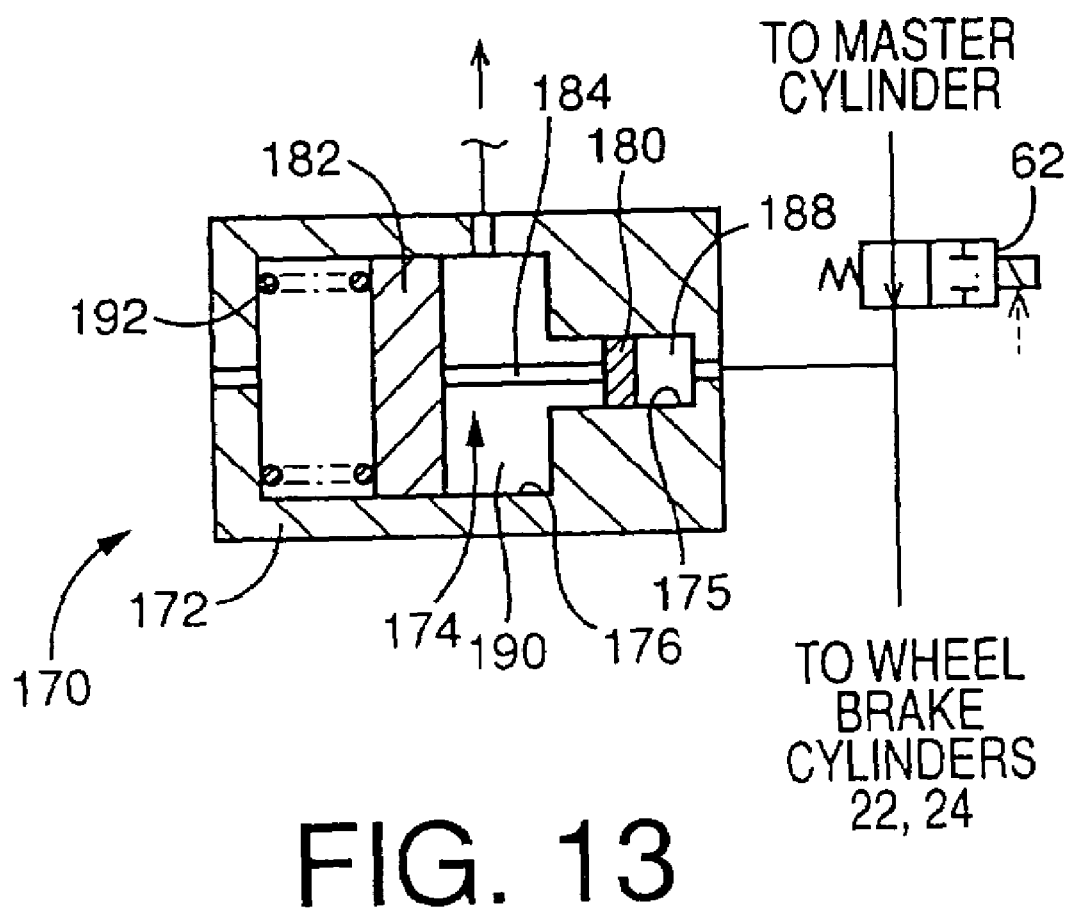
FIG. 13 is a cross sectional view of a stroke adjusting cylinder used in a hydraulically operated braking system according to a third embodiment of this invention.

While the brake pedal 10 is in the non-operated position, the stroke adjusting piston 174 is placed in its original or neutral position in which a force acting on the piston 174 based on the fluid pressure in the volume control chamber 190 is equal to the biasing force of the spring 192. As the fluid pressure in the volume control chamber 190 is increased, the stroke adjusting piston 174 is moved from the original position in the left direction as seen in FIG. 13, causing an increase in the volume of the variable-volume chamber 188, and resulting a flow of the fluid from the pressurizing chamber 30 into the variable-volume chamber 188. As the fluid pressure in the volume control chamber 190 is reduced, the piston 174 is moved from the original position in the right direction, causing a decrease in the volume of the variable-volume chamber 188, resulting in a flow of the fluid from the variable-volume chamber 188 into the pressuring chamber 30. Thus, by controlling the fluid pressure in the volume control chamber 190, the volume of the variable-volume chamber 1808 is changed, so that the amount of the fluid in the pressurizing chamber 30 is accordingly changed to adjust the operating stroke of the brake pedal 10.

In the present second embodiment wherein the spring 192 biases the stroke adjusting piston 174 in the direction of reduction of the volume of the variable-volume chamber 188, as described above, a reduction of the fluid pressure in the variable-volume chamber 190 will cause the stroke adjusting piston 174 to be moved by the biasing force in the right direction. In this arrangement, a reduction of the fluid pressure in the chamber 190 due to an abnormality of the pump 70, accumulator 72, pressure increase control valve 122 or pressure reduction control valve 124 would not cause an increase in the operating stroke of the brake pedal 10.

It is to be understood that the stroke adjusting device 128 and the solenoid-operated shut-off valve 62 are not essential. The fluid pressurizing characteristic of the master cylinder 12, that is, the relationship between the operating force F of the brake pedal 10 and the master cylinder pressure $P_M$ can be controlled as desired, without the provision of the stroke adjusting device 128. It is also noted that the fluid pressuring characteristic of the master cylinder 12 can be controlled, without the provision of the assisting device 81. It is further noted that the solenoid-operated shut-off valve 108 between the assisting pressure chamber 100 and the pressurizing chamber 32 is not essential.

Figure 14:
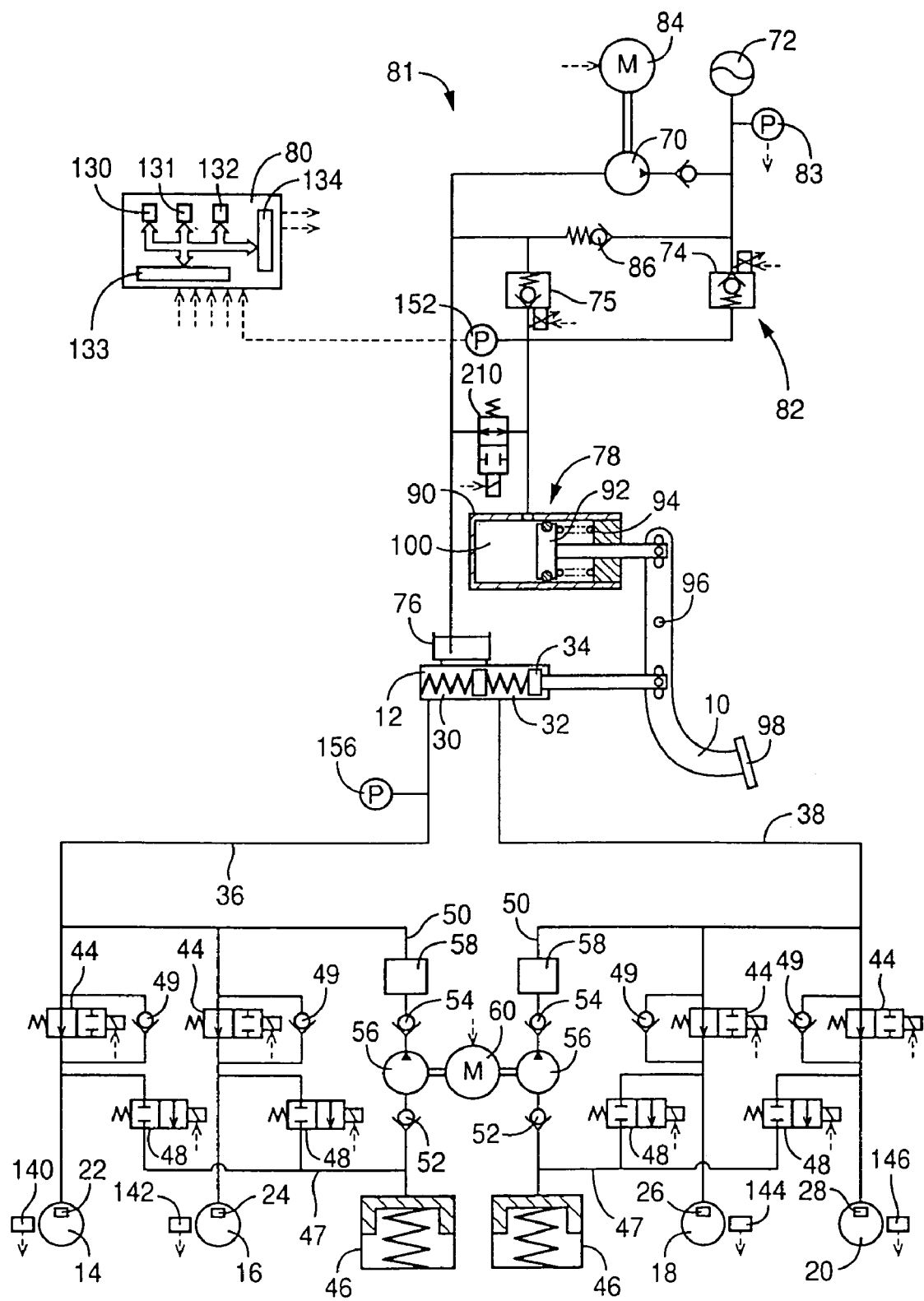
FIG. 14 is a circuit diagram showing a hydraulically operated braking system according to a fourth embodiment of the invention.

Referring next to FIG. 14, there is shown a hydraulically operated braking system constructed according to a fourth embodiment of this invention, wherein a solenoid-operated shut-off valve 210 is provided between the master reservoir 76 and the assisting pressure chamber 100, in place of the shut-off valve 108 provided between the assisting pressure chamber 100 and the pressurizing chamber 32. This shut-off valve 210 is normally placed in the open position. When the brake pedal 10 is operated while the assisting device 82 is normal, the shut-off valve 210 is brought to its closed position, so that the fluid pressure in the assisting pressure chamber 100 is controlled by controlling the pressure increase and pressure reduction control valves 74, 75. In the event of occurrence of the first kind of abnormality of the assisting device 81, the solenoid coil of the shut-off valve 210 is de-energized to place the shut-off valve 210 in the open position for fluid communication of the assisting pressure chamber 100 with the master reservoir 76, so that an operation of the brake pedal 10 causes the fluid to be supplied from the master reservoir 76 into the assisting pressure chamber 100, permitting the 10, pressurizing piston 92 to be moved as the brake pedal 10 is depressed. Thus, the brake pedal 10 can be operated even in the event of occurrence of the first kind of abnormality of the assisting device 81. When the brake pedal 10 is released, the fluid is returned from the pressurizing pressure chamber 100 back to the master reservoir 76 through the shut-off valve 210. In this event, the assisting drive force applied to the pressurizing piston 34 is zero, the fluid pressure generated in the pressurizing chambers 30, 32 is based solely on the primary drive force based on the operating force F of the brake pedal 10.

A hydraulically operated braking system according to a fifth embodiment of the present invention will be described by reference to FIG. 15, wherein the master cylinder 12 incorporates an assisting cylinder within a single cylinder housing. This arrangement has an advantage of a reduced number of parts of the braking system. Described in detail, the master cylinder 12 has a pressurizing piston 220 and a piston rod 221 which is fixed to the piston 220 and connected to the brake pedal 10. The piston 220 cooperates with the cylinder housing to define a pressurizing chamber 222 on one side of the piston 220 remote from the piston rod 221, and an assisting pressure chamber 224 on the other side of the piston 220. The assisting pressure chamber 224 is connected to the accumulator 72 through the pressure increase control valve 75, as in the first embodiment of FIG. 1. An increase of the fluid pressure in the assisting pressure chamber 224 will causes an increase in the force acting on the pressurizing piston 220. Reference numeral 225 denotes a stop which determines a fully retracted position of the pressurizing piston 220.

Figure 15:
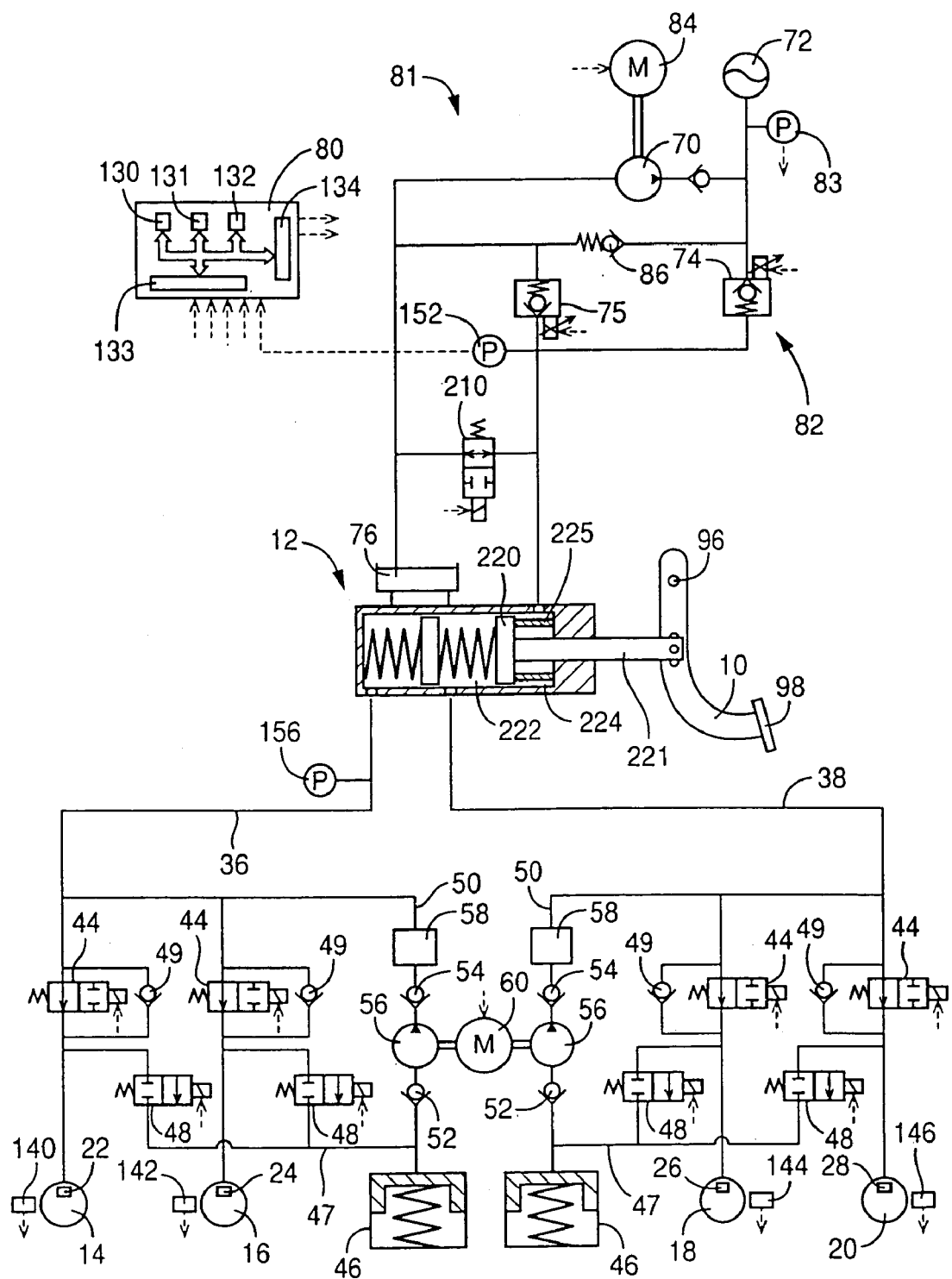
FIG. 15 is a circuit diagram showing a hydraulically operated braking system according to a fifth embodiment of the invention.
Figure 16:
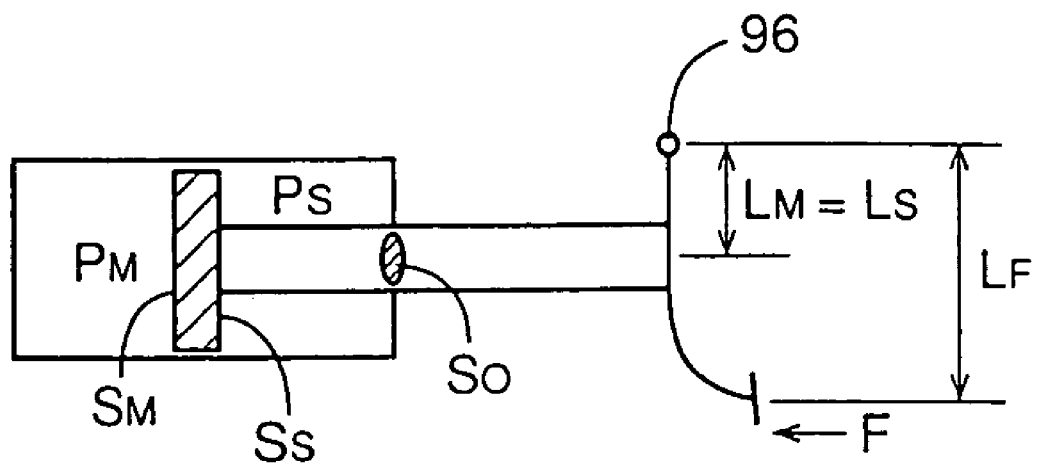
FIG. 16 is a view schematically showing a brake pedal connected to a master cylinder in the braking system of FIG. 15.

In the present embodiment of FIG. 15, the pressurizing piston 220 functions also as an assisting piston, and the distance $L_M$ between the fulcrum 96 of the brake pedal 10 and the rod 221 of the pressurizing piston 220 is equal to the distance $L_S$ between the fulcrum 96 and the rod 221 of the assisting piston 220. It will also be understood that a pressure-receiving surface area $S_S$ of the assisting piston 220 is equal to the pressure-receiving surface area $S_M$ of the pressurizing piston 220 minus a transverse cross sectional area $S_O$ of the piston rod 221. That is, $S_S = S_M - S_O$.

Therefore, the master cylinder pressure $P_M$ is expressed by the following equation:

$$P_M = F \times L_F/(L_M \times S_M) + P_S \times (S_M - S_O)/S_M$$

It is noted that the assisting cylinder 78 may be disposed in series with the master cylinder 12 such that these cylinders 78, 12 have separate housings.

Figure 17:
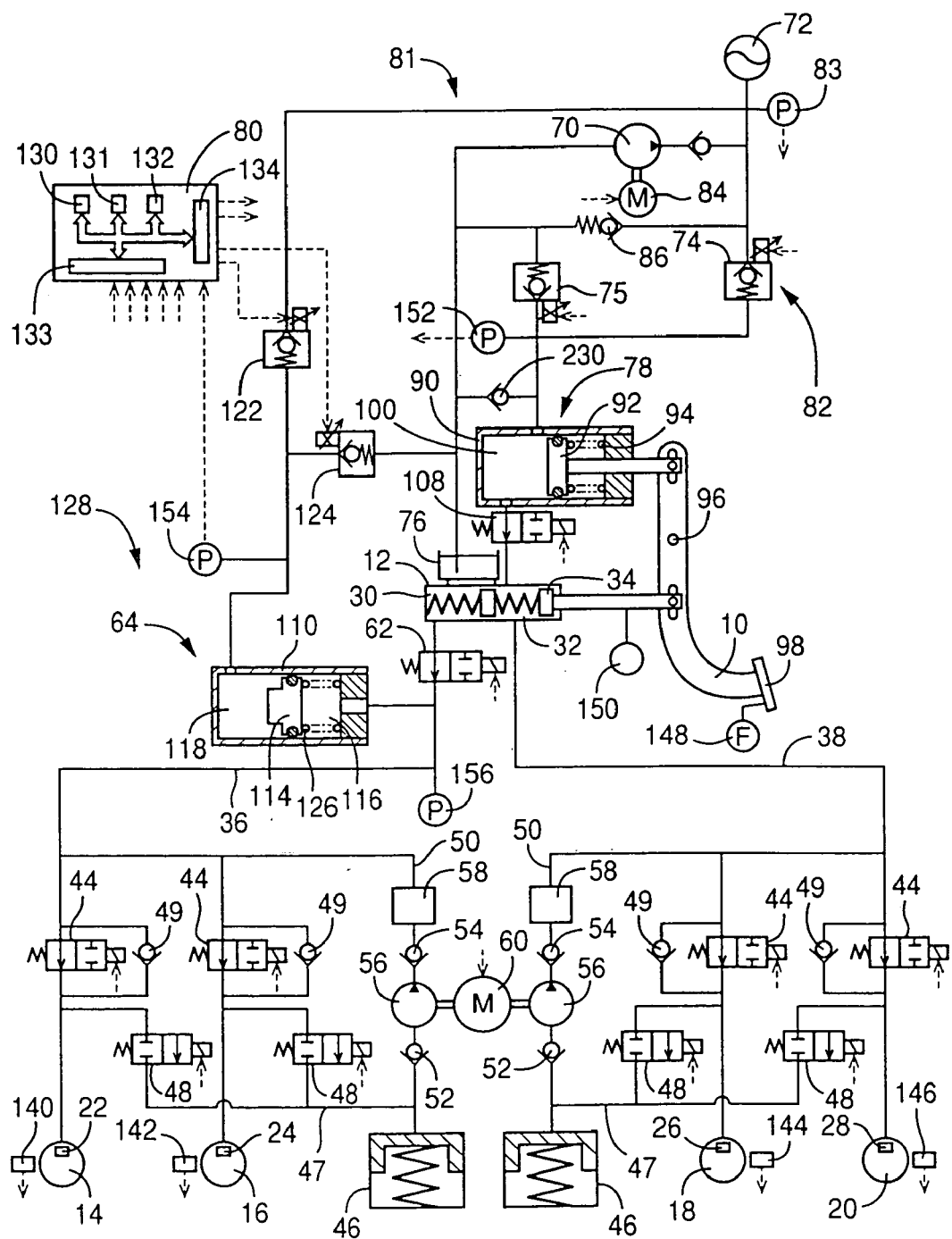
FIG. 17 is a circuit diagram showing a hydraulically operated braking system according to a sixth embodiment of the present invention.

Referring next to FIG. 17, there is shown a hydraulically operated braking system according to a sixth embodiment of this invention, wherein a check valve 230 is provided between the assisting pressure chamber 100 and the master reservoir 76. The check valve 230 allows a flow of the working fluid in a direction from the master reservoir 76 towards the assisting pressure chamber 100, and inhibits a flow of the fluid in the opposite direction.

In the event of occurrence of the first kind of abnormality of the assisting device 81, the shut-off valve 108 is opened permitting the fluid communication between the assisting pressure chamber 100 and the pressurizing chamber 32. However, the shut-off valve 108 may be held in its closed state due to an abnormality thereof such as sticking due to a foreign matter contained in the working fluid. In this case, the assisting pressure chamber 100 is disconnected from both of the accumulator 72 and the master reservoir 76, and the fluid flows into and from the assisting pressure chamber 100 are inhibited. The check valve 230 is provided to prevent this drawback. The check valve 230 permits the fluid to be supplied from the master reservoir 76 to the assisting pressure chamber 100, thereby permitting an operation of the brake pedal 10 even if the shut-off valve 108 is kept closed due to its abnormality. In this embodiment, the spring 104 of the pressure reduction control valve 75 has a considerably small biasing force, so that the fluid can be returned from the assisting pressure chamber 100 back to the master reservoir 76 through the pressure reduction control valve 75, without an energization of the coil 102 of the control valve 75, when the brake pedal 10 is released.

The solenoid-operated shut-off valve 108 may be replaced by a pilot-operated switch valve which is mechanically switched from its closed state to its open state, when the fluid pressure in the accumulator 72 falls below a predetermined lower limit, that is, falls down to an abnormally low level.

Further, a flow restrictor device may be provided in series with the shut-off valve 108 or the pilot-operated switch valve.

Figure 18:
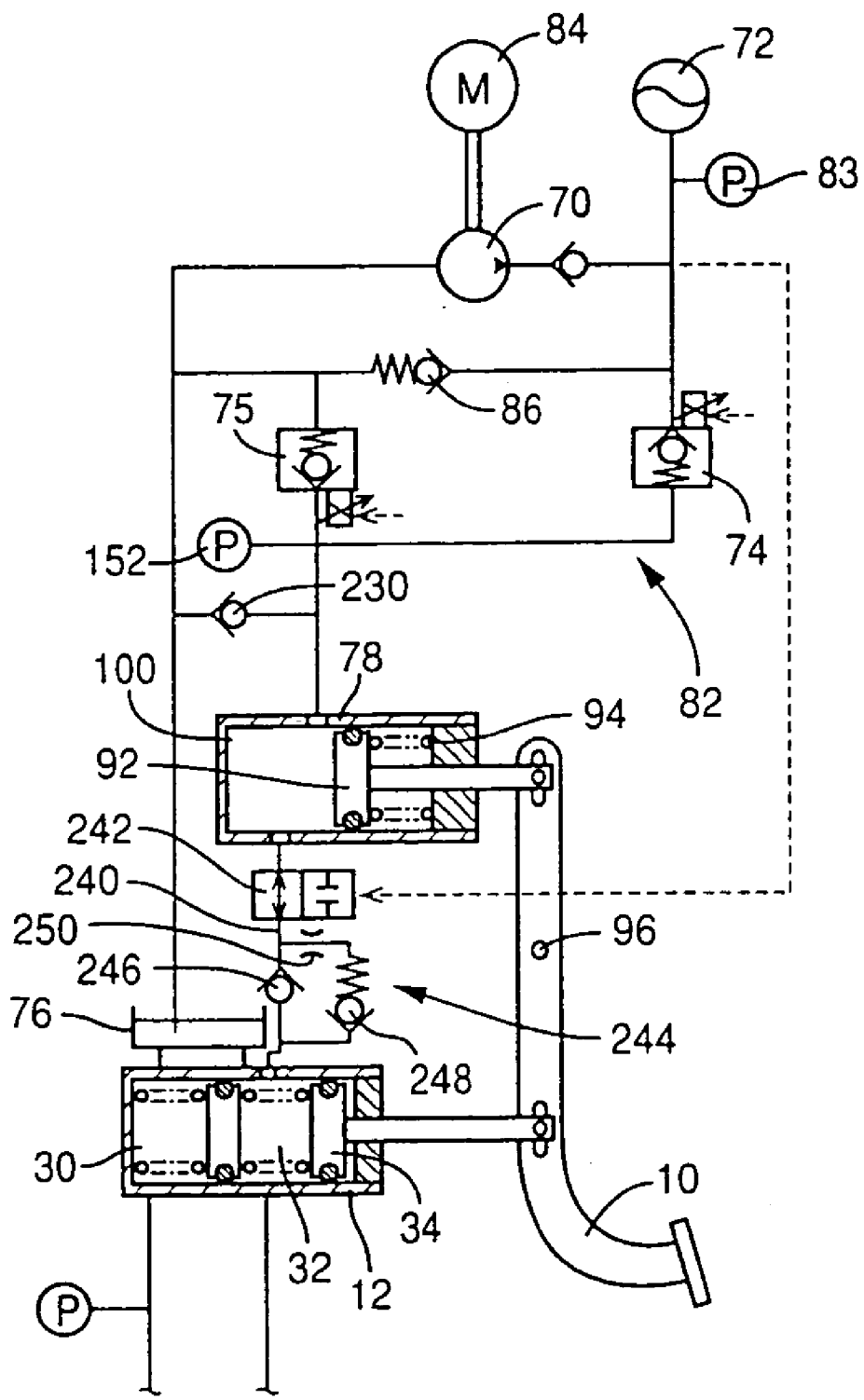
FIG. 18 is a circuit diagram showing a part of a hydraulically operated braking system according to a seventh embodiment of this invention.

Referring to FIG. 18, there will be described an example of such a modification as indicated above, according to a seventh embodiment of this invention. In this embodiment, a pilot-operated switch valve 242 and a flow restrictor device 244 as indicated above are provided in series in a fluid passage 240 connecting the assisting pressure chamber 100 and the pressurizing chamber 32. The flow restrictor device 244 includes a check valve 246, a differential shut-off valve 248 and an orifice 250. The check valve 246 allows a flow of the fluid in a direction from the assisting pressure chamber 100 towards the pressurizing chamber 32, and inhibits a flow of the fluid in the opposite direction. The differential shut-off valve 248 allows a flow of the fluid in the direction from the pressurizing chamber 32 towards the assisting pressure chamber 100 when the fluid pressure in the pressurizing chamber 32 becomes higher than that in the assisting pressure chamber 100 by a predetermined amount P1. The orifice 250 is disposed in series connection with the differential shut-off valve 248. The series connection of the shut-off valve 248 and the orifice 250 is parallel with the check valve 246.

When the fluid pressure in the accumulator 72 falls below the predetermined lower limit, the switch valve 242 is brought to the open state. However, the assisting pressure chamber 100 is disconnected from the master reservoir 32 by the flow restrictor device 244 while the fluid pressure difference of these chambers 100, 32 is smaller than the predetermined amount P1. When the brake pedal 10 is operated in this condition, the fluid is supplied from the master reservoir 76 into the assisting pressure chamber 100, thereby permitting the assisting piston 92 to be moved. When the fluid pressure in the pressurizing chamber 3 has become higher than the fluid pressure in the assisting pressure chamber 100 by the predetermined amount P1 or more, as a result of increase of the brake operating force F, the pressurized fluid is fed from the pressurizing chamber 32 into the assisting pressure chamber 100 through the differential shut-off valve 248, whereby the braking operating force F is boosted.

Figure 19:
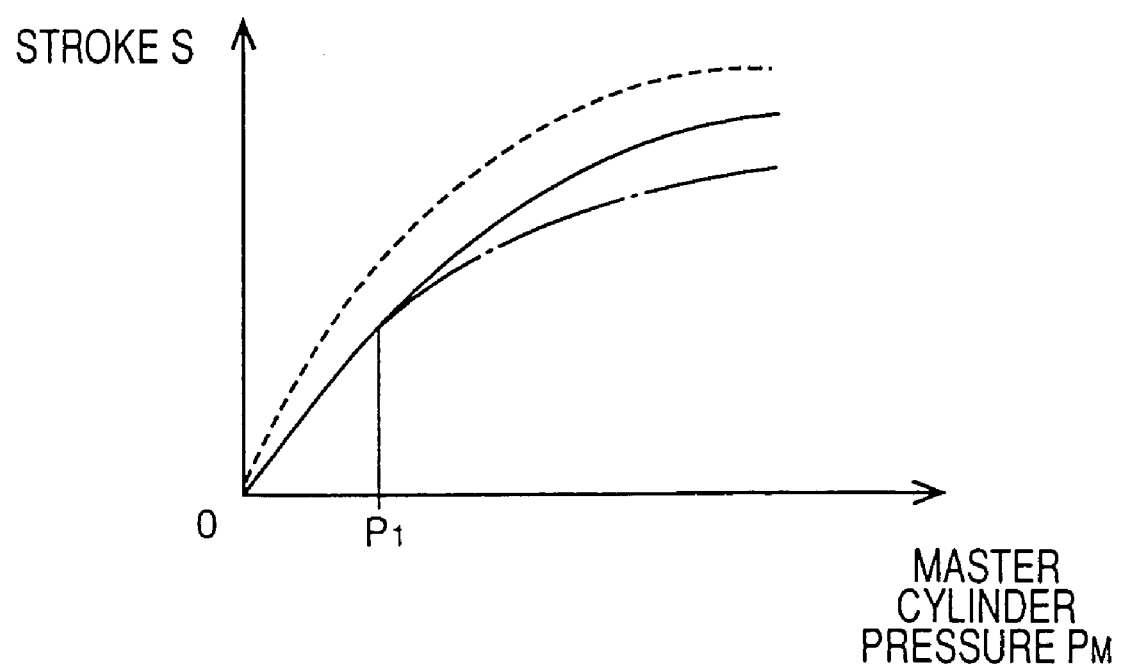
FIG. 19 is a graph indicating a relationship between the master cylinder pressure and the brake pedal operating stroke in the braking system of FIG. 18.

The fluid communication of the assisting pressure chamber 100 with the pressurizing chamber 32 through the switch valve 242 and the shut-off valve 248 will cause an increase in the operating stroke S of the brake pedal 10. However, the pressurizing fluid is not supplied from the pressurizing chamber 32 into the assisting pressure chamber 100 immediately after the switch valve 242 has been opened. Accordingly, the operating stroke is more or less restricted by this time delay. The master cylinder pressure $P_M$ changes with the operating stroke S, as indicated by one-dot chain line in the graph of FIG. 19, when the pressurizing charmer 32 and the assisting pressure chamber 100 are disconnected from each other, and as indicated by broken line in the graph of FIG. 19, when these chaffers 32, 100 are connected to each other. The present embodiment is adapted such that the master cylinder pressure $P_M$, changes with the operating stroke S, along the one-dot chain line as long as the differential shut-off valve 248 is held in the closed state, and along the broken line after the shut-off valve 248 has been brought to the open position. In addition, the provision of the orifice 250 provides a delay for the braking effect to be provided when the operating speed of the brake pedal 10 is relatively high. That is, although the shut-off valve 248 is relatively quickly opened when the operating speed of the brake pedal 10 is relatively high, the rate of flow of the fluid from the pressurizing chamber 32 towards the assisting pressure chamber 100 is restricted by the orifice 250.

When the brake pedal 10 is released, the fluid is returned from the assisting pressure chamber 100 to the pressurizing chamber 32 through the switch valve 242 and the check valve 246, and then to the master reservoir 76 through the pressurizing chamber 32.

The differential shut-off valve 248 may be a solenoid-operated shut-off valve whose opening pressure difference is controllable, like the pressure increase control valve 74. In this case, the predetermined amount P1 (indicated in the graph of FIG. 19) at which the curve along which the master cylinder pressure $P_M$ changes with the operating stroke S is changed from the one-dot chain line to the broken line can be changed. Further, the switch valve 242 may be replaced by a mechanically operated or solenoid-operated switch valve which is brought to its open state when the fluid pressure in the pressurizing chamber 32 has become higher than that in the assisting pressure chamber 100 by a predetermined amount while the fluid pressure in the accumulator 72 is lower than the predetermined lower limit. In this case, the master cylinder pressure $P_M$ changes with the operating stroke S along the broken line of FIG. 19 after the chambers 32, 100 has been brought into communication with each other through the mechanically operated or solenoid-operated switch valve. It is also noted that the orifice 250 is not essential. An increase in the operating stroke S is limited since the shut-off valve 248 is not opened immediately after the switch valve 242 has been opened.

While the pump 70 and the accumulator 72 are used commonly for both of the stroke adjusting device 128 and the assisting device 81, two sets of pump and accumulator may be provided for the two devices 128, 81, respectively. In this case, the operating stroke S when the chambers 100, 32 are communicated with each other can be restricted by the stroke adjusting device 128.

Figure 20:
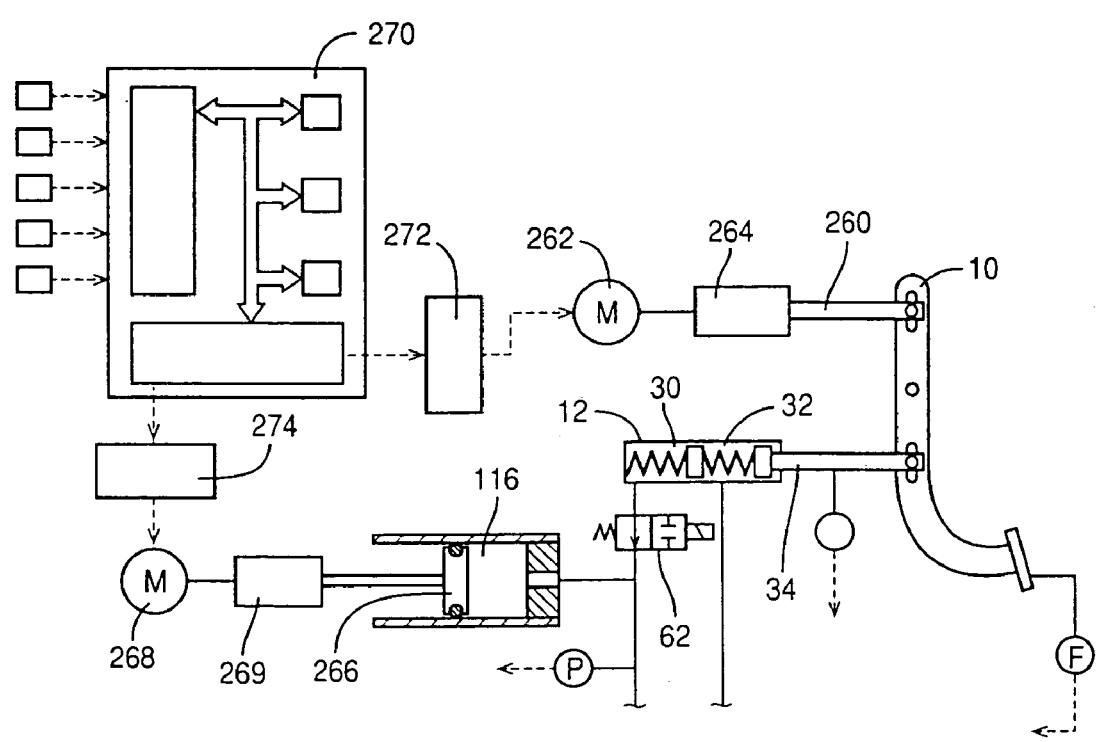
FIG. 20 is a view showing a part of a hydraulically operated braking system according to an eighth embodiment of the invention.

At least one of the assisting device 81 and the stroke adjusting device 128 includes an electric motor for activating these devices 81, 128. For instance, a hydraulically operated braking system according to an eighth embodiment of this invention shown in FIG. 20 includes two electric motors 262, 268. The electric motor 262 is connected to an assisting rod 260 through a motion converting device 264. The assisting rod 260 engages the brake pedal 10. The electric motor 268 is connected to a volume-changing piston or stroke adjusting piston 266 through a motion converting device 269. The motion converting devices 264, 269 are adapted to convert rotary motions of the electric motors 262, 268 into linear motions of the assisting rod 260 and stroke adjusting piston 266, respectively. The electric motors 262, 268 are connected to a motor control device 270 through respective driver circuits 272, 274, so that the motors 262, 268 are controlled by the motor control device 270. An assisting electric drive force to be applied to the assisting rod 260 is controlled by controlling the electric motor 262, and the volume of the variable-volume chamber 116 is controlled by controlling the electric motor 268. The present eighth embodiment does not require the pump 70, accumulator 72, pressure increase control valves 74, 122 and pressure reduction control valves 75, 124. Accordingly, the space required for installing the braking system is reduced in the event of an abnormality of the electric motor 262 or an abnormality associated with the electric motor 262, the solenoid-operated shut-off valve 62 is closed, so that the braking pressure to be applied to the wheel brake cylinders 22, 24 can be increased by reducing the volume of the variable-volume chamber 116. The electric motors 262, 268 may be replaced by electric actuators each including a piezoelectric element or elements. In this case, the motion converting devices are not necessary. However, forces generated by the piezoelectric elements may be applied to the assisting rod 260 and stroke adjusting piston 266 through respective motion converting devices.

The solenoid-operated shut-off valve 62 may be brought to its closed state when the master cylinder 12 is not normally operable to generate the fluid pressure in the pressurizing chamber 30. For instance, the shut-off valve 62 may be closed when the fluid pressure detected by the master cylinder pressure sensor 156 is lower than a predetermined lower limit.

In the embodiments described above, the rods 95, 98 of the assisting and pressurizing pistons 92, 34 engage the brake pedal 10 such that the engaging ends of the rods 95, 98 are movable relative to the brake pedal 10 in the longitudinal direction of the brake pedal 10. However, this arrangement is not essential. That is, where the rods 95, 98 are connected to the pistons 92, 34 pivotably relative to the pistons 92, 34, the rods 95, 98 are pivotable relative to the brake pedal 10 provided the rods 95, 98 engage the brake pedal 10 pivotably thereto.

Figure 21:
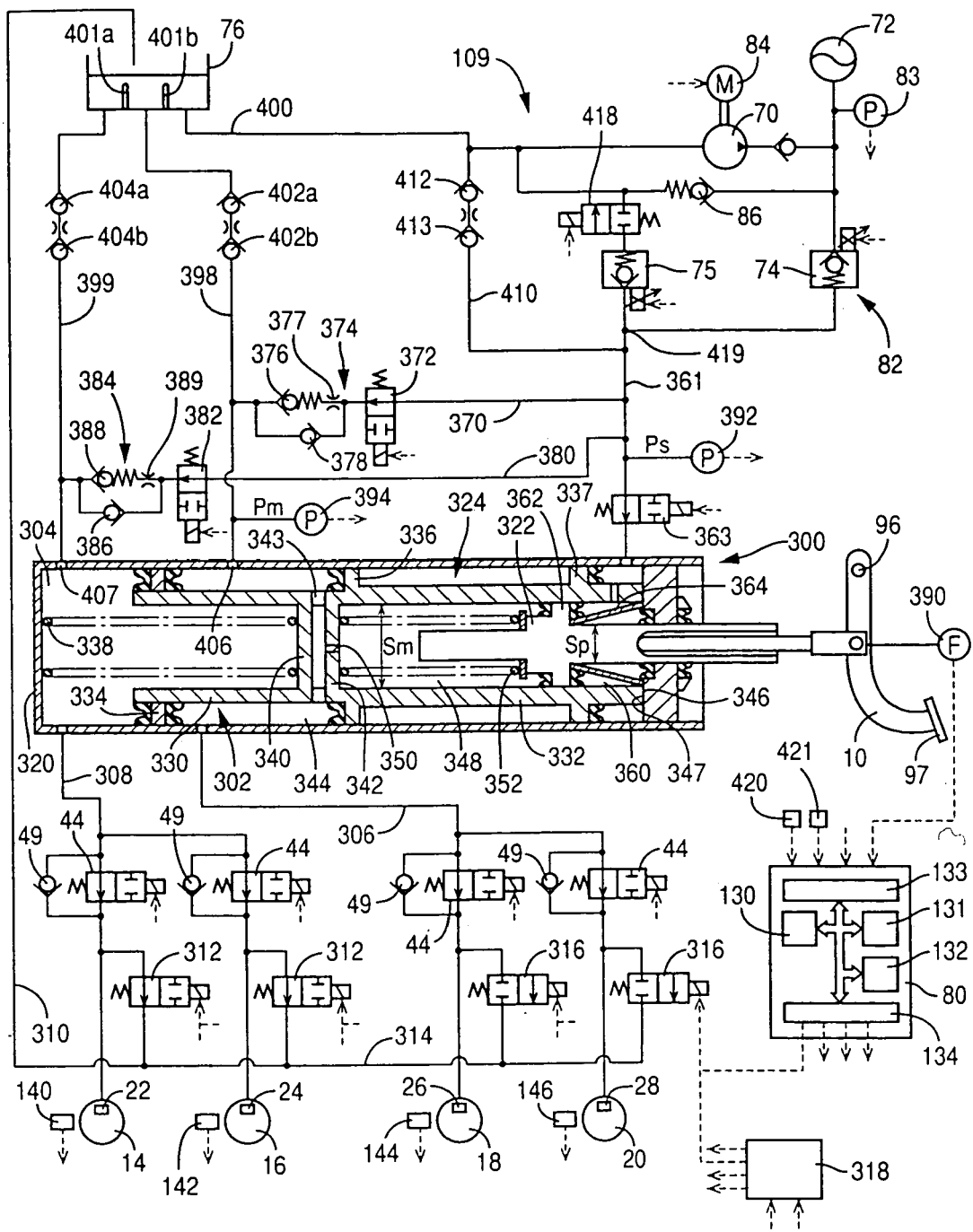
FIG. 21 is a circuit diagram showing a hydraulically operated braking system according to a ninth embodiment of the invention.

Referring next to FIG. 21, there will be described a hydraulically operated braking system constructed according to a ninth embodiment of the present invention, wherein the master cylinder and the assisting cylinder are provided in a single integral housing, in series connection with each other. This braking system is designed for a rear-drive vehicle wherein the rear wheels 14, 16 are drive wheels (driven by a drive power source) while the front wheels 18, 20 are driven wheels.

The braking system of FIG. 21 includes a master cylinder 300 having two pressurizing chambers 302, 304. The first pressurizing chamber 302 is connected through a flu passage 306 to the wheel brake cylinders 26, 28 for the front wheels 18, 20, while the second pressurizing chamber 304 is connected through a fluid passage 308 to the wheel brake cylinders 22, 24 for the rear wheels 14, 16. As in the embodiments described above, the solenoid-operated shut-off valves 44 are provided in the fluid passages 306, 308. Further, normally-open solenoid-operated shut-off valves 312 are provided in a fluid passage connecting the wheel brake cylinders 22, 24 and the reservoir 76, while normally-closed solenoid-operated shut-off valves 316 are provided in a fluid passage 314 connecting the wheel brake cylinders 26, 28 and the reservoir 76.

These solenoid-operated shut-off valves 312, 316 are closed to increase the fluid pressures in the wheel brake cylinders 22, 24, 26, 28, and are opened to reduce the fluid pressures in these wheel brake cylinders. When the brake pedal 10 is released, too, these shut-off valves 312, 316 are opened to return the fluid from the wheel brake cylinders 22–28 to the reservoir 76. When the brake pedal 10 is released, the normally-closed shut-off valves 316 are kept open for a predetermined time suitable for the fluid to be able to be completely returned to the reservoir 76, and are then held in the closed state. The solenoid coils of the shut-off valves 312, 316 are connected through respective driver circuits to both of the pressure control device 80 and an emergency control device 318. When the assisting device 81 is normally operable, the shut-off valves 312, 316 are controlled by the pressure control device 80 in the event of an abnormality of the pressure control device 80 due to some electrical defect thereof, the shut-off valves 312, 316 are controlled by the emergency control device 318, so that the wheel brake cylinders 22–28 can be normally activated even in the event of an electrical defect associated with the pressure control device 80.

The master cylinder 300 has a cylinder housing 320 which houses a first pressurizing piston 322 movable relative to the cylinder housing 320, and a second pressurizing piston 324 movable to the first pressurizing piston 322. The first pressurizing piston 322 is operatively connected to the brake pedal 10, so that the piston 322 is moved in response to an operation of the brake pedal 10. The second piston 324 divides the interior space of the cylinder housing 320 into the first and second pressurizing chambers 302, 304. The second pressurizing piston 324 includes two cylindrical pistons 330, 332 each of which is closed at one of its opposite ends and is open at the other end. These two cylindrical pistons 330, 332 are disposed such that the outer surfaces of their bottom-walls 340, 342 are opposed to each other in the axial direction. The cylindrical piston 330 which is remote from the first pressurizing piston 322 functions as a partition member separating the first and second pressurizing chambers 302, 304 from each other will be referred to as "a front second pressurizing piston" while the other cylindrical piston 332 will be referred to as "a rear second pressurizing piston".

The outer circumferential surface of the front second pressurizing piston 330 fluid-tightly and slidably engages an annular radial wall 334 formed on the inner circumferential surface of the cylinder housing 320. The rear second pressurizing piston 332 has two annular radial walls 336, 337 formed on its outer circumferential surface such that the annular radial walls 336, 337 are spaced apart from each other in the axial direction of the piston 332. At these annular radial walls 336, 337, the rear second pressurizing piston 332 fluid-tightly and slidably engages the inner circumferential surface of the cylinder housing 320.

The second pressurizing chamber 304 is formed in front of the front second pressurizing piston 330 with the annular radial wall 334 fluid-tightly engaging the inner circumferential surface of the cylinder housing 320. A spring 338 is disposed in the second pressurizing chamber 304, to bias the front second pressurizing piston 330 in the rear direction toward the rear second pressurizing piston 332, so that the bottom wall 340 of the front second pressurizing piston 330 is held in abutting contact with an annular axial protrusion 343 formed on the bottom wall 342 of the rear second pressurizing piston 332, whereby the pistons 330, 332 are axially movable as a unit (second pressurizing piston 324). The fully retracted position of the second pressurizing piston 324 is determined by abutting contact of a rear open end face 346 of the rear second pressurizing piston 332 with a rear end face 347 of the cylinder housing 320. The first pressurizing piston 322 fluid-tightly and slidably engages the inner circumferential surface of the rear second pressurizing piston 332. The first pressurizing piston 322 and the rear second pressurizing piston 332 cooperate to define a fluid chamber 348 in front of the first pressurizing piston 322. The bottom wall 342 of the rear second pressurizing piston 332 has an orifice 350 for fluid communication between the fluid chamber 348 and an annular chamber 344 which is defined by the inner circumferential surface of the cylinder body 320, the outer circumferential surface of the second pressurizing piston 324, the annular radial walls 334, 336 and the annular axial protrusion 343. The orifice 350 permits the fluid pressures in the fluid chamber 348 and the annular chatter 344 to be equal to each other. The first pressurizing chamber 302 consists of the annular chamber 344 and the fluid chamber 348.

The volume of the first pressurizing chamber 302 (volume of the fluid chamber 348) is reduced and the fluid pressure in the first pressurizing chamber 302 is increased, as the first pressurizing piston 322 is moved toward the second pressurizing piston 324. The volume of the second pressurizing chamber 304 is reduced and the fluid pressure in the second pressurizing chamber 304 is increased, as the second pressurizing piston 324 is advanced. As the second pressurizing piston 324 is advanced, the volume of the annular chamber 344 is also reduced to thereby reduce the volume of the first pressurizing chamber 302. A spring 352 is disposed in the fluid chamber 348, to bias the first pressurizing piston 322 in the rear direction.

The first pressurizing piston 322 cooperates with the cylinder body 320 to define an assisting pressure chamber 360 on the side of the first pressurizing piston 322 remote from the fluid chamber 348. The assisting pressure chamber 360 is connected to the assisting drive force control device 109 through a fluid passage 361. An assisting drive force based on the fluid pressure in the assisting pressure chamber 360 acts on the first pressurizing piston 322 in the forward direction so as to boost the operating force F of the brake pedal 10. Thus, the first pressurizing piston 322 also functions as an assisting piston. That is, the first pressurizing piston 322 has a large-diameter portion 362 slidably engaging the cylinder body 320, and rear and front axial sections of this large-diameter portion 362 are considered to be the assisting piston and the pressurizing piston, respectively.

A normally-open solenoid-operated shut-off valve 363 is provided in the fluid passage 361. This shut-off valve 363 is placed in its closed state when the braking system is operated to perform a traction control of the rear drive wheels 14, 16 (by activating the wheel brake cylinders 22, 24 to control the drive forces of the rear drive wheels 14, 16 so as to prevent excessive slipping of these drive wheels, during starting of the vehicle, for example), or to perform a vehicle turning stability control (by activating a selected one or ones of the wheel brake cylinders 22–28 so as to improve the turning stability of the vehicle during turning). The shut-off valve 363 is held in its open state when the brake pedal 10 is operated. As described below, a pressurized fluid is supplied from the second pressurizing chamber 304, while inhibiting this fluid to be supplied to the assisting pressure chamber 360, during the traction control or the vehicle turning stability control. A stop 364 is provided in the assisting pressure chamber 360, to determine the fully retracted position of the first pressurizing piston 322.

The first pressurizing chamber 302 and the assisting pressure chamber 370 are connected to each other through a fluid passage 370. A solenoid-operated shut-off valve 372 and a flow restrictor device 374 are provided in the fluid passage 370, in series with each other. The flow restrictor device includes a differential shut-off valve 376, an orifice 377 and a check valve 378. The shut-off valve 372 is a normally-open valve which is held open while the solenoid coil is in a de-energized state. This shut-off valve 372 is closed when the brake pedal 10 is operated, when the fluid pressures in the wheel brake cylinders 22, 24 for the drive wheels 14, 16 are increased to perform the traction control or to apply a brake to one of the drive wheels 14, 16 during the vehicle turning stability control. In the event of occurrence of the first kind of abnormality of the assisting device 81 described above, the shut-off valve 372 is held in its closed state with the solenoid coil kept de-energized, even when the brake pedal 10 is operated or the traction or vehicle turning stability control is commanded to be effected. When the fluid pressure in the first pressurizing chamber 302 has become higher than the fluid pressure in the assisting pressure chamber 360 by a predetermined amount, the pressurized fluid in the first pressurizing chamber 302 is supplied to the assisting pressure chamber 360 through the differential shut-off valve 376, orifice 377 and shut-off valve 372.

Similarly, the second pressurizing chamber 304 and the assisting pressure chamber 370 are connected to each other through a fluid passage 380 in which a solenoid-operated shut-off valve 382 and a flow restrictor device 384 are provided. The shut-off valve 382 is closed when the brake pedal 10 is operated, but is held in its open state when the traction control or the vehicle turning stability control is effected. In the latter case, the shut-off valve 382 is held in the open state while the above-indicated shut-off valve 372 is held in its closed state, so that the pressurized fluid controlled by the assisting drive force control device 109 is not supplied to the first pressurizing chamber 302, but is supplied to the second pressurizing chamber 304 through the shut-off valve 382 and the check valve 386. In the event of occurrence of the first kind of abnormality of the assisting device 81, the shut-off valve 382 is returned to the open state, causing the pressurized fluid in the second pressurizing chamber 304 to be supplied to the assisting pressure chamber 360 through the differential shut-off valve 380, orifice 389 and shut-off valve 382.

In the present ninth embodiment of FIG. 21, the operating force F of the brake pedal 10 is detected by a force sensor 390, and the fluid pressure in the assisting pressure chamber 360 is detected by an assisting pressure sensor 392, while the fluid pressure in the first pressurizing chamber 302 is detected by a master cylinder pressure sensor 394. The force sensor 390 is a relatively inexpensive sensor which is capable of detecting the operating force with a relatively high degree of accuracy when the operating force is relatively small, but with a relatively low degree of accuracy when the operating force is relatively large. In view of this fact, the operating force of the brake petal 10 is estimated on the basis of the fluid pressures in the assisting pressure chamber 360 and the first pressurizing chamber 302. In the present embodiment, the force sensor 390 is adapted to detect as the operating force F a reaction force F' which is applied from the first pressurizing piston 322 to the brake pedal 10.

The first pressurizing piston 322 receives the operating force F=F' detected by the force sensor 390, an assisting drive force F based on the fluid pressure in the assisting pressure chamber 360, and a force $F_M$ based on the fluid pressure in the fluid chamber 348 of the first pressurizing chamber 302. These forces F', $F_S$ and $F_M$ have a relationship represented by the following equation:

$$F' + F_S = F_M$$

The force $F_M$ is a product of the master cylinder pressure $P_M$ detected by the master cylinder pressure sensor 394 and a transverse cross sectional area $S_M$ of the large-diameter portion 362 of the first pressurizing piston 322, that is, $F_M = P_M \times S_M$ On the other hand, the assisting drive force $F_S$ is a product of the fluid pressure $P_S$ detected by the assisting pressure sensor 392 and the cross sectional area $S_M$ minus a cross sectional area $S_P$ of the small-diameter portion of the piston 322, that is, $F_S = \{P_S \times (S_M - S_P)\}$. Therefore, the operating force F' can be estimated according to the following equation:

$$F' = (P_M \times S_M) - \{P_S \times (S_M - S_P)\}$$

On the other hand, the reaction force F' and the operating force F acting on the pedal pad 97 have a relationship represented by the following equation:

$$F = F' \times L_M / L_F$$

Therefore, the operating force F can be estimated according to the following equation, where the operating force F acting on the pedal pad 97 is detected by a force sensor:

$$F = [(P_M \times S_M) - \{P_S \times (S_M - S_P)\}] \times L_M / L_F$$

As described above with respect to the first embodiment of FIG. 1, $L_M$ represents the distance between the fulcrum 96 of the brake pedal 10 and the engaging end of the assisting piston 322, while $L_F$ represents the distance between the pedal pad 97 and the fulcrum 96.

The first and second pressurizing chambers 302, 304 are connected to the reservoir 76 through respective fluid passages 398, 399, while a fluid passage 400 connected to the suction side of the pump 70 is also connected to the reservoir 76. In the present embodiment, the interior of the reservoir 76 is divided by partition members 401a and 401b into three fluid chambers to which the three fluid passages 398, 399 and 400 are connected, respectively, so that an abnormality of one of three hydraulic circuit systems associated with the chambers 302, 304 and pump 70 will not have an influence on the other hydraulic circuit systems.

In the fluid passage 398, there are provided two check valves 402a, 402b in series with each other. These check valves 402a, 402b inhibit a flow of the fluid in a direction from the first pressurizing chamber 302 towards the reservoir 67, but permit a flow of the fluid in the opposite direction. In the presence of the check valves 402a, 402b inhibiting the fluid flow from the chamber 302 towards the reservoir 76, the fluid pressure in the chamber 302 can be increased with high stability when the first pressurizing piston 322 is advanced. Further, the check valves 402a, 402b permitting the fluid flow from the reservoir 76 into the chamber 302 when the volume of the chamber 302 is increased, the fluid pressure in the chamber 302 is prevented from being lowered below the atmospheric pressure, when the first and second pressurizing pistons 322, 324 are retracted. In addition, the provision of the fluid passage 398 and check valves 402a, 402b eliminates a need of providing the pressurizing pistons 322, 324 with primary cups or inlet valves, and a need of giving the pressurizing pistons 322, 324 relatively large operating strokes for opening and closing such primary cups or inlet valves, whereby the longitudinal dimension of the master cylinder 300 can be reduced. Similarly, two check valves 404a, 404b are provided in series with each other in the fluid passage 399 connected to the second pressurizing chamber 304.

The cylinder housing 320 has two openings 406, 40U which are open in the respective first and second pressurizing chambers 302, 304 and to which the respective fluid passage 398, 399 are connected. These openings 406, 407 are always open in the chambers 302, 304 irrespective of the axial position of the second pressurizing piston 324 relative to the cylinder housing 320. As described above, the second pressurizing piston 324 consists of the front second pressurizing piston 330 whose outer circumferential surface fluid-tightly and slidably engages the annular radial wall 334 formed on the inner circumferential surface of the cylinder housing 320, and the rear second pressurizing piston 332 whose annular radial walls 336, 337 fluid-tightly and slidably engages the inner circumferential surface of the cylinder housing 320. The opening 406 is positioned so as to avoid closure of the opening 406 by the annular radial wall 336.

In the assisting drive force control device 108, the fluid passage 400 and the fluid passage 361 are connected to each other through a fluid passage 410 which by-passes the pressure increase and pressure reduction control valves 74, 75. In the fluid passage 410, there are provided two check valves 412, 413 which permit a fluid flow in a direction from the reservoir 76 towards the assisting pressure chamber 360, inhibit a fluid flow in the opposite direction. The fluid passage 410 permits the fluid to be supplied from the reservoir 76 to the assisting pressure chamber 360, to thereby prevent the fluid pressure in the chamber 360 to be lowered below the atmospheric level, when the brake pedal 10 is operated in the event of an electrical abnormality that prevents energization of the solenoid coils of the control valves 74, 75 and causes these control valves to be held in the closed state.

A solenoid-operated shut-off valve 418 is provided between the pressure reduction control valve 75 and the reservoir 76. This shut-off valve 418 is opened when the fluid pressure in the assisting pressure chamber 360 is reduced, that is, when the fluid is returned from the chamber 360 to the reservoir 76 through the pressure reduction control valve 75. In the other condition, the shut-off valve 418 is held in the closed state. The shut-off valve 418 functions to prevent a discharge flow of the fluid from the assisting pressure chamber 360 through the control valve 75, and permits the fluid to be discharged from the assisting pressure chamber 360 to the reservoir 76 when the control valve 74 is open. In this respect, the shut-off valve 418 may be considered to be a pressure reduction responsive shut-off valve which is opened when the pressure reduction control valve 75 is opened. The shut-off valve 418 may be positioned between the pressure reduction control valve 74 and a point of connection 419 of the pressure increase control valve 74 with the fluid passage 361.

The ROM 132 of the pressure control device 80 stores a traction control program for performing the traction control of the drive wheels 14, 16, a vehicle turning detecting program for detecting a turning of the vehicle, a vehicle turning stability control program for performing the vehicle turning stability control, and an operating force estimating program for estimating the operating force F of the brake pedal 10, in addition to the motor control program for executing the motor control routine illustrated in the flow chart of FIG. 8, and the assisting drive force control program, for controlling the fluid pressure in the assisting pressure chamber 360. To the input portion 133 of the pressure control device 80, there are connected the wheel speed sensors 140, 146, the assisting pressure sensor 392, the master cylinder pressure sensor 394, an accelerator operation sensor 420, and a yaw rate sensor 422. The accelerator operation sensor 420 detects an operation of an accelerator pedal of the vehicle, and a turning of the vehicle is detected on the basis of the yaw rate of the vehicle detected by the yaw rate sensor 422 and the wheel speeds detected, by the wheel speed sensors 140–146.

When the brake pedal 10 is operated in the braking system of FIG. 21 constructed as described above, the solenoid-operated shut-off valves 372, 382 are closed, and the shut-off valves 312 for the rear drive wheels 14, 16 are closed, while the shut-off valve 363 is held in the open state. As the brake pedal 10 is depressed, the first pressurizing piston 322 is advanced relative to the rear second pressurizing piston 332 against the biasing force of the spring 352. When the operating speed of the brake pedal 10 is not so high, the fluid in the fluid chamber 348 is fed into the annular chamber 344 through the orifice 350. As the fluid pressure in the fluid chamber 348 is increased, the rear and front second pressurizing pistons 332, 330 are advanced against the biasing force of the spring 338, so that the volume of the annular chamber 344 is reduced, and the fluid pressure in the first pressurizing chamber 302 is accordingly increased. The fluid pressurized in the first pressurizing chamber 302 is supplied to the wheel brake cylinders 26, 28, while the fluid pressurized in the second pressurizing chamber 304 is supplied to the wheel brake cylinders 22, 24. The fluid pressure in the assisting pressure chamber 360 is controlled by controlling the pressure increase and pressure reduction control valves 74, 75, as described above with respect to the first embodiment of FIG. 1.

When the brake pedal 10 is released, the shut-off valves 312, 316 are opened to return the pressurized fluid from the wheel brake cylinders 22–28 to the reservoir 76. The shut-off valves 312 for the rear wheels 14, 16 are held in the open state, while the shut-off valves 316 for the front wheels 18, 20 are held in the open state for a predetermined time and are then restored to the closed state. In the meantime, the pressurized fluid in the assisting pressure chamber 360 is returned partly to the reservoir 76 through the normally-open pressure reduction control valve 75, partly to the first pressurizing chamber 302 through the opened shut-off valve 372 and the check valve 378, and partly to the second pressurizing chamber 304 through the opened shut-off valve 382 and the check valve 386. As the volumes of the first and second pressurizing chambers 302, 304 are increased as a result of the movement of the brake pedal 10 back to the non-operated position, the fluid is supplied from the reservoir 76 to the chambers 302, 304 through the fluid passages 398, 399, so that the fluid pressures in the chambers 302, 304 are prevented from being lowered below the atmospheric level.

Where the brake pedal 10 is operated at a relatively high speed so as to reduce the volume of the fluid chamber 348, the fluid pressure in the fluid chamber 348 is rapidly increased due to a fluid flow restricting function of the orifice 350, so that a relatively large fluid pressure difference is generated between the fluid chamber 348 and the annular chamber 346. Accordingly, the second pressurizing piston 324 is advanced by this fluid pressure difference, and the volumes of the first and second pressurizing chambers 302, 304 are reduced so as to rapidly increase the fluid pressures in these chambers 302, 304 and the fluid pressures in the wheel brake cylinders 22–28. This arrangement is effective to reduce a delay in the braking effect in an initial portion of the operation of the brake pedal 10 at a relatively high speed.

As the fluid pressure in the fluid chamber 348 is, increased, the operating force F' as detected by the force sensor 390 is increased, and the fluid pressure in the assisting pressure chamber 360 is controlled so as to increase with the detected operating force F', so that the fluid pressure in the fluid chamber 348 is further increased to increase, the fluid pressure in the wheel brake cylinders 22–28.

When the account of slip of the drive wheels 2 has become excessively large with respect to the friction coefficient of the road surface, that is, when the predetermined condition for initialing the traction control of the drive wheels 22, 24 is satisfied, the shut-off valves 382 is held in the open state, and the shut-off valves 372 and 363 are closed. The pressurized fluid whose pressure is controlled by the assisting drive force control device 109 is supplied to the second pressurizing chamber 304, but is not supplied to the assisting pressure chamber 360 and the first pressurizing chamber 302. Thus, only the fluid pressure in the wheel brake cylinders 22, 24 for the rear drive wheels 14, 16 is increased to brake the drive wheels 14, 16, without an operation of the brake pedal 10. The fluid pressure in the wheel brake cylinders 22, 24 is controlled by controlling the shut-off valves 44, 312, so as to hold the slipping amount of the drive wheels 14, 16 within an optimum range.

In the traction control, the second pressurizing piston 324 is placed in its fully retracted position, so that the pressurized fluid supplied to the second pressurizing chamber 304 will not causes a retracting movement of the second pressurizing piston 324. Thus, the fluid pressure in the second pressurizing chamber 304 can be increased while the volume of the first pressurizing chamber 302 is held constant. In other words, only the fluid pressure in the wheel brake cylinders 22, 24 for the drive wheels 14, 16 can be increased, without increasing the fluid pressure in the wheel brake cylinders 26, 28 for the driven wheels 18, 20. Further, the first pressurizing piston 322 is permitted to be advanced while the second pressurizing piston 324 is placed in the fully retracted position. Therefore, the fluid pressure in the first pressurizing chamber 302 can be increased immediately after an operation of the brake pedal 10 during the traction control, so that the driven wheels 18, 20 can also be braked with a high response to the operation of the brake pedal 10 during the traction control. The operation of the brake pedal 10 during the traction control causes the shut-off valve 363 to be opened to supply the pressurized fluid from the assisting drive force control device 108 to the assisting pressure chamber 360. An increase in the operating stroke of the brake pedal 10 operated during the traction control can be restricted by closing the shut-off valve 382.

If the vehicle, has an excessive spinning or drift-out tendency during turning, the vehicle turning stability control is initiated to remove this tendency. The vehicle turning stability control is effected to generate a difference between the fluid pressures in the wheel brake cylinders 22, 24 for the right and left drive wheels 14, 16, so as to give a yaw moment to the vehicle for thereby eliminating the excessive spinning or drift-out tendency of the turning, vehicle. In the vehicle turning stability control, the shut-off valves 372, 373 are closed while the shut-off valve 382 is held open, as in the traction control. The fluid pressures in the wheel brake cylinders 22, 23 for the drive wheels 14, 16 are controlled independently of each other, by controlling the shut-off valves 44, 312.

When an automatic brake is applied, to the vehicle in an emergency, the solenoid-operated shut-off valves 363, 372, 382 are opened, and the pressurized fluid is supplied from the accumulator 72 to the assisting pressure chamber 360 and the first and second pressurizing chambers 302, 304.

In the event of occurrence of an electrical abnormality of the braking system, all of the solenoid-operated shut-off valves are returned to their original states shown in FIG. 21. When the brake pedal 10 is operated in this condition, the fluid is supplied from the reservoir 76 to the assisting pressure chamber 360 through the check valves 412, 413, to prevent the fluid pressure in the chamber 360 from being lowered below the atmospheric, pressure. When the fluid pressure in the first pressurizing chamber 302 has become higher than that in the assisting pressure chamber 360 by the opening pressure difference of the differential shut-off valve 376 or more, the pressurized fluid in the first pressurizing chamber 302 is supplied to the assisting pressure chamber 360 through the differential shut-off valve 376, orifice 377 and shut-off valve 372. When the fluid pressure in the second pressurizing chamber 304 nas become higher than that in the assisting pressure chamber 360 by the opening pressure difference of the differential shut-off valve 388 or more, the pressurized fluid in the second pressurizing chamber 304 is supplied to the assisting pressure chamber 300 through the differential shut-off valve 388, orifice 389 and shut-off valve 382. Thus, the fluid pressures in the wheel brake cylinders 22–28 can be increased while restricting an increase in the operating stroke of the brake pedal 10. Further, since the shut-off valve 418 is in the closed state, the pressurized fluid in the assisting pressure chamber 360 is prevented from being discharged into the reservoir 76 through the pressure reduction control valve 74. In addition, the provision of the orifices 377, 389 is effective to reduce a delay of the braking effect when the operating speed of the brake pedal 10 is relatively high. In the event of an electric abnormality of the braking system, the solenoid-operated shut-off valves 312, 316 is controlled by the emergency control device 318, so that the braking system can be operated.

In the present ninth embodiment of FIG. 21, the assisting device 81 provides a second pressurizing chamber pressurizing device for pressurizing the fluid in the second pressurizing chamber 304, and the rear open end face 346 of the second pressurizing piston 324 and the rear end facet of the cylinder housing 320 cooperate to provide a volume reduction preventing device for preventing reduction of the volume of the first pressurizing chamber 302 when the fluid pressure in the second pressurizing chamber 304 is increased by the second pressurizing chamber pressurizing device. Further, the assisting pressure sensor 392, master cylinder pressure sensor 394 and a portion of the pressure control device 80 assigned to estimate the operating force F' of the brake pedal 10 on the basis of the outputs of these pressure sensors 392, 394 cooperate to provide a brake operating force estimating device for estimating the operating force F' of the brake pedal 10.

In the hydraulically operated braking system of the ninth embodiment, the shut-off valves 312 for the rear drive wheels 14, 16 are normally open, while the shut-off valves 316 for the front driven wheels 18, 20 are normally closed. However, it is possible that the shut-off valves 312 are normally closed while the shut-off valves 316 are normally open. In this case, the shut-off valve 363 is not essential, since the fluid pressurized in the first pressurizing chamber 302 as a result of an advancing movement of the first pressurizing piston 322 by the pressurized fluid supplied to the assisting pressure chamber 360 during the traction control is returned to the reservoir 76 through the normally open shut-off valves 316, so that the wheel brake cylinders 26, 28 are not activated during the traction control. The configuration of the second pressurizing piston 324 is not limited to the details of the illustrated ninth embodiment. For instance, the front and rear second pressurizing pistons 330, 332 may be formed integrally with each other, or the front second pressurizing piston 330 may take the form of a circular disc. Further, the fully retracted position of the second pressurizing piston 324 need not be defined by the rear end of the cylinder housing 320. The first and second pressurizing pistons 322, 324 may be disposed in series, and may have the same pressure-receiving surface areas. It is needless to say that the master cylinder and the assisting cylinder may be provided as separate units. The stroke adjusting device 128 may be provided in the present braking system of FIG. 21.

Figure 22:
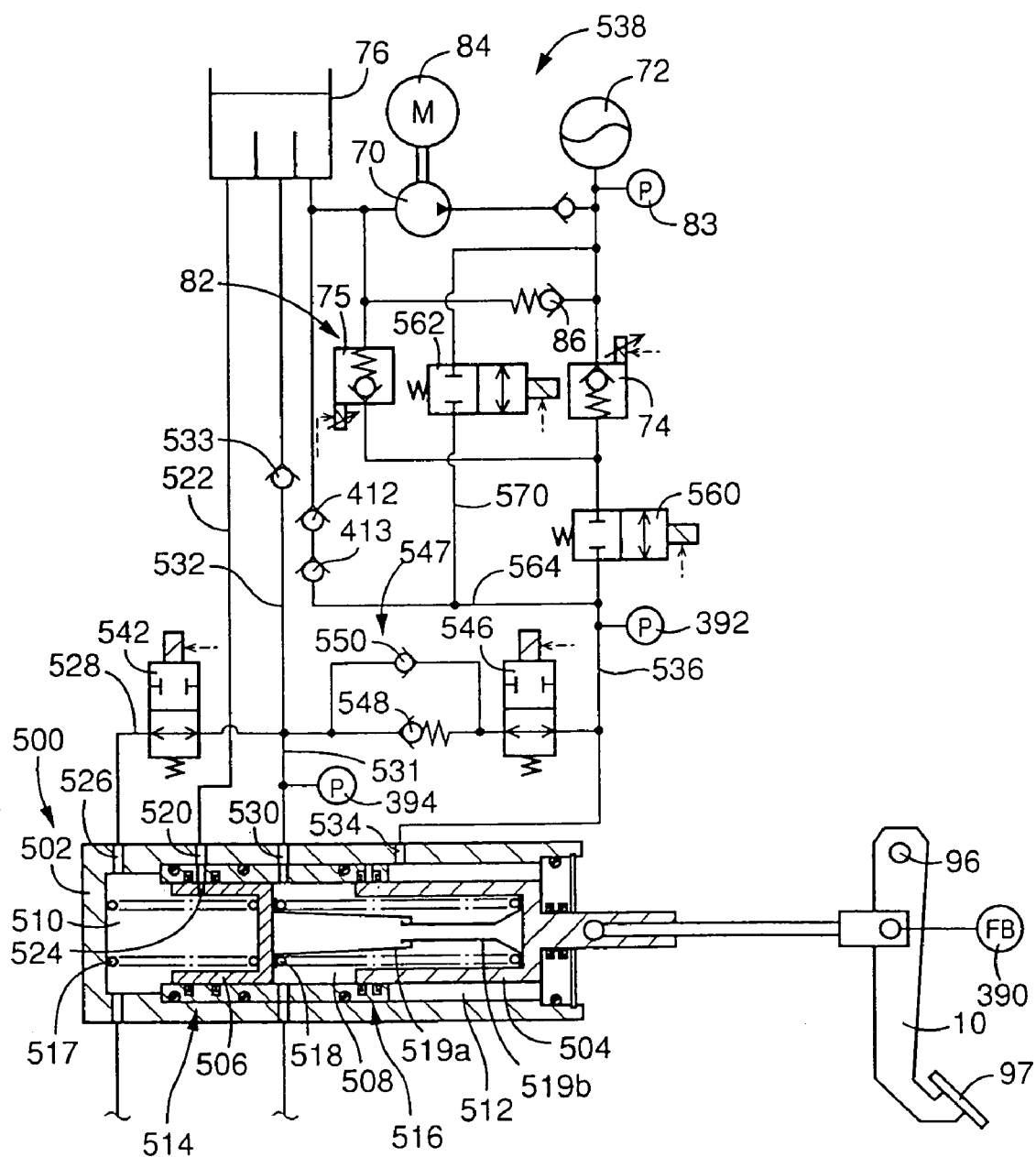
FIG. 22 is a circuit diagram showing a part of a hydraulically operated braking system according to a tenth embodiment of the invention.

Reference is now made to FIG. 22 showing a hydraulically operated braking system constructed according to a tenth embodiment of this invention.

The braking system of FIG. 22 uses a master cylinder 500 including a cylinder body 502 in which there are fluid-tightly and slidably received a first and a second pressurizing piston 504, 506. The cylinder body 502 and the two pressurizing pistons 504, 506 define a first and a second pressurizing piston 508, 510 in front of the two pistons 504, 506, respectively. The cylinder body 502 and the first pressurizing piston 504 cooperate to define an assisting pressure chamber 512 on the side of the piston 504 remote from the first pressurizing chamber 508. Thus, the first pressurizing piston 504 also functions as an assisting piston. The cylinder housing 502 is provided with a pair of primary cups 514 and a pair of primary cups 516, and has a port 520 formed between the primary cups 514. The second pressurizing chamber 51U is connected to the reservoir 76 through the port 520 and a fluid passage 522.

The second pressurizing piston 506 has a communication hole 524 open in the second pressurizing chamber 510. The communication hole 524 is positioned such that the second pressurizing chamber 510 communicates with the port 520 through the hole 524 when the second pressurizing piston 506 is placed in the original or fully retracted position with the brake pedal 10 placed in the non-operated position. When the second pressurizing piston 506 is advanced by an operation of the brake pedal 10, the communication hole 524 is closed by the cylinder housing 502 and is disconnected from the port 520, so that the fluid pressure in the chamber 510 can be increased when the brake pedal 10 is operated. When the brake pedal 10 is released, the second pressurizing piston 506 is returned to the fully retracted position in which the communication hole 520 communicates with the port 520, to permit the pressurized fluid to be discharged from the second pressurizing chamber 520 into the reservoir 76 through the fluid passage 522. As the volumes of the first and second pressurizing chambers 508, 510 are increased, the fluid is supplied from the reservoir 76 through the fluid passage 522 into the chambers 508, 510 with elastic deformation of the primary cups 514, so that the fluid pressures in the chambers 508, 510 are prevented from being lowered below the atmospheric level.

The first pressurizing chamber 508 and the assisting pressure chamber 512 are fluid-tightly separated from each other by the pair of primary cups 516. The master cylinder 500 of the present embodiment is not a piston type cylinder, but is a Girling or plunger type cylinder using the primary cups 514, 516 held by the cylinder housing 502.

A spring 517 is disposed in the second pressurizing chamber 510, to bias the second pressuring piston 506 towards the fully retracted position, while a spring 518 is disposed in the first pressurizing chamber 508, to bias the first pressuring piston 504 towards the fully retracted position via retainers 519a, 519b.

The cylinder housing 502 has ports 526, 530 and 534 in addition to the port 520 indicated above. The port 526 is open to the second pressurizing chamber 310 and is connected to a fluid passage 528, which is connected to a fluid passage 536 connected to the port 534 open to the assisting pressure chamber 512. Thus, the second pressurizing chamber 510 is connected to the assisting pressure chamber 512 through the port 526, fluid passages 528, 536 and port 534. The port 530 is open to the first pressurizing chamber 508 and is connected to a fluid passage 531 which is connected to the fluid passage 528. Therefore, the first and second pressurizing chambers 508, 510 and the assisting pressure chamber 512 are connected to each other through the fluid passages 528, 530, 536. The fluid passage 531 is connected also to a fluid passage 532 connected to the reservoir 76. A check valve 533 is provided in the fluid passage 532. This check valve 533 allows a flow of the fluid in a direction from the reservoir 76 towards the first pressurizing chamber 508, but inhibits a flow of the fluid in the opposite direction. The assisting pressure chamber 512 is connected to an assisting drive force control device 538 through the port 534 and the fluid passage 536.

A normally-open solenoid-operated shut-off valve 542 is provided in a portion of the fluid passage 528 between the second pressurizing chamber 510 and a point of connection to the fluid passage 531 connected to the first pressurizing chamber 508. A normally-open solenoid-operated shut-off valve 546 and a flow restrictor device 547 are provided in a portion of the fluid passage 528 between the above-indicated point of connection and the fluid passage 536 connected to the assisting pressure chamber 512. Like the flow restrictor devices 374, 384 in the ninth embodiment of FIG. 21, the flow restrictor device 547 includes a differential shut-off valve 548 and a check valve 550.

Like the assisting drive force control device 109 provided in the preceding embodiments, the assisting drive force control device 538 includes the pressure increase control valve 74, pressure reduction control valve 74, pump 70 and accumulator 72. The flow respirator device 538 further includes two normally-closed solenoid-operated shut-off valves 560, 562.

The shut-off valve 560, which functions as an emergency closure valve is disposed between the assisting pressure chamber 512 and the solenoid-operated pressure control valve device 82 which includes the pressure increase and pressure reduction control valves 74, 75. While the brake pedal 10 is in operation, the shut-off valve 560 is held in the open state if the solenoid-operated pressure control valve device 82 is normal, but is restored to the closed state if the valve device 82 becomes abnormal. The shut-off valve 560 placed in the closed state prevents a continuous discharge flow of the pressurized fluid from the assisting pressure chamber 512 into the reservoir 76 through the pressure reduction control valve 75, and a continuous supply flow of the pressurized fluid from the accumulator 72 into the assisting pressure chamber 512 through the pressure increase control valve 74. The assisting pressure chamber 512 is connected to the reservoir 76 through a reservoir passage 564 which by-passes the solenoid-operated pressure control valve device 82 and the shut-off valve 560. The check valves 41Z, 412 are provided in the reservoir passage 564.

The solenoid-operated shut-off valve 562, which functions as an emergency high-pressure source communicating device, is disposed in a by-pass passage 570 which connects the assisting pressure chamber 512 and the accumulator 72, while by-passing the solenoid-operated pressure control valve device 82 and the shut-off valve 560. The shut-off valve 562 is normally held in the closed state, but is brought to the open state if at least one of the pressure increase and pressure reduction control valves 14, 75 cannot be opened while the electrical system is normal. The shut-off valve 562 placed in the open state permits the pressurized fluid to be supplied from the accumulator 72 to the assisting pressure chamber 512.

The shut-off valve 562 may be disposed in a by-pass passage which connects the delivery side of the pump 70 and the assisting pressure chamber 512 while by-passing the solenoid-operated pressure control valve device 82 and the shut-off valve 560. In this case, the shut-off valve 562 is opened in the event of occurrence of an abnormality of the pressure control valve device 82 or the shut-off valve 560, so that the fluid delivered from the pump 70 is supplied to the assisting pressure chamber 512. In this case, it is desirable to provide the by-pass passage with a check valve which allows a flow of the fluid in a direction from the pump 70 towards the assisting pressure chamber 512 but inhibits a flow of the fluid in the opposite direction.

In the hydraulically operated braking system of FIG. 22 constructed as described above, the control valves 74, 75 and the solenoid-operated shut-off valves 542, 546, 560, 562 are controlled as indicated in the table of FIG. 23. In a normal braking operation with the brake pedal 10 being depressed, the pressure increase and pressure reduction control valves 74, 75 are controlled to control the fluid pressure in the assisting pressure chamber 512, in the same manner as described with respect to the embodiment of FIG. 1, and the shut-off valve 560 is held in the open state while the shut-off valve 546 is held in the closed state. When the wheel braking pressures are increased, the shut-off valve 542 is closed, and the pressurized fluid from the accumulator 72 is controlled by the pressure increase control valve 74 and supplied to the assisting pressure chamber 512 through the shut-off valve 560. When the wheel braking pressures are reduced, the shut-off valve 542 is restored to the open state, and the pressurized fluid in the assisting pressure chamber 512 is returned to the reservoir 76 through the pressure reduction control valve 75, while the pressurized fluid in the first pressurizing chamber 508 is returned to the reservoir 76 through the shut-off valve 542 and the second pressurizing chamber 510. Where the reduction of the wheel braking pressures is effected with the brake pedal 10 being released, the pressure reduction control valve 75 is held in the fully open state for a predetermined time with the maximum electric current being applied to the solenoid coil. As the volume of the first pressurizing chamber 508 is increased during releasing of the brake pedal 10, the fluid is supplied from the reservoir 76 into the first pressurizing chamber 508 through the fluid passages 532, 531, so that the fluid pressure in the chamber 508 is prevented from being lowered below the atmospheric level.

In an automatic braking operation without an operation of the brake pedal 10, such as a braking operation to effect the vehicle turning stability control, the pressure increase and pressure reduction control valves 74, 75 are controlled to control the fluid pressure in the assisting pressure chamber 512, as in the normal braking operation. When the wheel braking pressures are increased, the shut-off valve 542 is closed, and the shut-off valve 546 is opened, so that the pressurized fluid whose pressure is controlled by the assisting drive force control device 538 is supplied to not only the assisting pressure chamber 512 but also the first pressurizing chamber 508. When the wheel braking pressures are reduced, the pressurized fluid in the assisting pressure chamber 512 is returned to the reservoir 76 partly through the pressure reduction control valve 76, and partly through the shut-off valve 546, check valve 550, shut-off valve 542 and second pressurizing chamber 510. It is noted that the shut-off valve 542 may be opened when the wheel braking pressures are increased. In this case, the pressurized fluid whose pressure is controlled by the assisting drive force control device 538 is also supplied to the second pressurizing chamber 510.

In the event of occurrence of an electrical abnormality wherein no electric current can be applied to the solenoid-operated valves 74, 75, 542, 546, 560, 562, these valves are returned to their original states indicated in FIG. 22. Upon depression of the brake pedal 10 in this condition, the fluid is supplied from the reservoir 76 to the assisting pressure chamber 512 through the fluid passage 564 (and the check valves 412, 413), so that the fluid pressure in the chamber 512 is prevented from being lowered below the atmospheric pressure. When the fluid pressure in the first and second pressurizing chambers 508, 510 has become higher than that in the assisting pressure chamber 512 by the opening pressure difference of the differential shut-off valve 548 or more, the differential shut-off valve 548 is opened, so that the pressurized fluid is supplied from the pressurizing chambers 508, 510 to the assisting pressure chamber 512, whereby the wheel braking pressures are increased. In this case, the shut-off valve 560 is returned to the closed state, to prevent a continuous discharge flow of the fluid from the assisting pressure chamber 512 through the pressure reduction control valve 75, and a continuous supply flow of the fluid from the accumulator 72 into the assisting pressure chamber 512 through the pressure increase control valve 74. Thus, the shut-off valve 560 in the closed state prevents or minimizes a variation in the fluid pressure in the chamber 512. When the brake pedal 10 is released, the fluid is fed from the assisting pressure chamber 512 to the second pressurizing chamber 510 through the shut-off valve 546, check valve 550 and shut-off valve 542, and is returned to the reservoir 76.

Where at least one of the pressure increase control valve 74 and the shut-off valve 560 cannot be opened and held in the closed state due to an abnormality while the electric system is normal, the shut-off valve 562 is opened. For instance, the control valve 74 or the shut-off valve 560 cannot be opened due to sticking of a valve member due to a foreign matter contained in the fluid. In this instance in which the pressurized fluid in the accumulator 72 cannot be supplied to the assisting pressure chamber 512 through the valves 74, 560, the shut-off valve 562 is opened to permit the pressurized fluid to be supplied from the accumulator 72 to the chamber 512 through the by-pass passage 570, for increasing the wheel braking pressures. The abnormality of at least one of the valves 74, 560 can be detected if the fluid pressure in the assisting pressure chamber 512 as detected by the assisting pressure sensor 392 is lower than the predetermined lower limit even when the valves 74, 560 are commanded to be open. The above abnormality may also be kilo detected if the actual value of the fluid pressure in the assisting pressure chamber 512 as detected by the sensor 392 is lower than the desired or target value by more than a predetermined value, and if the absolute value of the fluid pressure difference is not reduced. In the event of occurrence of the abnormality of the valve 74 and/or the valve 560, the shut-off valves 542 and 546 as well as the shut-off valve 562 may be opened.

The shut-off valve 562 may be closed if at least one of the pressure increase and pressure reduction control valves 74, 75 cannot be closed while the electrical system is normal. This abnormality of the pressure increase control valve 74 can be detected if the detected fluid pressure in the assisting pressure chamber 512 is higher than a predetermined upper limit even when the pressure increase control valve 74 is commanded to be closed. The abnormality can also be detected if the detected fluid pressure in the assisting pressure chamber 512 is higher than the desired or target value by more than a predetermined value, and if the absolute value of this pressure difference is increasing. Similarly, the abnormality of the pressure reduction control valve 75 can be detected. The shut-off valve 562 placed in the closed state prevents an abrupt variation of the fluid pressure in the assisting pressure chamber 512 in the event of occurrence of the abnormality of at least one of the control valves 74, 75.

The shut-off valve 562 and the by-pass passage 570 are not essential, since an abnormality of the solenoid-operated pressure control valve device 82 can be dealt with in the same manner as in the event of an electrical abnormality described above. Further, the shut-off valve 560 is not essential, since the amount of fluid pressure variation in the assisting fluid chamber 512 due to the fluid leakage through the solenoid-operated pressure control valve device 82 is small where the fluid leakage is not serious. Further, the fluid passage 532 may be connected to a portion of the fluid passage 528 between the check valve 550 and the shut-off valve 546, rather than to the fluid passage 531. In this case, the reservoir 76 and the first pressurizing chamber 508 are connected to each other through the fluid passages 532, 528 and the two check valves 533, 550.

The cylinder housing 502 may have a port which is formed between the primary cups 516, to connect the first pressurizing chamber 508 to the reservoir 76 through a fluid passage connected to that port. In this case, the first pressurizing piston 504 has a communication hole communicating with the first pressurizing chamber 508 and the above-indicated port when the piston 504 is in the fully retracted position. In this arrangement, the fluid is supplied from the reservoir 76 to the first pressurizing chamber 508 with elastic deformation of the primary cups 516, and the fluid is returned from the chamber 508 to the reservoir 76 through the above-indicated communication hole, port and fluid-passage when the brake pedal 10 is released. Accordingly, it is not necessary to open the shut-off valve 542 when the brake pedal 10 is released to reduce the wheel braking pressures.

Figure 24:
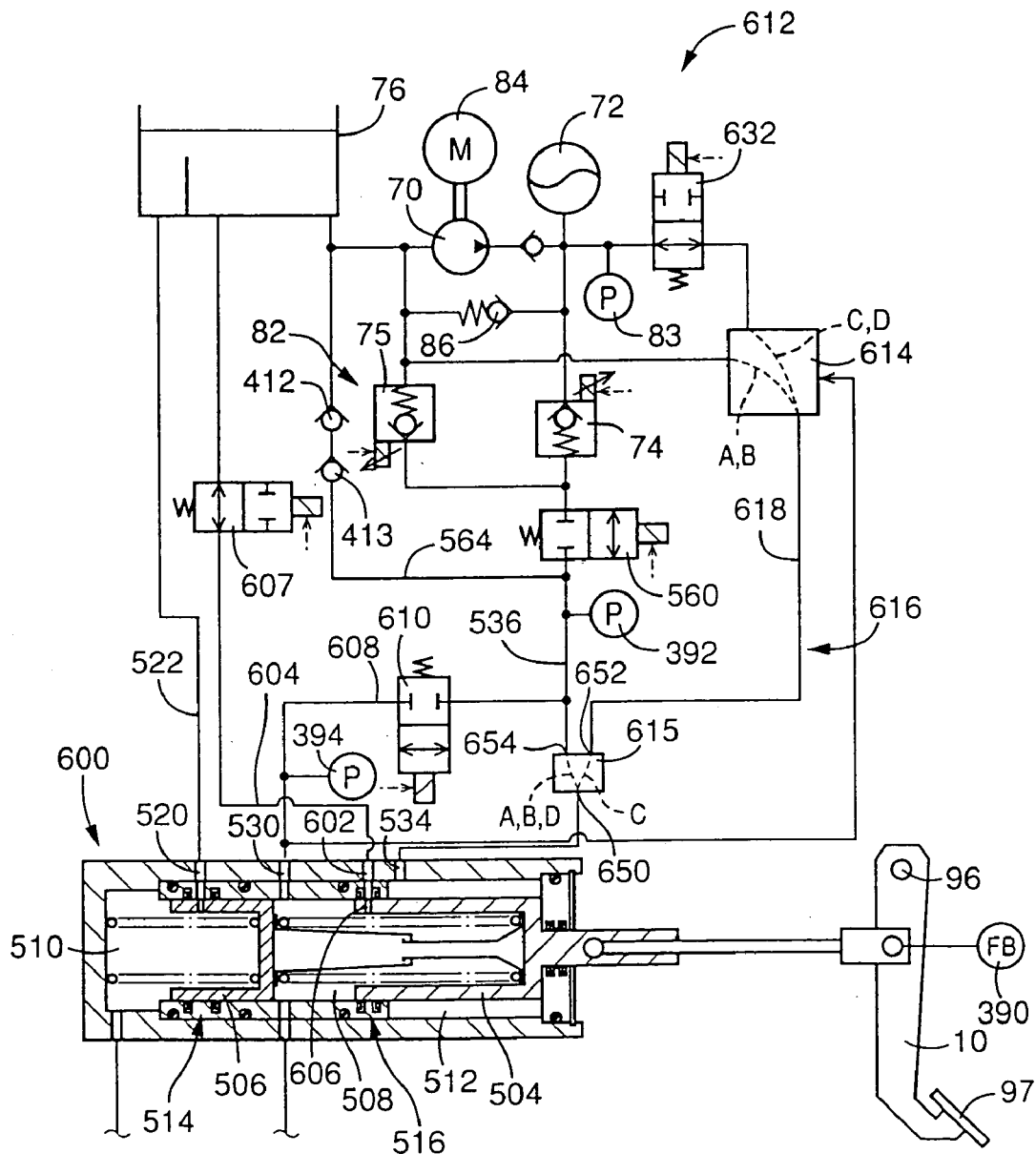
FIG. 24 is a circuit diagram showing a part of a hydraulically operated braking system according to an eleventh embodiment of this invention.

Referring to FIG. 24, there is illustrated an example of the above arrangement according to an eleventh embodiment of this invention. This embodiment uses a master cylinder 600 wherein the cylinder housing 502 has a port 602 formed between the pair of primary cups 516. The port 602 is connected to a fluid passage 604, which is connected to the reservoir 76. The first pressurizing piston 504 has a communication hole 606 which is open to the first pressurizing chamber 508 and which communicates with the port 602 when the piston 504 is in the fully retracted position of FIG. 24. Accordingly, the fluid is returned from the first pressurizing chamber 508 to the reservoir 76 through the communication hole 606, port 602 and fluid passage 604 when the piston 504 is returned to its fully retracted position. A normally-open solenoid-operated shut-off valve 607 is provided in the fluid passage 604. This shut-off valve 607 is closed when the fluid pressure in the assisting pressure chamber 512 is increased while the brake pedal 10 is in the non-operated position. The first pressurizing chamber 508 is connected to the assisting pressure chamber 512 through a fluid passage 608 in which a normally-closed solenoid-operated shut-off valve 610 is disposed. However, a flow restrictor device is not provided in the fluid passage 608.

The present braking system has an assisting drive force control device 612 which includes an emergency high-pressure source communication device 616 as well as the pump 70, solenoid-operated pressure control valve device 82 and shut-off valves 560. The emergency high-pressure source communicating device 616 includes a regulator 614 and a change valve 615.

The regulator 614 is provided in a fluid passage 618 which connects the accumulator 62 and the assisting pressure chamber 512 while by-passing the solenoid-operated pressure control valve device 82 and the shut-off valve 560. The regulator 614 is connected to the change valve 615, reservoir 76 and accumulator 72. The regulator 614 is operated on the basis of the fluid pressure in the first pressurizing chamber 508, to supply the fluid from the reservoir 76 to the change valve 615, or supply the pressurized fluid from the accumulator 72 to the change valve 615. The change valve 615 is connected to the fluid passages 618, 536, and to the port 534 communicating with the assisting pressure chamber 512. The change valve 615 functions to apply to the assisting pressure chamber 512 the fluid pressure as controlled by the regulator 614 or the fluid pressure as controlled by the solenoid-operated pressure control valve device 82 (as applied to the first pressurizing chamber 508).

Figure 25:
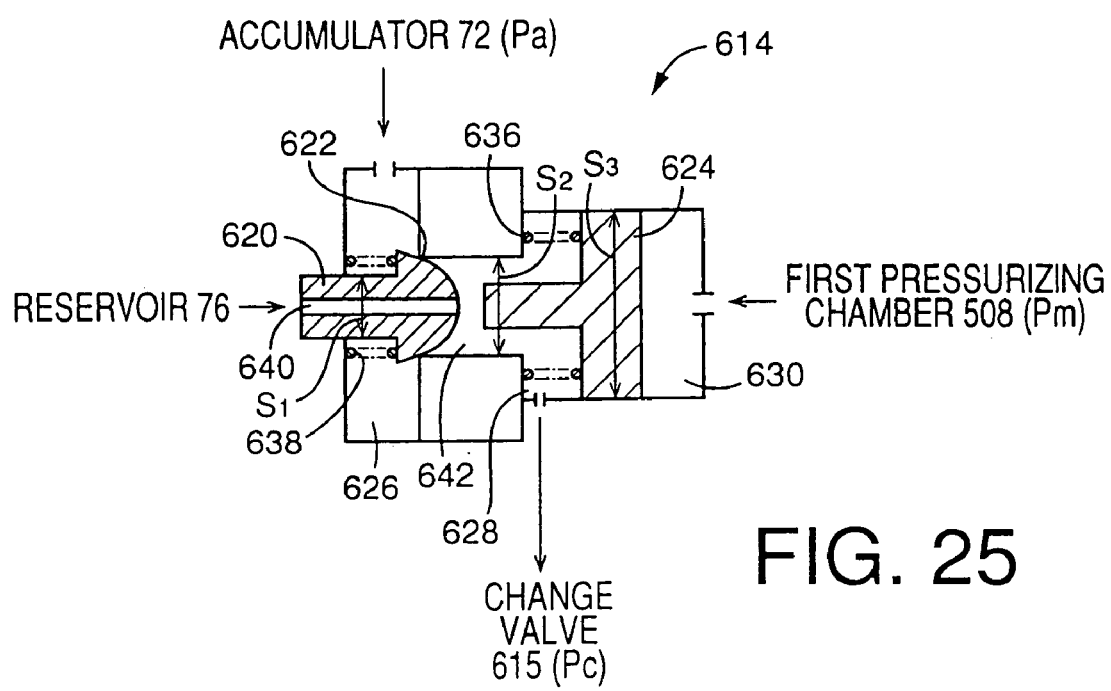
FIG. 25 is a view schematically showing a regulator provided in the braking system of FIG. 24.

As shown in FIG. 25, the regulator 614 includes a valve member 620, a valve seat 622, and a drive member 624. These elements 620, 622, 624 cooperate with the valve housing to define a first fluid chamber 626, a second fluid chamber 628 and a third fluid chamber 630. The first fluid chamber 626 is connected to the accumulator 72 through a solenoid-operated shut-off valve 632, and the second fluid chamber 628 is connected to the change valve 615, while the third fluid chamber 630 is connected to the first pressurizing chamber 508.

In the state of FIG. 25, the drive member 624 is held in its fully retracted position under the biasing force of a spring 636, and the valve member 620 is held seated on the valve seat 722 under the biasing force of a spring 600, so that the second fluid chamber 628 is disconnected from the first fluid chamber 626 and is communicated with the reservoir 76 through a fluid passage 640 formed through the valve member 620. In this state, the fluid is supplied from the reservoir 76 to the change valve 615.

When the fluid pressure in the first pressurizing chamber 508 of the master cylinder 600 is increased, the drive member 624 is advanced against the biasing force of the spring 636. When the fluid pressure in the first pressurizing chamber 508 has been increased to a level at which the following inequality is satisfied, the valve member 620 is moved by the drive member 624 away from the valve seat 0.622, and the fluid passage 640 is closed by the drive member 624:

$$P_M \times S_3 > Pa(S_2 - S_1) + Pc(S_3 - S_2)$$

In the above inequality, Pa, Pc, and $P_M$ represent the fluid pressures in the first, second and third fluid chambers 626, 628, 630, respectively, that is, the fluid pressure in the accumulator 72, the fluid pressure to be applied to the change valve 615, and the fluid pressure in the first pressurizing chamber 508 (master cylinder pressure), respectively, and $S_1$, $S_2$ and $S_3$ represent the cross sectional area of the small-diameter portion of the valve member 624, the cross sectional area of a communication passage 642 between the first and second fluid chambers 626, 628, and the cross sectional area of the large-diameter portion of the drive member 624. It is noted that the biasing forces of the springs 636, 638 are ignored in the above inequality.

As a result, the second fluid chamber 628 is disconnected from the reservoir 76, and is communicated with the first fluid chamber 626, so that the pressurized fluid of the accumulator 72 is supplied to the change valve 615.

The regulator 614 is operated such that the fluid pressure to be applied to the change valve 615 is controlled as represented by the following equation:

$$Pc = P_M \times S_3/(S_3 - S_2) - Pa(S_2 - S_1)/(S_3 - S_2)$$

Thus, the fluid pressure in the assisting pressure chamber 512 (the fluid pressure to be applied to the change valve 615) is controlled depending upon the fluid pressure in the first pressurizing chamber 508.

The change valve 615 has a first port 650 communicating with the assisting pressure chamber 512, a second port 652 connected to the regulator 614, a third port 654 connected to the fluid passage 536 (connected to the solenoid-operated pressure control valve device 82 and the first pressurizing chamber 508), and a spool which is moved such that the first port 650 is connected to one of the second and third ports 652, 654 whose fluid pressure is higher, and is disconnected to the other port 642, 654 whose fluid pressure is lower. When the fluid pressure at the second port 652 is the same as that at the third port 654, the spool is placed in a neutral position in which the first port 650 is connected to both of the second and third ports 652, 654. When the fluid pressure at the second port 652 is higher than that at the third port 654, the fluid pressure controlled by the regulator 614 is applied to the assisting pressure chamber 512.

The hydraulically operated braking system constructed as described above is operated as indicated in the table of FIG. 26.

When the brake pedal 10 is in the non-operated position, the regulator 614 is placed in the original position of FIG. 24, and the spool of the change valve 615 is placed in its neutral position. When the brake pedal 10 is depressed, the fluid is supplied from the reservoir 76 to the assisting pressure chamber 512 through the regulator 614, change valve 615, or alternatively through the check valves 412, 413 and the change valve 615. Thus, the fluid pressure in the assisting pressure chamber 512 is prevented from being lowered below the atmospheric level.

In a normal braking operation, the pressure increase and pressure reduction control valves 74, 75 are controlled as described above with the tenth embodiment of FIG. 22. In this case, the shut-off valve 632 is held in the closed state, so that the pressurized fluid of the accumulator 72 is not supplied to the regulator 614. The change valve 615 is held in a state in which the first port 6450 is connected to the third port 654, so that the assisting pressure chamber 512 is communicated with the solenoid-operated pressure control valve device 82. Thus, the fluid pressure controlled by the valve device 82 is applied to the assisting pressure chamber 512. When the wheel braking pressures are reduced, the pressurized fluid is returned from the assisting pressure chamber 512 to the reservoir 76 through the pressure reduction control valve 75. Since the shut-off valve 607 is placed in the open state, the pressurized fluid in the first pressurizing chamber 508 is returned to the reservoir 76 through the fluid passage 704, while the pressurized fluid in the second pressurizing chamber 510 is returned to the reservoir 76 through the fluid passage 522.

In an automatic braking operation, the control valves 74, 75 are controlled to control the wheel braking pressures in the same manner as in the normal braking operation. However, the shut-off valve 610 is opened in the automatic braking operation, the fluid pressure controlled by the pressure control valve device 82 is applied to not only the assisting pressure chamber 512 but also the first pressurizing chamber 508. When the wheel braking pressures are increased, the shut-off valve 607 is closed, so that the pressurized fluid in the first pressurizing chamber 508 is prevented from being returned to the reservoir 76, and the fluid pressure in the first pressurizing chamber 508 can be increased. When the wheel braking pressures are reduced, the shut-off valve 607 is returned to the open state, to return the pressurized fluid from the first pressurizing chamber 508 to the reservoir 76 through the fluid passage 604.

In the event of an electrical abnormality of the braking system, all of the solenoid-operated shut-off valves and the solenoid-operated pressure control valve device 82 are returned to the original positions of FIG. 24. That is, the shut-off valve 632 is returned to the open state, so that the first fluid chamber 626 of the regulator 614 is communicated with the accumulator 72. When the fluid pressure in the first pressurizing chamber 508 has been increased to a level that satisfies the above-indicated inequality, as a result of an operation of the brake pedal 10, the second fluid chamber 628 of the regulator 614 is communicated with the first fluid chamber 626 (accumulator 72). The fluid pressure controlled by the regulator 614 is applied to the second port 652 of the change valve 615, and the regulator 615 is operated to connect the regulator 614 to the assisting pressure chamber 512, so that the fluid pressure controlled by the regulator 614 is applied to the assisting pressure chamber 512. Thus, the fluid pressure in the assisting pressure chamber 512 can be increased to a level corresponding to the operating force F of the brake pedal 10, by utilizing the fluid pressure in the accumulator 72, since the pressure in the accumulator 72 will not be lowered immediately after the occurrence of the electrical abnormality. When the brake pedal to is released, the pressurized fluid in the assisting pressure chamber 512 is returned to the reservoir 76 through the regulator 614.

In the event of occurrence of an abnormality or defect in the servo system such as a fluid leakage from the accumulator 72, the shut-off valves 632, 610 are opened. Since the fluid pressure in the accumulator 72 is relatively low, the fluid pressure applied to the change valve 615 through the opened shut-off valve 632 and the regulator 614 is not so high, even when the fluid pressure in the first pressurizing chamber 508 is increased by depression of the brake pedal 10. On the other hand, the fluid pressure in the first pressurizing chamber 508 is applied to the third port 654 of the change valve 615 through the open shut-off valve 610, so that the change valve 615 is operated to connect the first port 650 to the third port 654. As a result, the fluid pressure in the first pressurizing chamber 508 is applied to the assisting pressure chamber 512, whereby the wheel braking pressures can be increased. When the brake pedal 10 is released, the fluid in the assisting pressure chamber 512 is returned to the reservoir 76 through the shut-off valve 610 and the first pressurizing chamber 508.

As described above, the present braking system is arranged such that the regulator 614 is operated to control the fluid pressure in the assisting pressure chamber 512 to a level depending upon the fluid pressure in the first pressurizing chamber 508, even in the event of occurrence of an electrical abnormality of the braking system.

It is to be understood that the control of the control valves 74, 75 and shut-off valves 560, 607, 610, 632 is not limited to that of FIG. 26, which is provided by way of example only. The master cylinder 600 is not limited to the Girling type, but may be of a type in which primary cups are provided on the pistons 504, 506. It is also noted that the shut-off valve 632 is not essential, and may be eliminated provided the first fluid chamber 626 of the regulator 614 is held in communication with the accumulator 72. In this case, the change valve 615 is operated to connect the first port 650 to one of the second and third ports 652, 653 at which the fluid pressure is higher, so that the higher fluid pressure is applied to the assisting pressure chamber 512. When the brake pedal 10 is released, and the fluid pressure in the first pressurizing chamber 508 is reduced, the regulator 614 is operated to connect the change valve 615 to the reservoir 76, so that the pressurized fluid is returned from the assisting pressure chamber 512 to the reservoir 76 through the change valve 615 and the regulator 614.

While the several preferred embodiments of the present invention have been described above in detail, for illustrative purpose only, it is to be understood that the present invention may be embodied with various changes, modifications and improvements such as those described in the SUMMARY OF THE INVENTION, which may occur to those skilled in the art.

What is claimed is:

1. A hydraulically operated braking system comprising:
a brake operating member operable by an operator;
a master cylinder including a pressurizing piston operatively connected to said brake operating member and partially defining a pressurizing chamber, said pressurizing piston being moved by said brake operating member to pressurize a fluid in said pressurizing chamber;
a brake cylinder actuated by the pressurized fluid received from said master cylinder;
a sensing device for detecting a brake operating condition quantity indicative of an operating condition of said brake operating member; and
an assisting device for applying to said pressurizing piston an assisting drive force which is different than a primary drive force to be applied to said pressurizing piston on the basis of a brake operating force acting on said brake operating member, said assisting device applying said assisting drive force to said pressurizing piston in a first direction in which said primary drive force is applied to said pressurizing piston, without application of a force to said brake operating member in a direction opposite to a second direction in which said brake operating force acts on said brake operating member,
and wherein said assisting device comprises an assisting drive force control device electrically operable to control said assisting drive force on the basis of said brake operating condition quantity detected by said sensing device,
said assisting drive force control device including changing means for changing a relationship between said assisting drive force and at least one of an operating force and an operating stroke of said brake operating member, detected at least as a part of said brake operating condition quantity, said relationship being in a normal operation of the braking system with an operation of said brake operating member,
said changing means including pressure-reducing means for reducing a pressure of the fluid in said brake cylinder for a given value of said brake operating force, by reducing said assisting drive force to be applied to said pressurizing piston in said first direction, without reducing said primary drive force applied to said pressurizing piston on the basis of said brake operating force.

2. A hydraulically operated braking system according to claim 1, wherein said assisting device further comprises:
an assisting cylinder including an assisting piston operatively connected to said pressurizing piston, said assisting cylinder having an assisting pressure chamber which is partially defined by said assisting piston;
a high-pressure source;
a reservoir; and
a solenoid-operated pressure control valve device connected to said high-pressure source, said reservoir and said assisting pressure chamber, for selectively supplying the fluid from said high-pressure source to said assisting pressure chamber and returning the fluid from said assisting pressure chamber to said reservoir, and wherein said assisting drive force control device includes a control valve control device for controlling said solenoid-operated pressure control valve device to control a pressure of the fluid in said assisting pressure chamber.

3. A hydraulically operated braking system according to claim 1, wherein said assisting device comprises:
an assisting rod operatively connected to said brake operating member;
an electrically operated actuator for applying an electrically generated drive force to said assisting rod; and
an actuator control device for controlling said actuator to control said electrically generated drive force for controlling said assisting drive force to be applied to said pressurizing piston.

4. A hydraulically operated braking system according to claim 2, further comprising an emergency closure valve disposed between said assisting pressure chamber and said solenoid-operated pressure control valve device and which is normally placed in an open state for fluid connecting said assisting pressure chamber and said solenoid-operated pressure control valve device to each other, said emergency closure valve being brought to a closed state for disconnecting said assisting pressure chamber and said solenoid-operated pressure control valve device from each other, in the event of an abnormality of said solenoid-operated pressure control valve device.

5. A hydraulically operated braking system according to claim 2, further comprising an emergency high-pressure source communicating device for connecting said assisting pressure chamber and said high-pressure source while by-passing said solenoid-operated pressure control valve device, in the event of an abnormality of said solenoid-operated pressure control valve device.

6. A hydraulically operated braking system according to claim 5, wherein said emergency high-pressure source communicating device includes a pilot-operated pressure control valve which is connected to said assisting pressure chamber, said high-pressure source and said reservoir and which is operated in response to the fluid pressure in said pressurizing chamber of said master cylinder received as a pilot pressure, so as to control the fluid pressure received from said high-pressure source depending upon said pilot pressure, and apply the controlled fluid pressure to said assisting pressure chamber.

7. A hydraulically operated braking system according to claim 6, wherein said pilot-operated pressure control valve is provided in a by-pass passage which connects said assisting pressure chamber and said high-pressure source while by-passing said solenoid-operated pressure control valve device, and said emergency high-pressure source communicating device further includes a higher-pressure applying device connected to said by-pass passage, said solenoid-operated pressure control valve device and said assisting pressure chamber, said higher-pressure applying device being operated to apply a higher one of the fluid pressures received from said solenoid-operated pressure control valve device and said pilot-operated pressure control valve.

8. A hydraulically operated braking system according to claim 2, wherein said master cylinder and said assisting cylinder has respective separate cylinder housings, and said assisting piston is operatively connected to said pressurizing piston through said brake operating member, and wherein pressure-receiving surface areas of said assisting and pressurizing pistons and distances between a fulcrum of said brake operating member and points of connection of said assisting and pressurizing pistons to said brake operating member are determined such that a product of said pressure-receiving surface area of said assisting piston and said distance between said fulcrum and said point of connection of said assisting piston is smaller than a product of said pressure-receiving surface area of said pressurizing piston and said distance between said fulcrum and said point of connection of said pressurizing piston, said braking system further comprising an emergency fluid communicating device disposed between said assisting pressure chamber and said pressurizing chamber, said emergency fluid communicating device being placed in a closed state disconnecting said assisting pressure chamber and said pressurizing chamber from each other during an operation of the braking system when said assisting device is normally operable, and brought to an open state for fluid communication between said assisting pressure chamber and said pressurizing chamber in the event of occurrence of an abnormality of said assisting device during the operation of the braking system.

9. A hydraulically operating braking system according to claim 2, wherein said master cylinder and said assisting cylinder are disposed in series with each other, and said assisting piston has a pressure-receiving surface area smaller than that of said pressurizing piston, said braking system further comprising an emergency communicating device disposed between said assisting pressure chamber and said pressurizing chamber, said emergency fluid communicating device being placed in a closed state disconnecting said assisting pressure chamber and said pressurizing chamber from each other during an operation of the braking system when said assisting device is normally operable, and brought to an open state for fluid communication between said assisting pressure chamber and said pressuring chamber in the event of occurrence of an abnormality of said assisting device during the operation of the braking system.

10. A hydraulically operated braking system according to claim 8, wherein said emergency fluid communicating device includes a mechanically operated switch valve which is switched from a closed state for disconnecting said assisting pressure chamber and said pressurizing chamber, to an open state for fluid communication between said assisting pressure chamber and said pressurizing chamber when the fluid pressure in said high-pressure source is lowered below a predetermined lower limit.

11. A hydraulically operated braking system according to claim 9, wherein said emergency fluid communicating device includes a mechanically operated switch valve which is switched from a closed state for disconnecting said assisting pressure chamber and said pressurizing chamber, to an open state for fluid communication between said assisting pressure chamber and said pressurizing chamber when the fluid pressure in said high-pressure source is lowered below a predetermined lower limit.

12. A hydraulically operated braking system according to claim 8, wherein said emergency fluid communicating device includes an electrically operated switch valve which is switched from a closed state for disconnecting said assisting pressure chamber and said pressurizing chamber, to an open state for fluid communication between said assisting pressure chamber and said pressurizing chamber in the event of occurrence of an abnormality of said assisting device.

13. A hydraulically operated braking system according to claim 9, wherein said emergency fluid communicating device includes an electrically operated switch valve which is switched from a closed state for disconnecting said assisting pressure chamber and said pressurizing chamber, to an open state for fluid communication between said assisting pressure chamber and said pressurizing chamber in the event of occurrence of an abnormality of said assisting device.

14. A hydraulically operated braking system according to claim 8, wherein said emergency fluid communicating device is brought to said open state in the event of occurrence of said abnormality of said assisting device, if the fluid pressure in said pressurizing chamber is higher than the fluid pressure in said assisting pressure chamber by more than a predetermined amount.

15. A hydraulically operated braking system according to claim 9, wherein said emergency fluid communicating device is brought to said open state in the event of occurrence of said abnormality of said assisting device, if the fluid pressure in said pressurizing chamber is higher than the fluid pressure in said assisting pressure chamber by more than a predetermined amount.

16. A hydraulically operated braking system according to claim 8, wherein said emergency fluid communicating device includes (a) a fluid passage connecting said assisting pressure chamber and said pressurizing chamber, (b) a switch valve which is disposed in said fluid passage and which is switched from a closed state disconnecting said assisting pressure chamber and said pressurizing chamber, to an open state for communication between said assisting pressure chamber and said pressurizing chamber, in the event of said abnormality of said assisting device, and (c) a differential shut-off valve which is disposed in said fluid passage in series with said switch valve and which permits a flow of the fluid from said pressurizing chamber towards said assisting pressure chamber when the fluid pressure in said pressurizing chamber has become higher than the fluid pressure in said assisting pressure chamber by more than said predetermined amount.

17. A hydraulically operated braking system according to claim 9, wherein said emergency fluid communicating device includes (a) a fluid passage connecting said assisting pressure chamber and said pressurizing chamber, (b) a switch which is disposed in said fluid passage and which is switched from a closed state disconnecting said assisting pressure chamber and said pressurizing chamber, to an open state for communication between said assisting pressure chamber and said pressurizing chamber, in the event of said abnormality of said assisting device, and (c) a differential shut-off valve which is disposed in said fluid passage in series with said switch valve and which permits a flow of the fluid from said pressurizing chamber towards said assisting pressure chamber when the fluid pressure in said pressurizing chamber has become higher than the fluid pressure in said assisting pressure chamber by more than said predetermined amount.

18. A hydraulically operated braking system according to claim 8, wherein said emergency fluid communicating device includes an electrically operated switch valve which is disposed between said assisting pressure chamber and said pressurizing chamber and which is switchable between a closed state disconnecting said assisting pressure chamber and said pressurizing chamber and an open state for communication between said assisting pressure chamber and said pressurizing chamber, and a switch valve control means for switching said electrically operated switch valve from said closed state to said open state when said assisting device is not normally operable and when the fluid pressure in said pressurizing chamber is higher than the fluid pressure in said assisting pressure chamber by more than said predetermined amount.

19. A hydraulically operated braking system according to claim 9, wherein said emergency fluid communicating device includes an electrically operated switch valve which is disposed between said assisting pressure chamber and said pressurizing chamber and which is switchable between a closed state disconnecting said assisting pressure chamber and said pressurizing chamber and an open state for communication between said assisting pressure chamber and said pressurizing chamber, and a switch valve control means for switching said electrically operated switch valve from said closed state to said open state when said assisting device is not normally operable and when the fluid pressure in said pressurizing chamber is higher than the fluid pressure in said assisting pressure chamber by more than said predetermined amount.

20. A hydraulically operated braking system according to claim 2, further comprising an emergency reservoir communicating device disposed between said assisting pressure chamber and said reservoir, said emergency reservoir communicating device being placed in a closed state disconnecting said assisting pressure chamber and said reservoir from each other during an operation of the braking system when said assisting device is normally operable, and brought to an open state for fluid communication between said assisting pressure chamber and said reservoir in the event of occurrence of an abnormality of said assisting device during the operation of the braking system.

21. A hydraulically operated braking system according to claim 1, further comprising;
a master reservoir;
a fluid passage for fluid communication between said master reservoir and said pressurizing chamber of said master cylinder, irrespective of a position of said pressurizing piston; and
a check valve disposed in said fluid passage, said check valve inhibiting a flow of the fluid from said pressurizing chamber towards said master reservoir and allowing a flow of the fluid from said master reservoir towards said pressurizing chamber.

22. A hydraulically operated braking system according to claim 21, wherein said master cylinder includes a cylinder housing having a port connected to said fluid passage and communicating with said pressurizing chamber, said master cylinder further including a device for preventing said port from being closed by said pressurizing piston.

23. A hydraulically operated braking system according to claim 1, wherein said master cylinder includes (a) a first pressurizing piston operatively connected to said brake operating member partially defining a first pressurizing chamber whose volume increases as said first pressurizing piston is moved, (b) a second pressurizing piston which said partially defines said first pressurizing chamber and a second pressurizing chamber in front of said first pressurizing chamber, so as to separate said first and second pressurizing chambers from each other, and which is movable relative to said first pressurizing piston, (c) a second pressurizing chamber pressurizing device for pressurizing the fluid in said second pressurizing chamber by supplying a pressurized fluid from a pressure source external to said master cylinder, into said second pressurizing chamber, and (d) a volume reduction preventing device for permitting the volume of said first pressurizing chamber to be increased as said first pressurizing piston is advanced from an original position thereof while said second pressurizing piston is placed in an original position thereof, and for preventing the volume of the first pressurizing chamber from being reduced when the fluid pressure in said second pressurizing chamber is increased by said second pressurizing chamber pressurizing device while said second pressurizing piston is placed in said original position.

24. A hydraulically operated braking system according to claim 13, wherein said original position of said second pressurizing piston is fully retracted position thereof, and said volume reduction preventing device is a stopper device for preventing a movement of said second pressurizing piston from said fully retracted position in a direction opposite to a direction of an advancing movement of said second pressurizing piston.

25. A hydraulically operated braking system according to claim 23, wherein said second pressurizing piston includes a partition portion for dividing an interior of a cylinder housing of said master cylinder into said first and second pressurizing chambers, and a cylindrical portion disposed on one side of said partition portion which is on the side of said first pressurizing piston, said original position of said second pressurizing piston being defined by an abutting contact of a rear open end face of said cylindrical portion with a rear end face of said cylinder housing, said stopper device including said rear open end face of said cylindrical portion and said rear end face of said cylinder housing, and wherein said first pressurizing piston is slidably fitted in said cylindrical portion of said second pressurizing piston.

26. A hydraulically operated braking system according to claim 25, wherein said first pressuring chamber includes an inner fluid chamber formed within said cylindrical portion of said second pressurizing piston and in front of said first pressurizing piston, and an outer annular fluid chamber formed between an outer circumferential surface of said second pressurizing piston and an inner circumferential surface of said cylinder housing, said cylindrical portion having a communication passage for fluid communication between said inner fluid chamber and said outer annular fluid chamber.

27. A hydraulically operated braking system according to claim 26, wherein said outer annular fluid chamber has a volume which is reduced as said second pressuring piston is advanced, and said communication passage functions as a fluid flow restrictor for restricting a flow of the fluid between said inner fluid chamber and said outer annular fluid chamber.

28. A hydraulically operated braking system according to claim 23, wherein said second pressurizing chamber is connected to a wheel brake cylinder as said brake cylinder for braking a drive wheel of an automotive vehicle, said braking system further comprising a solenoid-operated shut-off valve which is disposed between said second pressurizing chamber pressurizing device and said second pressurizing chamber and which has an open position for fluid communication between said second pressurizing chamber pressurizing device and said second pressurizing chamber, and a closed position for disconnecting said second pressurizing chamber pressuring device and said second pressurizing chamber from each other, and a drive wheel braking pressure control device for controlling the fluid pressure in said drive wheel brake cylinder while said solenoid-operated shut-off valve is held in said open state.

29. A hydraulically operated braking system according to claim 1, further comprising a brake operating force estimating device for estimating an operating force acting on said brake operating member, on the basis of the fluid pressure in said pressurizing chamber and said assisting drive force produced by said assisting device.

30. A hydraulically operated braking system according to claim 1, wherein said master cylinder includes a cylinder housing which cooperates with said pressurizing piston to define said pressuring chamber, said braking system further comprising a master cylinder characteristic control device for controlling an amount of the fluid in said pressurizing chamber of said master cylinder, to thereby control a relationship between a position of said pressurizing piston relative to said cylinder housing and the fluid pressure in said pressurizing chamber.

31. A hydraulically operated braking system according to claim 30, wherein said master cylinder characteristic control device comprises:
 a cylinder housing;
 a volume-changing piston received in said cylinder housing of said master cylinder characteristic control device such that said volume-changing piston is movable relative to said cylinder housing of said master cylinder characteristic control device;
 said volume-changing piston cooperating with said cylinder housing of said master cylinder characteristic control device to define a variable-volume chamber communicating with said pressurizing chamber; and
 a fluid amount control device for controlling a relative position of said volume-changing piston and said cylinder housing of said master cylinder characteristic control device, to control a volume of said variable-volume chamber, for thereby controlling the amount of the fluid in said pressurizing chamber.

32. A hydraulically operated braking system according to claim 31, wherein said fluid amount control device includes a master cylinder pressurizing control means for controlling the amount of the fluid in said pressurizing chamber, on the basis of an operating stroke of said pressurizing piston and according to a predetermined rule.

33. A hydraulically operated braking system according to claim 30, wherein said master cylinder characteristic control device has a variable-volume chamber connected to a braking fluid chamber in said brake cylinder and said pressurizing chamber of said master cylinder, and includes a fluid amount control device for controlling a volume of said variable-volume chamber to control the amount of the fluid in said pressurizing chamber, said braking system further comprising an emergency master cylinder disconnecting device disposed between said variable-volume chamber and said pressurizing chamber, said emergency master cylinder disconnecting device being normally placed in an open state for fluid communication between said variable-volume chamber and said pressurizing chamber, and brought to a closed state for disconnecting said variable-volume chamber and said pressurizing chamber from each other in the event of an abnormality of said assisting device.

34. A hydraulically operated braking system comprising:
 a brake operating member operable by an operator;
 a master cylinder including a cylinder housing and a pressurizing piston operatively connected to said brake operating member and cooperating with said cylinder housing to define a pressurizing chamber, said pressurizing piston being moved by said brake operating member to pressurize a fluid in said pressurizing chamber;
 a brake cylinder actuated by the pressurized fluid received from said master cylinder;
 a sensing device for detecting a brake operating condition quantity indicative of an operating condition of said brake operating member; and a master cylinder characteristic control device for controlling an amount of the fluid in said pressurizing chamber of said master cylinder, on the basis of said brake operating condition quantity, to thereby change a relationship between a position of said pressurizing piston relative to said cylinder housing and the fluid pressure in said pressurizing chamber in a normal operation of the braking system, for controlling a fluid pressurizing characteristic of said master cylinder.

35. A hydraulically operated braking system according to claim 1, wherein said sensing device is operable to detect, as said brake operating condition quantity, at least one of a quantity corresponding to an operating amount of said brake operating member and a quantity corresponding to a rate of change of said operating amount, and said assisting drive force control device is operable to control said assisting drive force on the basis of said at least one of said quantities corresponding to said operating amount and said rate of change of said operating amount.

36. A hydraulically operated braking system according to claim 35, wherein said sensing device includes at least one of a force sensor for detecting a quantity corresponding to said operating force of said brake operating member and a stroke sensor for detecting a quantity corresponding to an operating stroke of said brake operating member, said assisting drive force control device is operable to control said assisting drive force on the basis of at least one of said quantities corresponding to said operating force and said operating stroke of said brake operating member.

37. A hydraulically operated braking system according to claim 36, wherein said assisting drive force control device is operable to control said assisting drive force on the basis of both of said quantities corresponding to said operating force and said operating stroke of said brake operating member.

38. A hydraulically operated braking system according to claim 34, wherein said sensing device includes at least one of a force sensor for detecting a quantity corresponding to an operating force of said brake operating member and a quantity corresponding to a stroke sensor for detecting an operating stroke of said brake operating member, and said master cylinder characteristic control device is operable to control the amount of the fluid in said pressurizing chamber of said master cylinder on the basis of at least one of said quantities corresponding to said operating force and said operating stroke of said brake operating member.

39. A hydraulically operated braking system according to claim 38, wherein said master cylinder characteristic control device is operable to control the amount of the fluid in said pressurizing chamber of said master cylinder on the basis of both of said quantities corresponding to said operating force and said operating stroke of said brake operating member.

40. A hydraulically operated braking system according to claim 1, wherein said sensing device further detects a vehicle running condition quantity indicative of a running condition of an automotive vehicle having a wheel which is braked by said brake cylinder, and said assisting drive force control device further includes means for changing a relationship between said assisting drive force and said brake operating condition quantity on the basis of said vehicle running condition quantity during said normal operation of the braking system.

41. A hydraulically operated braking system comprising:
a brake operating member operable by an operator;
a master cylinder including a pressuring piston operatively connected to said brake operating member and partially defining a pressurizing chamber, said pressurizing piston being moved by said brake operating member to pressurize a fluid in said pressurizing chamber;
a brake cylinder actuated by the pressurized fluid received from said master cylinder;
a sensing device for detecting a brake operating condition quantity indicative of an operating condition of said brake operating member; and
an assisting device for applying to said pressurizing piston an assisting drive force which is different than a primary drive force to be applied to said pressurizing piston on the basis of a brake operating force acting on said brake operating member, said assisting device including only one actuator operable to generate said assisting drive force,
and wherein said assisting device comprises an assisting drive force control device electrically operable to control said only one actuator for controlling said assisting drive force on the basis of said brake operating condition quantity detected by said sensing device,
said assisting drive force control device including changing means for changing a relationship between said assisting drive force and at least one of an operating force and an operating stroke of said brake operating member detected at least as a part of said brake operating condition quantity, said relationship being in a normal operation of the braking system with an operation of said brake operating member,
said changing means including pressure-reducing means for reducing a pressure of the fluid in said brake cylinder for a given value of said brake operating force, by reducing a force of operation of said only one actuator to reduce said assisting drive force, without reducing said primary drive force applied to said pressurizing piston on the basis of said brake operating force.

42. A hydraulically operated braking system comprising:
a brake operating member operable by an operator;
a master cylinder including a pressuring piston operatively connected to said brake operating member and partially defining a pressurizing chamber, said pressurizing piston being moved by said brake operating member to pressurize a fluid ins aid pressurizing chamber;
a brake cylinder actuated by the pressurized fluid received from said master cylinder;
a sensing device for detecting a brake operating condition quantity indicative of an operating condition of said brake operating member; and
an assisting device for applying to said pressurizing piston an assisting drive force which is different than a primary drive force to be applied to said pressurizing piston on the basis of a brake operating force acting on said brake operating member, such that said assisting drive force is applied to said pressurizing piston in a first direction in which said primary drive force is applied to said pressurizing piston, said assisting device not including an actuator operable to generate a force to be applied to said brake operating member in a direction opposite to a second direction in which said brake operating force acts on said brake operating member, and wherein said assisting device comprises an assisting drive force control device electrically operable to control said assisting drive force on the basis of said brake operating condition quantity detected by said sensing device, said assisting drive force control device including changing means for changing a relationship between said assisting drive force and at least one of an operating force and an operating stroke of said brake operating member detected at least as a part of said brake operating condition quantity, said relationship being in a normal operation of the braking system with an operation of said brake operating member.

* * * * *

UNITED STATES PATENT AND TRADEMARK OFFICE
CERTIFICATE OF CORRECTION

PATENT NO. : 6,945,610 B1
APPLICATION NO. : 09/287707
DATED : September 20, 2206
INVENTOR(S) : Yasuji Mizutani et al.

It is certified that error appears in the above-identified patent and that said Letters Patent is hereby corrected as shown below:

| Column | Line | |
|---|---|---|
| 7 | 14 | Change "breaking system" to --braking system--. |
| 27 | 4 | Change "22, 4, 26, 28" to --22, 24, 26, 28--. |
| 29 | 31 | After "based on" delete ",". |
| 29 | 47 | Change "press-Lire" to --pressure--. |
| 30 | 26 | Change "de-vice" to --device--. |
| 30 | 54 | Change "chaffer" to --chamber--. |
| 31 | 48 | Change "valves 74, 7," to --valves 74, 75,--; |
| 32 | 55 | Before "output" change "se" to --the--. |
| 43 | 50 | After "permitting the" delete "10,". |
| 45 | 56 | Change "chaffers 32" to --chambers 32--. |
| 47 | 36 | Change "flu passage" to --fluid passage--. |
| 48 | 64 | Change "chatter" to --chamber--. |
| 53 | 52 | After "is" delete ",". |
| 53 | 57 | After "increase" delete ",". |
| 53 | 59 | Change "account" to --amount--. |
| 53 | 62 | Change "initialing" to --initiating--. |
| 54 | 60 | After "atmospheric" delete ",". |
| 55 | 1 | Change "nas" to --has--. |
| 61 | 38 | Change "0.622" to --622--. |

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 6,945,610 B1 Page 1 of 1
APPLICATION NO. : 09/287707
DATED : September 20, 2005
INVENTOR(S) : Yasuji Mizutani et al.

It is certified that error appears in the above-identified patent and that said Letters Patent is hereby corrected as shown below:

| Column | Line | |
|---|---|---|
| 7 | 14 | Change "breaking system" to --braking system--. |
| 27 | 4 | Change "22, 4, 26, 28" to --22, 24, 26, 28--. |
| 29 | 31 | After "based on" delete ",". |
| 29 | 47 | Change "press-Lire" to --pressure--. |
| 30 | 26 | Change "de-vice" to --device--. |
| 30 | 54 | Change "chaffer" to --chamber--. |
| 31 | 48 | Change "valves 74, 7," to --valves 74, 75,--; |
| 32 | 55 | Before "output" change "se" to --the--. |
| 43 | 50 | After "permitting the" delete "10,". |
| 45 | 56 | Change "chaffers 32" to --chambers 32--. |
| 47 | 36 | Change "flu passage" to --fluid passage--. |
| 48 | 64 | Change "chatter" to --chamber--. |
| 53 | 52 | After "is" delete ",". |
| 53 | 57 | After "increase" delete ",". |
| 53 | 59 | Change "account" to --amount--. |
| 53 | 62 | Change "initialing" to --initiating--. |
| 54 | 60 | After "atmospheric" delete ",". |
| 55 | 1 | Change "nas" to --has--. |
| 61 | 38 | Change "0.622" to --622--. |

This certificate supersedes Certificate of Correction issued December 12, 2006.

Signed and Sealed this

Ninth Day of January, 2007

JON W. DUDAS
*Director of the United States Patent and Trademark Office*